(12) United States Patent
Fukushima et al.

(10) Patent No.: US 12,305,071 B2
(45) Date of Patent: May 20, 2025

(54) HARDCOAT FILM AND ARTICLE AND IMAGE DISPLAY DEVICE HAVING HARDCOAT FILM

(71) Applicant: FUJIFILM Corporation, Tokyo (JP)

(72) Inventors: Yuta Fukushima, Kanagawa (JP); Akio Tamura, Kanagawa (JP); Tetsu Kitamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/136,557

(22) Filed: Dec. 29, 2020

(65) Prior Publication Data

US 2021/0284866 A1    Sep. 16, 2021

Related U.S. Application Data

(63) Continuation of application No. PCT/JP2019/024902, filed on Jun. 24, 2019.

(30) Foreign Application Priority Data

Jul. 27, 2018 (JP) .................. 2018-141893
Nov. 27, 2018 (JP) .................. 2018-221740

(51) Int. Cl.
*C09D 183/06* (2006.01)
*G02B 1/14* (2015.01)

(52) U.S. Cl.
CPC ............. *C09D 183/06* (2013.01); *G02B 1/14* (2015.01)

(58) Field of Classification Search
None
See application file for complete search history.

(56) References Cited

U.S. PATENT DOCUMENTS

| | | | |
|---|---|---|---|
| 5,962,067 A * | 10/1999 | Bautista | C03C 25/40 427/163.2 |
| 6,121,342 A | 9/2000 | Suzuki et al. | |
| 2010/0279025 A1 | 11/2010 | Fu et al. | |
| 2015/0275043 A1* | 10/2015 | Kikuchi | C09D 7/47 428/447 |
| 2016/0046830 A1 | 2/2016 | Kim et al. | |
| 2016/0209552 A1 | 7/2016 | Satake et al. | |
| 2016/0297933 A1* | 10/2016 | Kuwana | B32B 7/12 |
| 2017/0131439 A1 | 5/2017 | Kobori et al. | |
| 2017/0343704 A1 | 11/2017 | Kim et al. | |
| 2018/0037495 A1* | 2/2018 | Moxey | C09D 183/04 |
| 2018/0051148 A1 | 2/2018 | Kim et al. | |
| 2018/0142128 A1* | 5/2018 | Kikuchi | C08G 59/4085 |
| 2018/0230316 A1 | 8/2018 | Kim et al. | |
| 2018/0282485 A1 | 10/2018 | Kuwana et al. | |
| 2018/0319944 A1* | 11/2018 | Chen | C08J 7/048 |
| 2019/0023942 A1 | 1/2019 | Kim et al. | |
| 2022/0002494 A1 | 1/2022 | Kuwana et al. | |

FOREIGN PATENT DOCUMENTS

| | | | |
|---|---|---|---|
| CN | 106459370 A | 2/2017 | |
| CN | 106662691 A | 5/2017 | |
| CN | 108290391 A | 7/2018 | |
| JP | 10-316757 A | 12/1998 | |
| JP | 11-29640 A | 2/1999 | |
| JP | 11-199673 A | 7/1999 | |
| JP | 2002-167552 A | 6/2002 | |
| JP | 2005-092099 A | 4/2005 | |
| JP | 2006227419 A * | 8/2006 | |
| JP | 2009/042351 A * | 2/2009 | ............... C08J 7/04 |
| JP | 2011-510133 A | 3/2011 | |
| JP | 2014215954 A * | 11/2014 | |
| JP | 2015-212353 A | 11/2015 | |
| JP | 2016-155992 A | 9/2016 | |
| JP | 2017-008143 A | 1/2017 | |
| JP | 2017-177772 A | 10/2017 | |
| JP | 2017-228238 A | 12/2017 | |
| JP | 2018-508599 A | 3/2018 | |
| KR | 10-2017-0021758 A | 2/2017 | |
| KR | 10-2017-0106923 A | 9/2017 | |
| WO | 2015/046225 A1 | 4/2015 | |
| WO | 2017/116171 A1 | 7/2017 | |

OTHER PUBLICATIONS

English machine translation of JP2014215954 (2014).*
RN672926-18-0 for MA 0701 Scifinder (2021).*
Versace article Macromol Mater Eng 295 355-365 (2010).*
English machine translation of JP-2006227419-A (2006).*
Suzuki—JP 2009-042351 A—Jap. Rej. D2—MT—optical film & display panel—2009 (Year: 2009).*
Office Action, issued by the Japanese Patent Office on Nov. 9, 2021, in connection with Japanese Patent Application No. 2020-532224.
International Search Report Issued in PCT/JP2019/024902 on Sep. 3, 2019.
Written Opinion Issued in PCT/JP2019/024902 on Sep. 3, 2019.
International Preliminary Report on Patentability Issued in PCT/JP2019/024902 on Feb. 2, 2021.
Office Action, issued by the State Intellectual Property Office of China on Apr. 29, 2022, in connection with Chinese Patent Application No. 201980048746.0.
Notice of Reasons for Revocation, issued by the Japanese Patent Office on Jan. 26, 2024, in connection with Japanese Patent Application No. 2020-532224.
Demand for Correction, issued by the Japanese Patent Office on Mar. 26, 2024, in connection with Japanese Patent Application No. 2020-532224, Patent No. 7263356.

(Continued)

*Primary Examiner* — John Vincent Lawler

(74) *Attorney, Agent, or Firm* — Edwards Neils LLC; Jean C. Edwards, Esq.

(57) ABSTRACT

A hardcoat film has a substrate, a hardcoat layer, and an anti-scratch layer in this order. The anti-scratch layer contains a cured product of polyorganosilsesquioxane (c1) having a group containing a radically polymerizable double bond.

18 Claims, No Drawings

(56) References Cited

OTHER PUBLICATIONS

Written Opinion, issued by the Japanese Patent Office on Mar. 26, 2024, in connection with Japanese Patent Application No. 2020-532224, Patent No. 7263356.
Office Action, issued by the Japanese Patent Office on Jul. 2, 2024, in connection with Japanese Patent Application No. 2023-065051.
Office Action, issued by the Japanese Patent Office on Nov. 26, 2024, in connection with Japanese Patent Application No. 2023-065051.
Office Action, issued by the Japanese Patent Office on Oct. 18, 2022, in connection with Japanese Patent Application No. 2020-532224.
Office Action, issued by the State Intellectual Property Office of China on Dec. 13, 2022, in connection with Chinese Patent Application No. 201980048746.0.
Japanese Sol-Gel Research Society, Eleventh Seminar Materials, Jun. 6, 2014, pp. 67-68.
Naomasa Furuta et al., Silsesquioxane Derivatives Photocurable SQ Series, Annual Search Report of Toagosei Group, Trend 2009, pp. 27-30, No. 12.

\* cited by examiner

HARDCOAT FILM AND ARTICLE AND IMAGE DISPLAY DEVICE HAVING HARDCOAT FILM

CROSS-REFERENCE TO RELATED APPLICATIONS

This application is a Continuation of PCT International Application No. PCT/JP2019/024902 filed on Jun. 24, 2019, which was published under PCT Article 21 (2) in Japanese, and which claims priority under 35 U.S.C § 119 (a) to Japanese Patent Application No. 2018-141893 filed on Jul. 27, 2018, and Japanese Patent Application No. 2018-221740 filed on Nov. 27, 2018. The above applications are hereby expressly incorporated by reference, in their entirety, into the present application.

BACKGROUND OF THE INVENTION

1. Field of the Invention

The present invention relates to a hardcoat film and an article and an image display device that have the hardcoat film.

2. Description of the Related Art

For image display devices such as a display device using a cathode ray tube (CRT), a plasma display panel (PDP), an electroluminescent display (ELD), a vacuum fluorescent display (VFD), a field emission display (FED), and a liquid crystal display (LCD), in order to prevent the display surface from being scratched, it is preferable to provide an optical film (hardcoat film) having a hardcoat layer on a substrate.

For example, JP2017-228238A describes a touch panel comprising a multilayer film having an antifouling layer formed of a cured product containing a condensate of alkoxysilane having a perfluoropolyether structure and a compound having a trialkoxysilyl group and a polymerizable group or a derivative of the compound.

Furthermore, JP2017-177772A describes a transparent laminate including a transparent resin substrate, a primer layer which is laminated on the substrate and formed by curing a primer composition containing a (meth)acrylate compound, an interlayer which is laminated on the primer layer and formed by curing an interlayer composition containing a hydrolyzed condensate of trialkoxysilane having a (meth)acryloyl group, and a hardcoat layer which is laminated on the interlayer and formed by curing a hardcoat composition containing a hydrolyzed condensate of trialkoxysilane having a (meth)acryloyl group and alkyl silicate.

SUMMARY OF THE INVENTION

In recent years, for example, for smartphones and the like, there has been an increasing need for flexible displays. Accordingly, there has been a demand for an optical film that is hardly broken even being repeatedly folded (an optical film having excellent resistance to repeated folding). Particularly, there has been a strong demand for an optical film that can simultaneously satisfy hardness, scratch resistance, and resistance to repeated folding.

Through studies, the inventors of the present invention ha % e found that owing to the insufficient scratch resistance and pencil hardness, the films described in JP2017-228238A and JP2017-177772A cannot simultaneously satisfy the required performances described above.

An object of the present invention is to provide a hardcoat film having extremely excellent resistance to repeated folding, high hardness, and excellent scratch resistance and to provide an article and an image display device which comprise the hardcoat film.

As a result of intensive examination, the inventors of the present invention have found that the above object can be achieved by the following means.

<1>

A hardcoat film having, in the following order, a substrate, a hardcoat layer, and an anti-scratch layer,
in which the anti-scratch layer contains a cured product of a polyorganosilsesquioxane compound (c1) having a group containing a radically polymerizable double bond.

<2>

The hardcoat film described in <1>, in which the group containing a radically polymerizable double bond is a group containing a (meth)acryloyl group.

<3>

The hardcoat film described in <1> or <2>, in which the group containing a radically polymerizable double bond is a group containing an acryloyl group.

<4>

The hardcoat film described in any one of <1> to <3>, in which a condensation rate of the polyorganosilsesquioxane compound (c1) having a group containing a radically polymerizable double bond is equal to or higher than 50%.

<5>

The hardcoat film described in any one of <1> to <4>, in which the anti-scratch layer contains a cured product of a fluorine-containing compound.

<6>

The hardcoat film described in any one of <1> to <5>, in which the hardcoat layer contains a cured product of polyorganosilsesquioxane (a1) having an epoxy group.

<7>

The hardcoat film described in any one of <1> to <6>, further having a mixed layer between the hardcoat layer and the anti-scratch layer, in which the mixed layer contains a cured product of a compound (b1) having an epoxy group and a cured product of a compound (b2) having two or more (meth)acryloyl groups in one molecule.

<8>

An article comprising the hardcoat film described in any one of <1> to <7>.

<9>

An image display device comprising the hardcoat film described in any one of <1> to <7> as a surface protection film.

According to an aspect of the present invention, it is possible to provide a hardcoat film having extremely excellent resistance to repeated folding, high hardness, and excellent scratch resistance and to provide an article and an image display device which comprise the hardcoat film.

DESCRIPTION OF THE PREFERRED EMBODIMENTS

Hereinafter, embodiments of the present invention will be specifically described, but the present invention is not limited thereto. In the present specification, in a case where numerical values represent a value of physical properties, a value of characteristics, and the like, the description of "(numerical value 1) to (numerical value 2)" means "equal to or greater than (numerical value 1) and equal to or smaller than (numerical value 2)". In addition, in the present specification, the description of "(meth)acrylate" means "at least one of acrylate or methacrylate". The same shall be applied to "(meth)acrylic acid", "(meth)acryloyl", and the like.

[Hardcoat Film]

The hardcoat film according to an embodiment of the present invention is a hardcoat film having a substrate, a hardcoat layer, and an anti-scratch layer in this order.

The anti-scratch layer contains a cured product of polyorganosilsesquioxane (c1) having a group containing a radically polymerizable double bond.

In order to develop a hardcoat film having extremely excellent resistance to repeated folding, first, the inventors of the present invention assumed that the resistance of the hardcoat film to repeated folding could be improved by reducing the compressive stress applied to the anti-scratch layer in the hardcoat film during a folding test using a folding endurance tester. Based on the assumption, the inventors continued examination. As a result, the inventors were able to confirm that reducing the modulus of elasticity of the anti-scratch layer is effective for reducing the compressive stress. That is, the inventors assumed that the resistance of the hardcoat film to repeated folding could be improved by the reduction of the modulus of elasticity of the anti-scratch layer.

Meanwhile, the scratch resistance of the hardcoat film is considered to be correlated with the crosslink density of a polymerizable compound which is a matrix-forming component of the anti-scratch laser. In order to reduce the modulus of elasticity of the anti-scratch layer, generally, a crosslinking group equivalent in a polymerizable compound (for example, a polyfunctional (meth)acrylate compound) as a matrix-forming component of the anti-scratch layer needs to be increased, or the reaction rate of the crosslinking group needs to be reduced. Presumably, as a result, the crosslink density may be reduced, and the scratch resistance may deteriorate. Furthermore, there is a concern that the reduction of the modulus of elasticity of the anti-scratch layer may lead to the deterioration of pencil hardness.

Therefore, in order to make an anti-scratch layer which does not cause the deterioration of scratch resistance and pencil hardness even though the modulus of elasticity of the anti-scratch layer is reduced, the inventors of the present invention conducted thorough examination. As a result, it has been found that for making such an anti-scratch layer, it is effective to use polyorganosilsesquioxane having a group containing a radically polymerizable double bond as a matrix-forming component in the anti-scratch layer. Based on the finding, the inventors have accomplished the present invention.

The hardcoat film according to an embodiment of the present invention has extremely excellent resistance to repeated folding, high hardness, and excellent scratch resistance. The mechanism that allows the hardcoat film to have the above properties unclear, but is assumed to be as below according to the inventors of the present invention.

The cured product of polyorganosilsesquioxane having a group containing a radically polymerizable double bond has a crosslinked structure constituted with a siloxane bond (Si—O—Si) in addition to a crosslinked structure obtained by the polymerization of the radically polymerizable double bond. Presumably, because the crosslinked structure constituted with a siloxane bond is more flexible than the crosslinked structure obtained by the polymerization of the radically polymerizable double bond, it may be possible to reduce the modulus of elasticity of the anti-scratch layer while allowing the anti-scratch layer to express scratch resistance brought about by the high crosslink density resulting from the two kinds of crosslinked structures. In addition, presumably, because the crosslinked structure constituted with a siloxane bond expresses a high deformation recovery rate, excellent pencil hardness can be maintained even though the modulus of elasticity of the anti-scratch layer is reduced Hereinafter, the layers constituting the hardcoat film according to the embodiment of the present invention will be described.

<Substrate>

The substrate of the hardcoat film according to the embodiment of the present invention will be described.

The transmittance of the substrate in a visible light region is preferably equal to or higher than 70%, more preferably equal to or higher than 80%, and even more preferably equal to or higher than 90%. The substrate preferably contains a polymer.

(Polymer)

As the polymer, a polymer excellent in optical transparency, mechanical strength, heat stability, and the like is preferable.

Examples of such a polymer include polycarbonate-based polymers, polyester-based polymers such as polyethylene terephthalate (PET) and polyethylene naphthalate (PEN), styrene-based polymers such as polystyrene and an acrylonitrile/styrene copolymer (AS resin), and the like. The examples also include poly olefins such as polyethylene and polypropylene, norbornene-based resins, polyolefin-based polymers such as ethylene/propylene copolymers, (meth) acrylic polymers such as polymethyl methacrylate, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, cellulose-based polymers represented by triacetyl cellulose, copolymers of the above polymers, and polymers obtained by mixing together the above polymers.

Particularly, amide-based polymers such as aromatic polyamide and imide-based polymers can be preferably used as the substrate, because the number of times of folding at break measured for these polymers by an MIT tester according to Japanese Industrial Standards (JIS) P8115 (2001) is large, and these polymers have relatively high hardness. For example, the aromatic polyamide described in Example 1 of JP5699454B and the polyimides described in JP2015-508345A and JP2016-521216A, can be preferably used as the substrate.

The substrate can also be formed as a cured layer of an ultraviolet curable resin or a thermosetting resin based on acryl, urethane, acrylic urethane, epoxy, silicone, and the like.

(Softening Material)

The substrate may contain a material that further softens the polymer described above. The softening material refers to a compound that improves the number of times of folding at break. As the softening material, it is possible to use a rubber elastic material, a brittleness improver, a plasticizer, a slide ring polymer, and the like.

Specifically, as the softening material, the softening materials described in paragraphs "0051" to "0114" of JP2016-167043A can be suitability used.

The softening material may be mixed alone with the polymer, or a plurality of softening materials may be appropriately used in combination. Furthermore, the substrate may be prepared using one kind of softening material or a plurality of softening materials without being mixed with the polymer.

That is, the amount of the softening material to be mixed is not particularly limited. A polymer having the sufficient number of times of folding at break itself may be used alone as the substrate of the film or may be mixed with the softening material, or the substrate may be totally (100%) composed of the softening material such that the number of times of folding at break becomes sufficient.

(Other Additives)

Various additives (for example, an ultraviolet absorber, a matting agent, an antioxidant, a peeling accelerator, a retardation (optical anisotropy) regulator, and the like) can be added to the substrate according to the use. These additives may be solids or oily substances. That is, the melting point or boiling point thereof is not particularly limited. In addition, the additives may be added at any point in time in the step of preparing the substrate, and a step of preparing a material by adding additives may be added to a material preparation step. Furthermore, the amount of each material added is not particularly limited as long as each material performs its function.

As those other additives, the additives described in paragraphs "0117" to "0122" of JP2016-167043A can be suitably used.

One kind of each of the above additives may be used singly, or two or more kinds of the above additives can be used in combination.

(Ultraviolet Absorber)

Examples of the ultraviolet absorber include a benzotriazole compound, a triazine compound, and a benzoxazine compound. The benzotriazole compound is a compound having a benzotriazole ring, and specific examples thereof include various benzotriazole-based ultraviolet absorbers described in paragraph "0033" of JP2013-111835A The triazine compound is a compound having a triazine ring, and specific examples thereof include various triazine-based ultraviolet absorbers described in paragraph "0033" of JP2013-111835A. As the benzoxazine compound, for example, those described in paragraph "0031" of JP2014-209162A can be used. The content of the ultraviolet absorber in the substrate is, for example, about 0.1 to 10 parts by mass with respect to 1(K) parts by mass of the polymer contained in the substrate, but is not particularly limited. Regarding the ultraviolet absorber, paragraph "0032" of JP2013-11835A can also be referred to. In the present invention, an ultraviolet absorber having high heat resistance and low volatility is preferable. Examples of such an ultraviolet absorber include UVSORB101 (manufactured by FUJIFILM Finechemicals Co., Ltd.), TINUVIN 360, TINUVIN 460, and TINUVIN 1577 (manufactured by BASF SE), LA-F70, LA-31, and LA-46 (manufactured by ADEKA CORPORATION), and the like.

From the viewpoint of transparency, it is preferable that the difference between a refractive index of the softening material and various additives used in the substrate and a refractive index of the polymer is small.

(Substrate Containing Imide-Based Polymer)

As the substrate, a substrate containing an imide-based polymer can be preferably used. In the present specification, the imide-based polymer means a polymer containing at least one kind of repeating structural unit among repeating structural units represented by Formula (PI), Formula (a), Formula (a'), and Formula (b). Particularly, from the viewpoint of hardness and transparency of the film, it is preferable that the repeating structural unit represented by Formula (PI) is the main structural unit of the imide-based polymer. The amount of the repeating structural unit represented by Formula (PI) with respect to the total amount of the repeating structural units in the imide-based polymer is preferably equal to or greater than 40 mol %, more preferably equal to or greater than 50 mol %, even more preferably equal to or greater than 70 mol %, still more preferably equal to or greater than 90 mol %, and yet more preferably equal to or greater than 98 mol %.

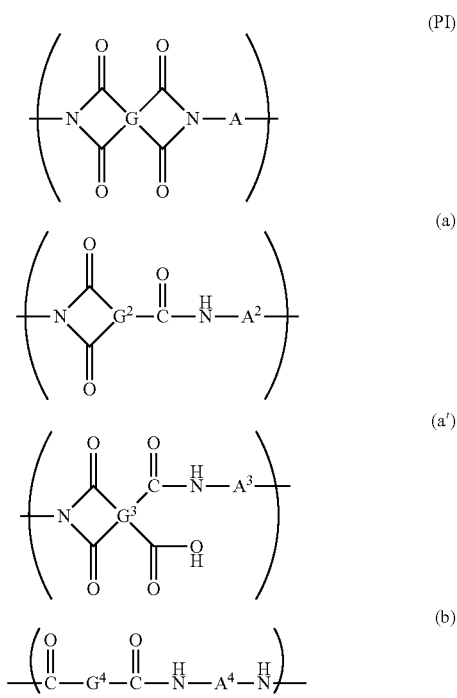

In Formula (PI), G represents a tetravalent organic group, and A represents a divalent organic group. In Formula (a), $G^2$ represents a trivalent organic group, and $A^7$ represents a divalent organic group. In Formula (a'). $G^3$ represents a tetravalent organic group, and $A^3$ represents a divalent organic group. In Formula (b), $G^4$ and $A^4$ each represent a divalent organic group.

Examples of the organic group as the tetravalent organic group represented by G in Formula (PI) (hereinafter, sometimes referred to as organic group of G) include a group selected from the group consisting of an acyclic aliphatic group, a cyclic aliphatic group, and an aromatic group. From the viewpoint of transparency and flexibility of the substrate containing the imide-based polymer, the organic group of G is preferably a tetravalent cyclic aliphatic group or a tetravalent aromatic group. Examples of the aromatic group include a monocyclic aromatic group, a condensed polycyclic aromatic group, a non-condensed polycyclic aromatic group having two or more aromatic rings which are linked to each other directly or through a linking group, and the like From the viewpoint of transparency and coloration inhibition of the resin film, the organic group of G is preferably a cyclic aliphatic group, a cyclic aliphatic group having a fluorine-based substituent, a monocyclic aromatic group having a fluorine-based substituent, a condensed polycyclic aromatic group having a fluorine-based substituent, or a non-condensed polycyclic aromatic group having a fluorine-based substituent. In the present specification, the fluorine-based substituent means a group containing a fluorine atom. The fluorine-based substituent is preferably a fluoro group (fluorine atom, —F) and a perfluoroalkyl group, and more preferably a fluoro group and a trifluoromethyl group.

More specifically, the organic group of G is selected, for example, from a saturated or unsaturated cycloalkyl group, a saturated or unsaturated heterocycloalkyl group, an aryl group, a heteroaryl group, an arylalkyl group, an alkylaryl group, a heteroalkylaryl group, and a group having any two groups (which may be the same as each other) among these that are linked to each other directly or through a linking group. Examples of the linking group include —O—, an alkylene group having 1 to 10 carbon atoms, —SO$_2$—, —CO—, and —CO—NR— (R represents an alkyl group having 1 to 3 carbon atoms such as a methyl group, an ethyl group, or a propyl group or a hydrogen atom).

The tetravalent organic group represented by G usually has 2 to 32 carbon atoms, preferably has 4 to 15 carbon atoms, more preferably has 5 to 10 carbon atoms, and even more preferably has 6 to 8 carbon atoms. In a case where the organic group of G is a cyclic aliphatic group or an aromatic group, at least one of the carbon atoms constituting these groups may be substituted with a hetero atom. Examples of the hetero atom include O, N, and S.

Specific examples of G include groups represented by Formula (20), Formula (21), Formula (22), Formula (23), Formula (24), formula (25), or Formula (26). * in each formula represents a bond. In Formula (26), Z represents a single bond. —O—, —CH$_2$—, —C(CH$_3$—)—, —Ar—O—Ar—, —Ar—CH$_2$—Ar—, —Ar—C(CH$_3$)$_2$—Ar—, or —Ar—SO$_2$—Ar—. Ar represents an aryl group having 6 to 20 carbon atoms Ar may be, for example, a phenylene group. At least one of the hydrogen atoms in these groups may be substituted with a fluorine-based substituent.

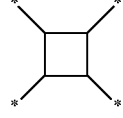
(20)

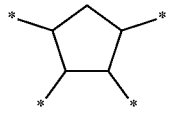
(21)

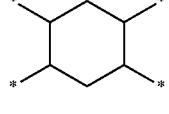
(22)

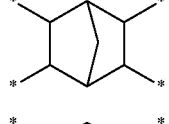
(23)

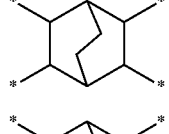
(24)

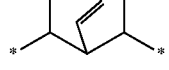
(25)

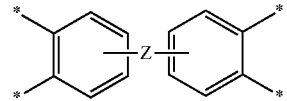
(26)

Examples of the organic group as the divalent organic group represented by A in Formula (PI) (hereinafter, sometimes referred to as organic group of A) include a group selected from the group consisting of an acyclic aliphatic group, a cyclic aliphatic group, and an aromatic group. The divalent organic group represented by A is preferably selected from a divalent cyclic aliphatic group and a divalent aromatic group Examples of the aromatic group include a monocyclic aromatic group, a condensed polycyclic aromatic group, and a non-condensed polycyclic aromatic group having two or more aromatic rings which are linked to each other directly or through a linking group. From the viewpoint of transparency and coloration inhibition of the resin film, it is preferable that a fluorine-based substituent is introduced into the organic group of A.

More specifically, the organic group of A is selected, for example, from a saturated or unsaturated cycloalkyl group, a saturated or unsaturated heterocycloalkyl group, an aryl group, a heteroaryl group, an arylalkyl group, an alkylaryl group, a heteroalkylaryl group, and a group having any two groups (which may be the same as each other) among these that are linked to each other directly or through a linking group. Examples of the hetero atom include O, N, and S Examples of the linking group include —O—, an alkylene group having 1 to 10 carbon atoms. —SO$_2$—, —CO—, and —CO—NR— (R represents an alkyl group having 1 to 3 carbon atoms such as a methyl group, an ethyl group, or a propyl group or a hydrogen atom).

The divalent organic group represented by A usually has 2 to 40 carbon atoms, preferably has 5 to 32 carbon atoms, more preferably has 12 to 28 carbon atoms, and even more preferably has 24 to 27 carbon atoms.

Specific examples of A include groups represented by Formula (30). Formula (31). Formula (32). Formula (33), or Formula (34). * in each formula represents a bond. $Z^1$ to $Z^3$ each independently represent a single bond, —O—, —CH$_2$—, —C(CH$_3$)—, —SO$_2$—, —CO—, or —CO—NR— (R represents an alkyl group having 1 to 3 carbon atoms such as a methyl group, an ethyl group, or a propyl group or a hydrogen atom). In the following groups, $Z^1$ and $Z^2$ as well as $Z^2$ and $Z^3$ are preferably in the meta position or para position respectively for each ring. Furthermore, it is preferable that $Z^1$ and a terminal single bond, $Z^2$ and a terminal single bond, and $Z^3$ and a terminal single bond are in the meta position or para position respectively. For example, in A, $Z^1$ and Z represent —O—, and $Z^2$ represents —CH$_2$—, —C(CH$_3$)$_2$— or —SO$_2$—. One hydrogen atom or two or more hydrogen atoms in these groups may be substituted with a fluorine-based substituent.

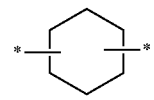
(30)

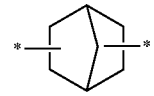
(31)

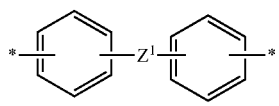

(32)

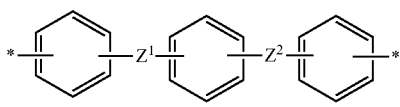

(33)

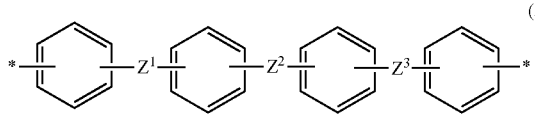

(34)

At least one of the hydrogen atoms constituting at least one of A or G may be substituted with at least one kind of functional group selected from the group consisting of a fluorine-based substituent, a hydroxyl group, a sulfone group, an alkyl group having 1 to 10 carbon atoms, and the like. Furthermore, in a case where each of the organic group of A and the organic group of G is a cyclic aliphatic group or an aromatic group, it is preferable that at least one of A or G has a fluorine-based substituent, and it is more preferable that both the A and G have a fluorine-based substituent.

$G^2$ in Formula (a) represents a trivalent organic group. This organic group can be selected from the same group as the organic group of G in formula (PI), except that $G^2$ is a trivalent group. Examples of $G^2$ include groups represented by Formula (20) to Formula (26) listed above as specific examples of G in which any one of the four bonds is substituted with a hydrogen atom. A2 in Formula (a) can be selected from the same group as A in Formula (PI).

$G^3$ in Formula (a') can be selected from the same group as G in Formula (PI). $A^3$ in Formula (a') can be selected from the same group as A in Formula (PI).

$G^4$ in Formula (b) represents a divalent organic group. This organic group can be selected from the same group as the organic group of G in formula (PI), except that $G^4$ is a divalent group. Examples of $G^4$ include groups represented by Formula (20) to Formula (26) listed above as specific examples of G in which any two of the four bonds are substituted with a hydrogen atom A in Formula (b) can be selected from the same group as A in Formula (PI).

The imide-based polymer contained in the substrate containing the imide-based polymer may be a condensed polymer obtained by the polycondensation of diamines and at least one kind of tetracarboxylic acid compound (including a tetracarboxylic acid compound analog such as an acid chloride compound or a tetracarboxylic dianhydride) or one kind of tricarboxylic acid compound (including a tricarboxylic acid compound analog such as an acid chloride compound or a tricarboxylic anhydride). Furthermore, a dicarboxylic acid compound (including an analog such as an acid chloride compound) may also take part in the polycondensation. The repeating structural unit represented by Formula (PI) or Formula (a') is usually derived from diamines and a tetracarboxylic acid compound. The repeating structural unit represented by Formula (a) is usually derived from diamines and a tricarboxylic acid compound. The repeating structural unit represented by Formula (b) is usually derived from diamines and a dicarboxylic acid compound.

Examples of the tetracarboxylic acid compound include an aromatic tetracarboxylic acid compound, an alicyclic tetracarboxylic acid compound, an acyclic aliphatic tetracarboxylic acid compound, and the like. Two or more kinds of these compounds may be used in combination. The tetracarboxylic acid compound is preferably tetracarboxylic dianhydride Examples of the tetracarboxylic dianhydride include an aromatic tetracarboxylic dianhydride, an alicyclic tetracarboxylic dianhydride, and an acyclic aliphatic tetracarboxylic dianhydride.

From the viewpoint of solubility of the imide-based polymer in a solvent and from the viewpoint of transparency and flexibility of the formed substrate, the tetracarboxylic acid compound is preferably an alicyclic tetracarboxylic acid compound, an aromatic tetracarboxylic acid compound, or the like. From the viewpoint of transparency and coloration inhibition of the substrate containing the imide-based polymer, the tetracarboxylic acid compound is preferably a compound selected from an alicyclic tetracarboxylic acid compound having a fluorine-based substituent and an aromatic tetracarboxylic acid compound having a fluorine-based substituent, and more preferably an alicyclic tetracarboxylic acid compound having a fluorine-based substituent.

Examples of the tricarboxylic acid compound include an aromatic tricarboxylic acid, an alicyclic tricarboxylic acid, an acyclic aliphatic tricarboxylic acid, an acid chloride compound or an acid anhydride that is structurally similar to these, and the like. The tricarboxylic acid compound is preferably selected from an aromatic tricarboxylic acid, an alicyclic tricarboxylic acid, an acyclic aliphatic tricarboxylic acid, and an acid chloride compound that is structurally similar to these. Two or more kinds of tricarboxylic acid compounds may be used in combination.

From the viewpoint of solubility of the imide-based polymer in a solvent and from the viewpoint of transparency and flexibility of the formed substrate containing the imide-based polymer, the tricarboxylic acid compound is preferably an alicyclic tricarboxylic acid compound or an aromatic tricarboxylic acid compound. From the viewpoint of transparency and coloration inhibition of the substrate containing the imide-based polymer, the tricarboxylic acid compound is more preferably an alicyclic tricarboxylic acid compound having a fluorine-based substituent or an aromatic tricarboxylic acid compound having a fluorine-based substituent.

Examples of the dicarboxylic acid compound include an aromatic dicarboxylic acid, an alicyclic dicarboxylic acid, an acyclic aliphatic dicarboxylic acid, an acid chloride compound or an acid anhydride that is structurally similar to these, and the like. The dicarboxylic acid compound is preferably selected from an aromatic dicarboxylic acid, an alicyclic dicarboxylic acid, an acyclic aliphatic dicarboxylic acid, and an acid chloride compound that is structurally similar to these. Two or more kinds of dicarboxylic acid compounds may be used in combination.

From the viewpoint of solubility of the imide-based polymer in a solvent and from the viewpoint of transparency and flexibility of the formed substrate containing the imide-based polymer, the dicarboxylic acid compound is preferably an alicyclic dicarboxylic acid compound or an aromatic dicarboxylic acid compound From the viewpoint of transparency and coloration inhibition of the substrate containing the imide-based polymer the dicarboxylic acid compound is more preferably an alicyclic dicarboxylic acid compound having a fluorine-based substituent or an aromatic dicarboxylic acid compound having a fluorine-based substituent.

Examples of the diamines include an aromatic diamine, an alicyclic diamine, and an aliphatic diamine. Two or more kinds of these may be used in combination. From the viewpoint of solubility of the imide-based polymer in a solvent and from the Viewpoint of transparency and flexibility of the formed substrate containing the imide-based polymer, the diamines are preferably selected from an alicyclic diamine and an aromatic diamine having a fluorine-based substituent.

In a case where such an imide-based polymer is used, it is easy to obtain a resin film having particularly excellent flexibility, high light transmittance (for example, equal to or higher than 85% and preferably equal to or higher than 88% for light at 550 nm), low Yellowness (YI value that is equal to or lower than 5 and preferably equal to or lower than 3), and low haze (equal to or lower than 1.5% and preferably equal to or lower than 1.0%).

The imide-based polymer may be a copolymer containing a plurality of different kinds of repeating structural units described above. The weight-average molecular weight of the polyimide-based polymer is generally 10,000 to 500,000 The weight-average molecular weight of the imide-based polymer is preferably 50,000 to 500,000, and more preferably 70,000 to 400,000. The weight-average molecular weight is a molecular weight measured by gel permeation chromatography (GPC) and expressed in terms of standard polystyrene. In a case where the weight-average molecular weight of the imide-based polymer is large, high flexibility tends to be easily obtained. However, in a case where the weight-average molecular weight of the imide-based polymer is too large, the viscosity of varnish increases, and hence workability tends to deteriorate.

The imide-based polymer may contain a halogen atom such as a fluorine atom which can be introduced into the polymer by the aforementioned fluorine-based substituent or the like. In a case where the polyimide-based polymer contains a halogen atom, the modulus of elasticity of the substrate containing the imide-based polymer can be improved, and the yellowness can be reduced. As a result, the occurrence of scratches, wrinkles, and the like in the resin film can be inhibited, and the transparency of the substrate containing the imide-based polymer can be improved. The halogen atom is preferably a fluorine atom. The content of the halogen atom in the polyimide-based polymer based on the mass of the polyimide-based polymer is preferably 1% to 40% by mass, and more preferably 1% to 30% by mass.

The substrate containing the imide-based polymer may contain one kind of ultraviolet absorber or two or more kinds of ultraviolet absorbers. The ultraviolet absorber can be appropriately selected from compounds that are generally used as ultraviolet absorbers in the field of resin materials. The ultraviolet absorber may include a compound that absorbs light having a wavelength equal to or shorter than 400 nm. Examples of the ultraviolet absorber that can be appropriately combined with the imide-based polymer include at least one kind of compound selected from the group consisting of a benzophenone-based compound, a salicylate-based compound, a benzotriazole-based compound, and a triazine-based compound.

In the present specification, "-based compound" means a derivative of the compound following "-based". For example, "benzophenone-based compound" refers to a compound having benzophenone as a base skeleton and a substituent bonded to the benzophenone.

The content of the ultraviolet absorber with respect to the total mass of the resin film is generally equal to or greater than 1% by mass, preferably equal to or greater than 2% by mass, and more preferably equal to or greater than 3% by mass. The content of the ultraviolet absorber with respect to the total mass of the resin film is generally equal to or smaller than 10% by mass, preferably equal to or smaller than 8% by mass, and even more preferably equal to or smaller than 6% by mass. In a case where the content of the ultraviolet absorber is within the above range, the weather fastness of a resin film can be improved.

The substrate containing the imide-based polymer may further contain an inorganic material such as inorganic particles. The inorganic material is preferably a silicon material containing silicon atoms. In a case where the substrate containing the imide-based polymer contains an inorganic material such as silicon material, it is easy to set the tensile modulus of elasticity of the substrate containing the imide-based polymer to a value equal to or higher than 4.0 GPa. However, mixing the substrate containing the imide-based polymer with an inorganic material is not the only way to control the tensile modulus of elasticity of the substrate.

Examples of the silicon material containing silicon atoms include silica particles, quaternary alkoxysilane such as tetraethyl orthosilicate (TEOS), and a silicon compound such as a silsesquioxane derivative. Among these silicon materials, from the viewpoint of transparency and flexibility of the substrate containing the imide-based polymer, silica particles are preferable.

The average primary particle size of the silica particles is generally equal to or smaller than 100 nm. In a case where the average primary particle size of the silica particles is equal to or smaller than 1(3 nm, the transparency tends to be improved.

The average primary particle size of the silica particles in the substrate containing the imide-based polymer can be determined by the observation with a transmission electron microscope (TEM). As the primary particle size of the silica particles, the Feret's diameter measured using a transmission electron microscope (TEM) can be adopted. The average primary particle size can be determined by measuring primary particle sizes at 10 spots by TEM observation and calculating the average thereof. The particle size distribution of the silica particles that have not yet form the substrate containing the imide-based polymer can be determined using a commercially available laser diffraction particle size distribution analyzer.

In the substrate containing the imide-based polymer, in a case where the total amount of the imide-based polymer and the inorganic material is regarded as 10, the mixing ratio of imide-based polymer:inorganic material based on mass is preferably 1:9 to 10:0, more preferably 3:7 to 10:0, even more preferably 3:7 to 8:2, and still more preferably 3:7 to 7:3. The ratio of the inorganic material to the total mass of the imide-based polymer and the inorganic material is generally equal to or higher than 20% by mass, and preferably equal to or higher than 30% by mass. The ratio of the inorganic material to the total mass of the imide-based polymer and the inorganic material is generally equal to or lower than 90% by mass, and preferably equal to or lower than 70% by mass. In a case where the mixing ratio of imide-based polymer:inorganic material (silicon material) is within the above range, the transparency and mechanical strength of the substrate containing the imide-based polymer tend to be improved. Furthermore, it is easy to set the tensile modulus of elasticity of the substrate containing the imide-based polymer to a value equal to or higher than 4.0 GPa.

As long as the transparency and flexibility are not markedly impaired, the substrate containing the imide-based polymer may further contain components other than the imide-based polymer and the inorganic material. Examples of components other than the imide-based polymer and the inorganic material include an antioxidant, a release agent, a stabilizer, a coloring agent such as a bluing agent, a flame retardant, a lubricant, a thickener, and a leveling agent. The ratio of components other than the imide-based polymer and the inorganic material to the mass of the resin film is preferably higher than 0% and equal to or lower than 20% by mass, and more preferably higher than 0% and equal to or lower than 10% by mass.

In a case where the substrate containing the imide-based polymer contains the imide-based polymer and the silicon material, Si/N which represents a ratio of the number of silicon atoms to the number of nitrogen atoms within at least one main surface 10a is preferably equal to or higher than 8. Si/N which represents the ratio of the number of atoms is a value calculated from the abundance of silicon atoms and the abundance of nitrogen atoms that are obtained by evaluating the composition of the substrate containing the imide-based polymer by X-ray photoelectron spectroscopy (XPS).

In a case where Si/N within the main surface 10a of the substrate containing the imide-based polymer is equal to or higher than 8, the adhesiveness between the substrate and a functional layer 20 which will be described later is sufficient. From the viewpoint of adhesiveness, Si/N is more preferably equal to or higher than 9, and even more preferably equal to or higher than 10. Si/N is preferably equal to or lower than 50, and more preferably equal to or lower than 40.

(Thickness of Substrate)

The thickness of the substrate is more preferably equal to or smaller than 100 µm, even more preferably equal to or smaller than 80 µm, and most preferably equal to or smaller than 50 µm. In a case where the substrate has a small thickness, the difference in curvature between the front surface and the back surface of the folded substrate is reduced. Therefore, cracks and the like hardly occur, and the substrate is hardly broken even being folded plural times. On the other hand, from the viewpoint of ease of handling of the substrate, the thickness of the substrate is preferably equal to or greater than 3 µm, more preferably equal to or greater than 5 µm, and most preferably equal to or greater than 15 µm.

(Method for Preparing Substrate)

The substrate may be prepared by heat-melting a thermoplastic polymer, or may be prepared from a solution, in which a polymer is uniformly dissolved, by solution film formation (a solvent casting method). In the case of heat-melting film formation, the softening material and various additives described above can be added during heat melting. In contrast, in a case where the substrate is prepared by the solution film formation method, the softening material and various additives described above can be added to the polymer solution (hereinafter, also referred to as dope) in each preparation step. Furthermore, the softening material and various additives may be added at any point in time in a dope preparation process. In the dope preparation process, a step of preparing the dope by adding the additives may be additionally performed as a final preparation step.

In order to protect the surface of the substrate or maintain the smoothness of the substrate, a protective film may be bonded to one surface or both surfaces of the substrate. As the protective film, a protective film is preferable which is obtained by laminating a pressure sensitive adhesive containing an antistatic agent on one surface of a support. In a case where such a protective film is used, it is possible to prevent dust from adhering to the substrate in a case where a hardcoat layer is formed after the protective film is peeled off.

<Hardcoat Layer>

The hardcoat layer of the hardcoat film according to the embodiment of the present invention will be described.

In the present invention, the hardcoat layer preferably contains a cured product of a polymerizable compound.

In the present invention, the hardcoat layer more preferably contains at least one kind of cured product selected from a cured product of polyorganosilsesquioxane (A) having a polymerizable group, a cured product of a compound (a2) having two or more (meth)acryloyl groups in one molecule, or a cured product of a compound (a3) having a polymerizable functional group and inorganic particles, and particularly preferably contains a cured product of polyorganosilsesquioxane (A) having a polymerizable group from the viewpoint of pencil hardness and resistance to repeated folding.

(Polyorganosilsesquioxane (A) Having Polymerizable Group)

The polymerizable group in the polyorganosilsesquioxane (A) having a polymerizable group is not particularly limited, but is preferably a radically or cationically polymerizable group. As the radically polymerizable group, a generally known radically polymerizable group can be used. For example, a (meth)acryloyl group is suitable as the radically polymerizable group. As the cationically polymerizable group, a generally known cationically polymerizable group can be used. Specifically, examples thereof include an alicyclic ether group, a cyclic acetal group, a cyclic lactone group, a cyclic thioether group, a spiro-orthoester group, a vinyloxy group, and the like. Among these, an alicyclic ether group and a vinyloxy group are suitable, an epoxy group, an oxetanyl group, and a vinyloxy group are particularly preferable, and an epoxy group is mostly preferably used.

The polyorganosilsesquioxane (A) having a polymerizable group is preferably polyorganosilsesquioxane (a1) having an epoxy group.

The cured product of the polyorganosilsesquioxane (a1) having an epoxy group is preferably obtained by curing a curable composition containing the polyorganosilsesquioxane (a1) having an epoxy group by heating and/or irradiation with ionizing radiation.

(Polyorganosilsesquioxane (a1) Having Epoxy Group)

The polyorganosilsesquioxane (a1) having an epoxy group (also referred to as "polyorganosilsesquioxane (a1)") is preferably polyorganosilsesquioxane which has at least a siloxane constitutional unit containing an epoxy group and is represented by General Formula (1).

In General Formula (1), Rb represents a group containing an epoxy group, and Rc represents a monovalent group q and r each represent a proportion of each of Rb and Rc in General Formula (1), q+r=100, q is greater than 0, and r is equal to or greater than 0 In a case where there is a plurality of Rb's and Rc's in General Formula (1), the plurality of Rb's and Rc's may be the same as or different from each other respectively. In a case where there is a plurality of Rc's in General Formula (1), the plurality of Rc's may form a bond with each other.

[$SiO_{1.5}$] in General Formula (1) represents a structural portion composed of a siloxane bond (Si—O—Si) in the polyorganosilsesquioxane.

The polyorganosilsesquioxane is a network-type polymer or polyhedral cluster having a siloxane constitutional unit derived from a hydrolyzable trifunctional silane compound, and can form a random structure, a ladder structure, a cage structure, and the like by a siloxane bond. In the present invention, although the structural portion represented by [$SiO_{1.5}$] may be any of the above structures, it is preferable that the structural portion contains many ladder structures. In a case where the ladder structure is formed, the deformation recovery of the hardcoat film can be excellently maintained. Whether the ladder structure is formed can be qualitatively determined by checking whether or not absorption occurs which results from Si—O—Si expansion/contraction unique to the ladder structure found at around 1,020 to 1,050 $cm^{-1}$ by Fourier Transform Infrared Spectroscopy (FT-IR).

In general Formula (1), Rb represents a group containing an epoxy group.

Examples of the group containing an epoxy group include known groups having an oxirane ring.

Rb is preferably a group represented by Formulas (1b) to (4b).

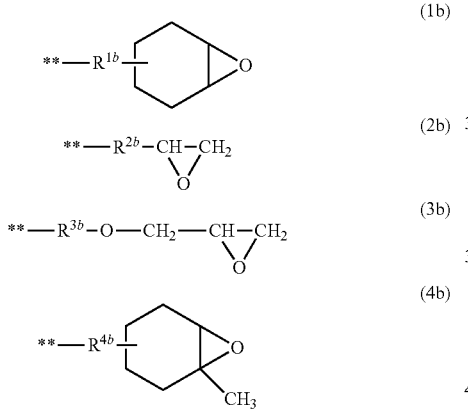

In Formulas (1b) to (4b), ** represents a portion linked to Si in General Formula (1), and $R^{1b}$, $R^{2b}$, $R^{3b}$, and $R^{4b}$ represent a substituted or unsubstituted alkylene group.

The alkylene group represented by $R^{1b}$, $R^{2b}$, $R^{3b}$, and $R^{4b}$ is preferably a linear or branched alkylene group having 1 to 10 carbon atoms, and examples thereof include a methylene group, a methyl methylene group, a dimethyl methylene group, an ethylene group an i-propylene group, a n-propylene group, a n-butylene group, a n-pentylene group, a n-hexylene group, a n-decylene group, and the like.

In a case where the alkylene group represented by $R^{1b}$, $R^{2b}$, $R^{3b}$, and $R^{4b}$ has a substituent, examples of the substituent include a hydroxyl group, a carboxyl group, an alkoxy group, an aryl group, a heteroaryl group, a halogen atom, a nitro group, a cyano group, a silyl group, and the like.

As $R^{1b}$, $R^{2b}$, $R^{3b}$, and $R^{4b}$ an unsubstituted linear alkylene group having 1 to 4 carbon atoms and an unsubstituted branched alkylene group having 3 or 4 carbon atoms are preferable, an ethylene group, a n-propylene group, or an i-propylene group is more preferable, and an ethylene group or an n-propylene group is even more preferable.

It is preferable that the polyorganosilsesquioxane (a1) has an alicyclic epoxy group (a group having a condensed ring structure of an epoxy group and an alicyclic group). Rb in General Formula (1) is preferably an alicyclic epoxy group, more preferably a group having an epoxycyclohexyl group, and even more preferably a group represented by Formula (1b).

Rb in General Formula (1) is derived from a group (a group other than an alkoxy group and a halogen atom; for example, Rb in a hydrolyzable silane compound represented by Formula (B) which will be described later, or the like) bonded to a silicon atom in the hydrolyzable trifunctional silane compound used as a raw material of the polyorganosilsesquioxane.

Specific examples of Rb are as below, but the present invention is not limited thereto. In the following specific examples, ** represents a portion linked to Si in General Formula (1).

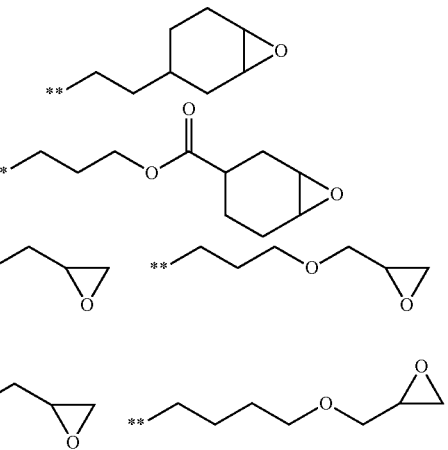

In General Formula (1), Rc represents a monovalent group

Examples of the monovalent group represented by Rc include a hydrogen atom, a substituted or unsubstituted alkyl group, a substituted or unsubstituted cycloalkyl group, a substituted or unsubstituted alkenyl group, a substituted or unsubstituted aryl group, or a substituted or unsubstituted aralkyl group.

Examples of the alkyl group represented by Rc include an alkyl group having 1 to 10 carbon atoms. Examples thereof include linear or branched alkyl groups such as a methyl group, an ethyl group, a propyl group, a n-butyl group, an isopropyl group, an isobutyl group, a s-butyl group, a t-butyl group, and an isopentyl group.

Examples of the cycloalkyl group represented by Rc include a cycloalkyl group having 3 to 15 carbon atoms. Examples thereof include a cyclobutyl group, a cyclopentyl group, a cyclohexyl group, and the like.

Examples of the alkenyl group represented by Rc include an alkenyl group having 2 to 10 carbon atoms. Examples of the alkenyl group include a linear or branched alkenyl group such as a vinyl group, an allyl group, or an isopropenyl group.

Examples of the aryl group represented by Rc include an aryl group having 6 to 15 carbon atoms. Examples thereof include a phenyl group, a tolyl group, a naphthyl group, and the like.

Examples of the aralkyl group represented by Rc include an aralkyl group having 7 to 20 carbon atoms. Examples thereof include a benzyl group, a phenethyl group, and the like.

Examples of the substituted alkyl group, substituted cycloalkyl group, substituted alkenyl group, substituted aryl group, and substituted aralkyl group described above include groups obtained in a case where some or all of hydrogen atoms or main chain skeletons in the alkyl group, cycloalkyl group, alkenyl group, aryl group, and aralkyl group described above are substituted with at least one kind of group selected from the group consisting of an ether group, an ester group, a carbonyl group, a halogen atom (such as a fluorine atom), an acryloyl group, a methacryloyl group, a mercapto group, and a hydroxy group (hydroxyl group), and the like.

Rc is preferably a substituted or unsubstituted alkyl group, and more preferably an unsubstituted alkyl group having 1 to 10 carbon atoms.

In a case where there is a plurality of Rc's in General Formula (1), the plurality of Rc's may form a bond with each other. The number of Rc's forming a bond with each other is preferably 2 or 3, and more preferably 2.

A group (Re) formed by the bonding of two Rc's is preferably an alkylene group formed by the bonding of the aforementioned substituted or unsubstituted alkyl groups represented by Rc.

Examples of the alkylene group represented by $Rc_2$ include linear or branched alkylene groups such as a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, a n-heptylene group, an isoheptylene group, a s-heptylene group, a t-heptylene group, a n-octylene group, an isooctylene group, a s-octylene group, and a t-octylene group.

The alkylene group represented by $Rc_2$ is preferably an unsubstituted alkylene group having 2 to 20 carbon atoms, more preferably an unsubstituted alkylene group having 2 to 20 carbon atoms, even more preferably an unsubstituted alkylene group having 2 to 8 carbon atoms, and particularly preferably a n-butylene group, a n-pentylene group, a n-hexylene group, a n-heptylene group, or a n-octylene group.

A group ($Rc_3$) formed by the bonding of three Rc's is preferably a trivalent group obtained in a case where any one of the hydrogen atoms in the alkylene group represented by $Rc_2$ is removed.

Rc in General Formula (1) is derived from a group (a group other than an alkoxy group and a halogen atom; for example, $R_{c1}$ to $R_{c3}$ in a hydrolyzable silane compound represented by Formulas (C1) to (C3) which will be described later, or the like) bonded to a silicon atom in the hydrolyzable silane compound used as a raw material of the polyorganosilsesquioxane.

In General Formula (1), q is greater than 0, and r is equal to or greater than 0.

q/(q+r) is preferably 0.5 to 1.0. In a case where the amount of the group represented by Rb is equal to or greater than 50% of the total amount of the groups represented by Rb and Rc contained in the polyorganosilsesquioxane (a1), the network composed of organic crosslinking groups is sufficiently formed. Therefore, the performances such as hardness and resistance to repeated folding can be excellently maintained.

q/(q+r) is more preferably 0.7 to 1.0, even more preferably 0.9 to 1.0, and particularly preferably 0.95 to 1.0.

It is also preferable that there is a plurality of Rc's in General Formula (1), and the plurality of Rc's form a bond with each other. In this case, r/(q+r) is preferably 0.005 to 0.20.

r/(q+r) is more preferably 0.005 to 0.10, even more preferably 0.005 to 0.05, and particularly preferably 0.005 to 0.025.

The number-average molecular weight (Mn) of the polyorganosilsesquioxane (a1) that is measured by gel permeation chromatography (GPC) and expressed in terms of standard polystyrene is preferably 500 to 6,000, more preferably 1,000 to 4,500, and even more preferably 1-50 to 3,000.

The molecular weight dispersity (Mw/Mn) of the polyorganosilsesquioxane (a1) that is measured by GPC and expressed in terms of standard polystyrene is, for example, 1.0 to 4.0, preferably 1.1 to 3.7, more preferably 1.2 to 3.0, and even more preferably 1.3 to 2.5 Mn represents a number-average molecular weight.

The weight-average molecular weight and the molecular weight dispersity of the polyorganosilsesquioxane (a1) were measured using the following device under the following conditions.

Measurement device: trade name "LC-20AD" (manufactured by Shimadzu Corporation)
Columns: two Shodex KF-801 columns, KF-802, and KF-803 (manufactured by SHOWA DENKO K.K.)
Measurement temperature: 40° C.
Eluent: tetrahydrofuran (THF), sample concentration of 0.1% to 0.2% by mass
Flow rate: 1 mL/min
Detector: UV-VIS detector (trade name "SPD-20A", manufactured by Shimadzu Corporation)
Molecular weight: expressed in terms of standard polystyrene <Method for Manufacturing Polyorganosilsesquioxane (a1)>

The polyorganosilsesquioxane (a1) can be manufactured by a known manufacturing method and is not particularly limited. The polyorganosilsesquioxane (a1) can be manufactured preferably by a method of hydrolyzing and condensing one kind of hydrolyzable silane compound or two or more kinds of hydrolyzable silane compounds. As the hydrolyzable silane compound, it is preferable to use a hydrolyzable trifunctional silane compound (a compound represented by Formula (B)) for forming a siloxane constitutional unit containing an epoxy group.

In a case where r in General Formula (1) is greater than 0, as the hydrolyzable silane compounds, it is preferable to use the compounds represented by Formula (C1), (C2), or (C3) in combination.

$$Rb-Si(X^2)_3 \quad (B)$$

Rb in Formula (B) has the same definition as Rb in General Formula (1), and preferred examples thereof are also the same.

$X^2$ in Formula (B) represents an alkoxy group or a halogen atom.

Examples of the alkoxy group represented by $X^2$ include an alkoxy group having 1 to 4 carbon atoms such as a methoxy group, an ethoxy group, a propoxy group, an isopropyloxy group, a butoxy group, and an isobutloxy group.

Examples of the halogen atom represented by $X^2$ include a fluorine atom, a chlorine atom, a bromine atom, an iodine atom, and the like.

As $X^2$, an alkoxy group is preferable, and a methoxy group and an ethoxy group are more preferable. Three $X^2$'s may be the same as or different from each other.

The compound represented by Formula (B) is a compound forming a siloxane constitutional unit having Rb.

 (C1)

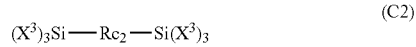 (C2)

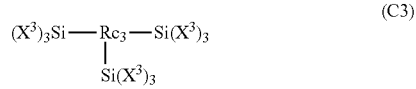 (C3)

$Rc_1$ in Formula (C1) has the same definition as Rc in General Formula (1), and preferred examples thereof are also the same.

$Rc_2$ in Formula (C2) has the same definition as the group ($Rc_2$) formed in a case where two Rc's in General Formula (1) are bonded to each other, and preferred examples thereof are also the same.

$Rc_3$ in Formula (C3) has the same definition as the group ($Rc_3$) formed in a case where three Rc's in General Formula (1) are bonded to each other, and preferred examples thereof are also the same.

$X^3$ in Formulas (C1) to (C3) has the same definition as $X^2$ in Formula (B), and preferred examples thereof are also the same. The plurality of $X^3$'s may be the same as or different from each other.

As the hydrolyzable silane compound, hydrolyzable silane compounds other than the compounds represented by Formulas (B) and (C1) to (C3) may be used in combination. Examples thereof include a hydrolyzable trifunctional silane compound, a hydrolyzable monofunctional silane compound, a hydrolyzable difunctional silane compound, and the like other than the compounds represented by Formulas (B) and (C1) to (C3).

In a case where Rc is derived from $Rc_1$ to $Rc_3$ in the hydrolyzable silane compounds represented by Formulas (C1) to (C3), in order to adjust q/(q+r) in General Formula (1), a mixing ratio (molar ratio) among the compounds represented by Formulas (B) and (C) to (C3) may be adjusted.

Specifically, for example, in order to adjust q/(q+r) to 0.5 to 1.0, a value represented by the following (Z2) may be set to 0.5 to 1.0, and a method of hydrolyzing and condensing these compounds may be used to manufacture the polyorganosilsesquioxane (a1).

(Z2)={compound represented by Formula (B) (molar amount)}/{compound represented by Formula (B) (molar amount)+compound represented by Formula (C1) (molar amount)+compound represented by Formula (C2) (molar amount)×2+ compound represented by Formula (C3) (molar amount)×3}

The amount of the above hydrolyzable silane compounds used and the composition thereof can be appropriately adjusted according to the desired structure of the polyorganosilsesquioxane (a1).

Furthermore, the hydrolysis and condensation reactions of the hydrolyzable silane compounds can be performed simultaneously or sequentially. In a case where the above reactions are sequentially performed, the order of performing the reactions is not particularly limited.

The hydrolysis and condensation reactions of the hydrolyzable silane compounds can be carried out in the presence or absence of a solvent, and are preferably carried out in the presence of a solvent.

Examples of the solvent include aromatic hydrocarbons such as benzene, toluene, xylene, and ethylbenzene, ethers such as diethyl ether, dimethoxyethane, tetrahydrofuran, and dioxane: ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile, alcohols such as methanol, ethanol, isopropyl alcohol, and butanol, and the like.

As the solvent, ketones or ethers are preferable. One kind of solvent can be used singly, or two or more kinds of solvents can be used in combination.

The amount of the solvent used is not particularly limited, and can be appropriately adjusted according to the desired reaction time or the like such that the amount falls into a range of 0 to 2.000 parts by mass with respect to the total amount (100 parts by mass) of the hydrolyzable silane compounds.

The hydrolysis and condensation reactions of the hydrolyzable silane compounds are preferably performed in the presence of a catalyst and water. The catalyst may be an acid catalyst or an alkali catalyst.

Examples of the acid catalyst include mineral acids such as hydrochloric acid, sulfuric acid, nitric acid, phosphoric acid, and boric acid; phosphoric acid esters; carboxylic acids such as acetic acid, formic acid, and trifluoroacetic acid; sulfonic acids such as methanesulfonic acid, trifluoromethanesulfonic acid, and p-toluenesulfonic acid, solid acids such as activated clay: Lewis acids such as iron chloride, and the like.

Examples of the alkali catalyst include alkali metal hydroxides such as lithium hydroxide, sodium hydroxide, potassium hydroxide, and cesium hydroxide; alkali earth metal hydroxides such as magnesium hydroxide, calcium hydroxide, and barium hydroxide; alkali metal carbonate such as lithium carbonate, sodium carbonate, potassium carbonate, and cesium carbonate; alkali earth metal carbonates such as magnesium carbonate; alkali metal hydrogen carbonates such as lithium hydrogen carbonate, sodium hydrogen carbonate, potassium hydrogen carbonate, and cesium hydrogen carbonate; alkali metal organic acid salts (for example, acetate) such as lithium acetate, sodium acetate, potassium acetate, and cesium acetate; alkali earth metal organic acid salts (for example, acetate) such as magnesium acetate; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines (tertiary amines and the like) such as triethylamine. N-methylpiperidine, 1,8-diazabicyclo[5.4.0]undec-7-ene, and 1,5-diazabicyclo[4.3.0]non-5-ene; nitrogen-containing aromatic heterocyclic compounds such as pyridine, 2,2'-bipyridyl, and 1,10-phenanthroline, and the like.

One kind of catalyst can be used singly, or two or more kinds of catalysts can be used in combination. Furthermore, the catalyst can be used in a state of being dissolved or dispersed in water, a solvent, or the like.

The catalyst is preferably a base catalyst. In a case where a base catalyst is used, the condensation rate of the polyorganosilsesquioxane can be increased, and an excellent deformation recovery rate can be maintained after curing.

The amount of the catalyst used is not particularly limited, and can be appropriately adjusted within a range of 0.002 to 0.200 mol with respect to the total amount (1 mol) of the hydrolyzable silane compounds.

The amount of water used in the above hydrolysis and condensation reactions is not particularly limited, and can be appropriately adjusted within a range of 0.5 to 20 mol with respect to the total amount (1 mol) of the hydrolyzable silane compounds.

The method of adding water is not particularly limited. The entirety of water to be used (total amount of water to be used) may be added at once or added sequentially. In a case where water is added sequentially, the water may be added continuously or intermittently.

As the reaction conditions for performing the hydrolysis and condensation reactions of the hydrolyzable silane compounds, it is particularly important to select reaction conditions such that the condensation rate of the polyorganosilsesquioxane (a1) is equal to or higher than 80%. The reaction temperature of the hydrolysis and condensation reactions is, for example, 40° C. to 100° C. and preferably 45° C. to 80° C. In a case where the reaction temperature is controlled within the above range, the condensation rate tends to be controlled and become equal to or higher than 80%. The reaction time of the hydrolysis and condensation reactions is, for example, 0.1 to 10 hours and preferably 1.5 to 8 hours. Furthermore, the hydrolysis and condensation reactions can be carried out under normal pressure or wider pressure that is increased or reduced. The hydrolysis and condensation reactions may be performed, for example, in any of a nitrogen atmosphere, an inert gas atmosphere such as argon gas atmosphere, or an aerobic atmosphere such as an air atmosphere. Among these, the inert gas atmosphere is preferable.

By the hydrolysis and condensation reactions of the hydrolyzable silane compounds described above, the polyorganosilsesquioxane (a1) is obtained. After the hydrolysis and condensation reactions are finished, it is preferable to neutralize the catalyst so as to inhibit the ring opening of the epoxy group. In addition, the polyorganosilsesquioxane (a1) may be separated and purified by a separation method such as rinsing, acid cleaning, alkali cleaning, filtration, concentration, distillation, extraction, crystallization, recrystallization, or column chromatographs, or by a separation method using these in combination.

In the hardcoat layer of the hardcoat film according to the embodiment of the present invention, from the viewpoint of hardness of the film, the condensation rate of the polyorganosilsesquioxane (a1) is preferably equal to or higher than 80%. The condensation rate is more preferably equal to or higher than 90%, and more preferably equal to or higher than 95%.

In a case where the $^{29}$Si nuclear magnetic resonance (NMR) spectrum is measured for a hardcoat film sample having the hardcoat layer containing the cured product of the polyorganosilsesquioxane (a1), the condensation rate can be calculated using the measurement result.

In the cured product of the polyorganosilsesquioxane (a1) having an epoxy group, it is preferable that the epoxy group undergoes ring opening by a polymerization reaction.

In the hardcoat layer of the hardcoat film according to the embodiment of the present invention, from the viewpoint of hardness of the film, the ring opening rate of the epoxy group in the cured product of the polyorganosilsesquioxane (a1) is preferably equal to or higher than 40%. The ring opening rate is more preferably equal to or higher than 50%, and even more preferably equal to or higher than 60%.

The ring opening rate can be obtained by analyzing a composition for forming a hardcoat laser containing polyorganosilsesquioxane (a1) by means of Fourier transform infrared spectroscopy (FT-IR) single reflection attenuated total reflection (ATR) before and after the sample is totally cured and treated with heat. From the change in the height of a peak resulting from the epoxy group, the ring opening rate can be calculated.

One kind of polyorganosilsesquioxane (a1) may be used singly, or two or more kinds of polyorganosilsesquioxane (a1) having different structures may be used in combination.

In a case where the hardcoat layer in the present invention contains the cured product of the polyorganosilsesquioxane (A) having a polymerizable group as a cured product of a polymerizable compound, the content rate of the cured product of the polyorganosilsesquioxane (A) having a polymerizable group with respect to the total mass of the hardcoat layer is preferably equal to or higher than 50% by mass and equal to or lower than 100% by mass, more preferably equal to or higher than 70% by mass and equal to or lower than 100% by mass, and even more preferably equal to or higher than 80% by mass and equal to or lower than 100% by mass.

In a case where the hardcoat layer in the present invention contains the cured product of the polyorganosilsesquioxane (A) having a polymerizable group as a cured product of a polymerizable compound, the hardcoat layer may additionally contain a dispersant, an antifouling agent, an antistatic agent, an ultraviolet absorber, an antioxidant, and the like.

The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd) using a polythiophene conductive polymer or the like can be preferably used.

Furthermore, the hardcoat layer in the present invention may contain a cured product of a compound (a2) having two or more (meth)acryloyl groups in one molecule.

(Compound (a2) Having Two or More (Meth)Acryloyl Groups in One Molecule)

The cured product of the compound (a2) having two or more (meth)acryloyl groups in one molecule is preferably obtained by curing a curable composition containing a compound having two or more (meth)acryloyl groups in one molecule by means of heating and/or irradiation with ionizing radiation.

The compound (a2) having two or more (meth)acryloyl groups in one molecule (also referred to as "polyfunctional (meth)acrylate compound (a2)") is preferably a compound having three or more (meth)acryloyl groups in one molecule.

The poly functional (meth)acrylate compound (a2) may be a crosslinkable monomer, a crosslinkable oligomer, or a crosslinkable polymer.

The polyfunctional (meth)acrylate compound (a2) has the same definition as the polyfunctional (meth)acrylate compound (b2) which will be described later, and the preferred ranges thereof are also the same.

One kind of polyfunctional (meth)acylate compound (a2) may be used singly, or two or more kinds of polyfunctional (meth)acrylate compounds (a2) having different structures may be used in combination.

In a case where the hardcoat layer in the present invention contains the cured product of the polyfunctional (meth)acrylate compound (a2) as a cured product of a polymerizable compound, the content rate of the cured product of the polyfunctional (meth)acrylate compound (a2) with respect to the total mass of the hardcoat layer is preferably equal to or higher than 50% by mass and equal to or lower than 100% by mass, more preferably equal to or higher than 70% by mass and equal to or lower than 100% by mass, and even more preferably equal to or higher than 80% by mass and equal to or lower than 100% by mass.

Furthermore, the hardcoat layer in the present invention may contain a cured product of a compound (a3) having a polymerizable functional group and inorganic particles.

In a case where the hardcoat layer in the present invention contains the cured product of the compound (a3) having a polymerizable functional group and inorganic particles, it is preferable that the inorganic particles are contained in a matrix (a3) containing the cured product of the compound (a3) having a polymerizable functional group.

(Matrix (a3))

From the viewpoint of resistance to repeated folding, an indentation modulus $E_M$ of the matrix (a3) is preferably equal to or lower than 1.5 GPa, more preferably equal to or lower than 1.0 GPa, and even more preferably equal to or lower than 0.5 GPa. For determining the indentation modulus $E_M$ of the matrix (a3), a layer obtained by curing the following composition for forming a matrix (a3) is subjected to an indentation test in which load is vertically applied to the layer by using a knoop indenter made of diamond, and an indentation modulus at a point in time when the indentation depth accounts for 2% of the thickness of the matrix layer is adopted as the indentation modulus $E_M$.

The matrix (a3) is preferably a polymer (cured product) obtained by polymerizing the composition for forming a matrix (a3) containing the compound (a3) having a polymerizable functional group by means of irradiation with ionizing radiation or heating. Furthermore, in order for the indentation modulus $E_M$ to be in the above range, a polymerizable functional group equivalent in the composition for forming a matrix (a3) is preferably equal to or higher than 250. In a case where the polymerizable functional group equivalent in the composition for forming a matrix (a3) is too high, the chemical bonds between the surface of the inorganic particles, which will be described later, and a modified functional group are reduced, and accordingly, sometimes hardness or resistance to repeated folding deteriorates. However, by appropriately setting the average primary particle diameter of the inorganic particles or appropriately selecting the surface modifier, it is possible to compensate for the bonds.

A polymerizable functional group equivalent e in the composition for forming a matrix (a3) is calculated by Equation (4). In the equation, for a component 1, a component 2, ..., and a component n contained in composition for forming a matrix (a3), the mass ratio of the components is represented by $R_1$, $R_2$, ..., and $R_n$ respectively, the weight-average molecular weight of the components is represented by $M_1$, $M_2$, ..., and $M_N$ respectively, and the number of polymerizable functional groups in one molecule of the components is represented by $C_1$, $C_2$ ..., and $C_n$ respectively $$e = \frac{1}{\sum_{k=1}^{n}\left(\frac{R_n}{M_n} \times C_n\right)} \quad (4)$$

(Compound (a3) Having Polymerizable Functional Group)

As the compound (a3) having a polymerizable functional group, various monomers, oligomers, or polymers can be used. As the polymerizable functional group (polymerizable group), a photopolymerizable functional group, an electron beam-polymerizable functional group, and a radiation-polymerizable functional group are preferable. Among these, a photopolymerizable functional group is preferable.

Examples of the photopolymerizable functional group include a polymerizable unsaturated group (carbon-carbon unsaturated double bond group) such as a (meth)acryloyl group, a vinyl group, a styryl group, or an allyl group, a ring-opening polymerizable group such as an epoxy group or an oxetanyl group, and the like. Among these, a (meth)acryloyl group is preferable.

Specific examples of the compound having a (meth)acryloyl group include (meth)acrylic acid diesters of alkylene glycols such as neopentyl glycol acrylate, 1,6-hexanediol (meth)acrylate, and propylene glycol di(meth)acrylate;

(meth)acrylic acid diesters of polyoxyalkylene glycols such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohols such as pentaerythritol di(meth)acrylate;

(meth)acrylic acid diesters of ethylene oxide or propylene oxide adducts such as 2,2-bis{4-(acryloxy-diethoxy)phenyl}propane and 2-2-bis{4-(acryloxy-polypropoxy)phenyl}propane; and the like. Furthermore, epoxy (meth)acrylates, urethane (meth)acrylates, and polyester (meth)acrylates are also preferably used as photopolymerizable monomers.

In order that the polymerizable functional group equivalent in the composition for forming a matrix (a3) is equal to or higher than 250, the compound having a polymerizable functional group is preferably a compound having a polymerizable functional group equivalent equal to or higher than 250. In addition, two or more kinds of compounds having a polymerizable functional group may be used in combination. In this case, a compound having a polymerizable functional group equivalent equal to or higher than 250 and a compound having a polymerizable functional group equivalent equal to or lower than 250 may be used in combination such that the polymerizable functional group equivalent in the composition for forming a matrix (a3) is adjusted to be equal to or higher than 250.

In a case where the compound (a3) having a polymerizable functional group is a monomer, the number of polymerizable functional groups in one molecule of the compound (a3) is preferably equal to or greater than 1 and equal to or smaller than 6, more preferably equal to or greater than 1 and equal to or smaller than 3, and particularly preferably 2. In a case where the compound (a3) having a polymerizable functional group is an oligomer or a polymer, the compound (a3) may have the polymerizable functional group at the terminal of the main chain or on a side chain.

Specific examples of the compound having a polymerizable functional group equivalent equal to or higher than 250 include DPCA-120 manufactured by Nippon Kayaku Co., Ltd. (molecular weight: 1,947, number of polymerizable functional groups: 6, polymerizable functional group equivalent: 325). SHIKOH UV-3000B (molecular weight: 18,000, number of functional groups: 2, functional group equivalent; 9,000, UV-3200B (molecular weight 10,000, number of functional groups: 2, functional group equivalent: 5000), UV-3210EA (molecular weight 9,000, number of functional groups: 2, functional group equivalent: 4,500), UV-3310B (molecular weight: 5,000, number of functional groups: 2, functional group equivalent: 2,500), UV-3700B (molecular weight: 38.0), number of functional groups: 2, functional group equivalent: 19,000), UV-6640B (molecular weight: 5,000), number of functional groups: 2, functional group equivalent: 2,500), UV-2000B (molecular weight: 13,000, number of functional groups: 2, functional group equivalent 6,500), and UV-2750B (molecular weight: 3,000, number of functional groups: 2, functional group equivalent 1,500) manufactured by The Nippon Synthetic Chemical Industry Co., Ltd., ATM-35E (molecular weight: 1,892, number of functional groups: 4, functional group equivalent: 473) A-GLY-9E (molecular weight: 811, number of functional groups: 3, functional group equivalent: 270), A-GLY-20E (molecular weight: 1,295, number of functional groups: 3, functional group equivalent: 432), A-400 (molecular weight: 508, number of functional groups: 2, functional group equivalent: 254), A-600 (molecular weight: 708, number of functional groups: 2, functional group equivalent: 354), A-1000 (molecular weight: 1,108, number of functional groups: 2, functional group equivalent 554), UA-160TM (molecular weight: 2,700, number of functional groups: 2, functional group equivalent: 1,350), UA-290TM (molecular weight: 2,900, number of functional groups: 2, functional group equivalent: 1,450), UA-4200 (molecular weight: 1000, number of functional groups: 2, functional group equivalent: 500), and UA-4400 (molecular weight. 1.400, number of functional groups: 2, functional group equivalent: 700) manufactured by SHIN-NAKAMURA CHEMICAL CO., LTD., and the like.

(Polymerization Initiator)

The composition for forming a matrix (a3) may contain a polymerization initiator.

In a case where the compound (a3) having a polymerizable functional group is a photopolymerizable compound, it is preferable that the composition contains a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, coumarins, and the like. Specific examples, preferred embodiments, commercial products, and the like of the photopolymerization initiator are described in paragraphs "0133" to "0151" of JP2009-098658A. and these can be suitably used in the present invention as well.

Various examples of the photopolymerization initiator are also described in "Latest JV Curing Technology" {TECHNICAL INFORMATION INSTITUTE CO. LTD} (1991), p. 159 and "Ultraviolet Curing System", Kiyomi Kato (1989, SOGO GIJUTSU CENTER), p. 65-148,), which are useful in the present invention.

The content rate of the polymerization initiator in the composition for forming a matrix (a3) with respect to the total solid content in the composition for forming a matrix (a3) is preferably 0.5% to 8% by mass, and more preferably 1% to 5% by mass (Other Additives)

The composition for forming a matrix (a3) may contain components other than the above, for example, a dispersant, a leveling agent, an antifouling agent, an antistatic agent, an ultraviolet absorber, an antioxidant, and the like. The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd.) using a polythiophene conductive polymer or the like can be preferably used (Inorganic Particles)

The addition of inorganic particles to the hardcoat layer can increase hardness. Examples of the inorganic particles include silica particles, titanium dioxide particles, zirconia particles, aluminum oxide particles, diamond powder, sapphire particles, boron carbide particles, silicon carbide particles, antimony pentoxide particles, and the like. Among these, from the viewpoint of ease of modification, silica particles and zirconia particles are preferable.

It is preferable to treat the surface of the inorganic particles with a surface modifier having an organic segment. It is preferable that the surface modifier has a functional group which can form a bond with the inorganic particles or can be adsorbed onto the inorganic particles and a functional group which has high affinity with organic components in the same molecule. As the surface modifier having a functional group which can form a bond with the inorganic particles or can be adsorbed onto the inorganic particles, a metal alkoxide surface modifier such as silane, aluminum, titanium or zirconium and a surface modifier having an anionic group such as a phosphoric acid group, a sulfuric acid group, a sulfonic acid group, or a carboxylic acid group are preferable. Among these, from the viewpoint of ease of modification, a silane alkoxide surface modifier (silane coupling agent) is preferable. The functional group having high affinity with organic components may be simply a matrix component that has both the hydrophilicity and hydrophobicity. However, this functional group is preferably a functional group that can form a chemical bond with a matrix component, and particularly preferably an ethylenically unsaturated double bond group or a ring-opening polymerizable group. In the present invention, the surface modifier for the inorganic particles is preferably a curable resin having a metal alkoxide or an anionic group and an ethylenically unsaturated double bond group or a ring-opening polymerizable group in the same molecule. The number of ethylenically unsaturated double bond groups or ring-opening polymerizable groups in the same molecule is preferably equal to or greater than 1.0 and equal to or smaller than 5.0, and more preferably equal to or greater than 1.1 and equal to or smaller than 3.0. In a case where the number of ethylenically unsaturated double bond groups or the ring-opening polymerizable groups in the same molecule is within the above range, a strong bond can be formed between the matrix components and the inorganic particles.

Specific examples of the silane coupling agent include silane coupling agents having an ethylenically unsaturated double bond group such as 3-(meth)acryloxypropyltrimethoxysilane, 3-(meth)acryloxypropylmethyldimethoxysilane, 3-(meth)acryloxypropyldimethylmethoxsilane 3-(meth)acryloxypropylmethyldiethoxysilane, 3-(meth)acryloxypropyltriethoxysilane, 2-(meth)acryloxyethyltrimethoxysilane. 2-(meth)acryloxyethyltriethoxysilane, 4-(meth)acrvloxybutyltrimethoxysilane and 4-(meth)acnloxybutyltriethoxs silane, and silane coupling agents having a ring-opening polymerizable group such as 2-(3,4-epoxycyclohexyl)ethyltrimethoxysilane and 3-glycidoxypropyltrimethoxysilane. More specifically, examples thereof include KBM-303, KBM-403, KBM-503, KBM-5103 (all manufactured by Shin-Etsu Chemical Co., Ltd.), silane coupling agents C-1 and C-2 represented by the following structural formulas, and the like.

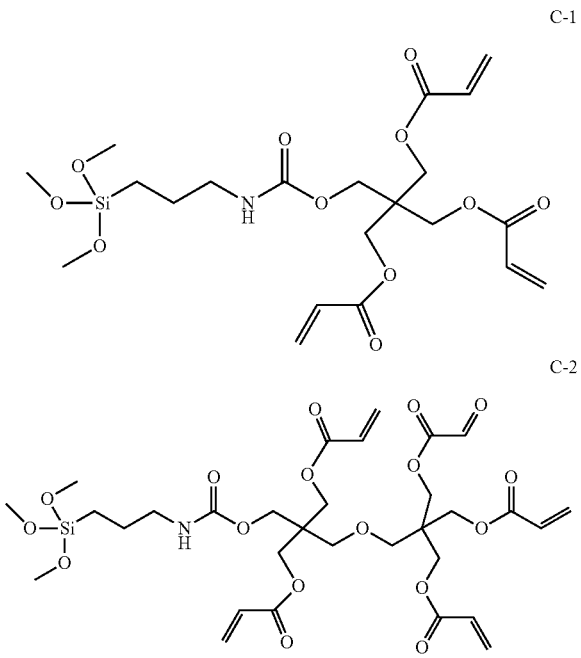

The number of molecules of the surface modifier bonded with or adsorbed onto the surface of the inorganic particles is preferably 0.2 to 4.0 per surface area of 1 nm² of the inorganic particles, more preferably 0.5 to 3.0 per 1 nm², and even more preferably 0.8 to 2.0 per 1 nm².

The surface modification of these inorganic particles is preferably performed in a solution. The surface modification may be performed by a method of synthesizing inorganic particles in a solution, then adding a surface modifier thereto, and stirring the solution, a method of mechanically finely dispersing inorganic particles in a solution together with a surface modifier, a method of finely dispersing inorganic particles in a solution, then adding a surface modifier thereto, and stirring the solution, or a method of performing surface modification before finely dispersing inorganic particles in a solution (if necessary, heating, drying followed by heating, or pH change is performed) and then finely dispersing the particles. As the solution for dissolving the surface modifier, an organic solvent having high polarity is preferable. Specifically, examples thereof include known solvents such as an alcohol, a ketone, and an ester.

The average primary particle diameter of the inorganic particles is 3 to 100 nm, preferably 4 to 50 nm, and more preferably 5 to 20 nm. In a case where the average primary particle diameter is within the above range, a strong bond can be formed between the matrix components and the inorganic particles.

The average primary particle diameter of the inorganic particles in the hardcoat film is determined by a method in which the hardcoat film is sliced to obtain a thin sample, a cross section of the thin sample is observed using a transmission electron microscope (TEM) at an appropriate magnification (about 400,000×), a particle diameter is measured for each of 100 primary particles, the volume of the particles is calculated, and the particle diameter on cumulative 50% is adopted as the average primary particle diameter. In a case where the particles are not spherical, the average of the major axis and minor axis thereof is regarded as the diameter of the primary particles. The thin sample can be prepared by a microtome method using a cross section cutting device ultramicrotome, a thin slice preparation process using a focused ion beam (FIB) device, or the like. In a case where powder particles or particles in a particle dispersion are measured, the powder particles or the particle dispersion is observed with TEM as described above, and the average primary particle diameter thereof is calculated.

Only one kind of inorganic particles may be used, or two or more kinds of inorganic particles may be used in combination. In a case where two or more kinds of inorganic particles are used in combination, from the viewpoint of increasing a volumetric filling rate of the particles in the hardcoat layer, it is preferable to use inorganic particles having different particle diameters.

In a case where the hardcoat layer in the present invention contains the cured product of the compound (a3) having a polymerizable functional group and inorganic particles as a cured product of a polymerizable compound, the volume ratio of the inorganic particles in the hardcoat layer is preferably equal to or higher than 50% by volume.

From the viewpoint of particle strength, the inorganic particles are preferably solid particles. As the inorganic particles, spherical particles are most preferable. However, the inorganic particles may be non-spherical particles such as amorphous particles.

In a case where the hardcoat layer in the present invention contains the cured product of the compound (a3) having a polymerizable functional group and inorganic particles as a cured product of a polymerizable compound, the content rate of the cured product of the compound (a3) having a polymerizable functional group and the inorganic particles with respect to the total mass of the hardcoat layer is preferably equal to or higher than 50% by mass and equal to or lower than 100% by mass, more preferably equal to or higher than 70% by mass and equal to or lower than 100% by mass, and even more preferably equal to or higher than 80% by mass and equal to or lower than 100% by mass.

(Other Additives)

The hardcoat layer may contain components other than the above, for example, a dispersant, a leveling agent, an antifouling agent, an antistatic agent, an ultraviolet absorber, an antioxidant, and the like. The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co, Ltd.) using a polythiophene conductive polymer or the like can be preferably used.

The leveling agent is not particularly limited. As the leveling agent, a polymer can be preferably used which is obtained by polymerizing a monomer having two or more groups having a radically polymerizable double bond, has a weight-average molecular weight of 1,000 to 50,000, and has at least any one structure selected from a fluorine atom, a silicon atom, or a linear or branched alkyl group having three or more carbon atoms.

Hereinafter, the monomer having two or more groups having a radically polymerizable double bond will be also referred to as "monomer (K1)".

Furthermore, the polymer which is obtained by polymerizing the monomer (K1) having two or more groups having a radically polymerizable double bond, has a weight-average molecular weight of 1,000 to 50.000, and has at least any one structure selected from a fluorine atom, a silicon atom, or a linear or branched alkyl group having three or more carbon atoms will be also referred to as "polymer (X)".

<Monomer (K1)>

—Group Having Radically Polymerizable Double Bond—

The monomer (K1) contains two or more groups having radically polymerizable double bonds. In a case where the monomer (K1) contains two or more groups having radically polymerizable double bonds, the polymer (X has a branched structure, and the compatibility with a curable component (polyorganosilsesquioxane having a polymerizable group) and the like contained in a composition containing the polymer (X) is improved.

The groups having radically polymerizable double bonds contained in the monomer (K1) are not particularly limited. The two or more groups having radically polymerizable double bonds contained in the monomer (K1) may be the same as or different from each other.

The number of groups having radically polymerizable double bonds contained in the monomer (K1) is preferably equal to or greater than 3, more preferably equal to or greater than 3 and equal to or smaller than 9, and even more preferably equal to or greater than 3 and equal to or smaller than 6. In a case where the monomer (K1) has three or more groups having radically polymerizable double bonds, the polymer (X) has a highly branched structure, and the molecular chains of the polymer (X) are less intertwined Therefore, the compatibility with a curable component or the solubility in various organic solvents is improved. As a result, the homogeneous coating properties of the composition or the surface condition of the obtained coating film is improved. In addition, in a case where the monomer (K1) has nine or less groups having radically polymerizable double bonds, it is possible to prevent the molecular weight from increasing too much to maintain the solubility in a solvent.

The group having a radically polymerizable double bond is preferably any of the groups represented by General Formulas (Z1) to (Z6). In the monomer (K1), the plurality of groups having radically polymerizable double bonds may be the same as or different from each other.

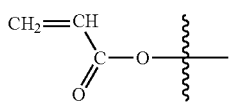
(Z1)

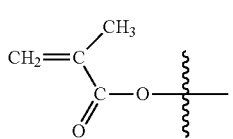
(Z2)

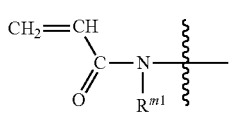
(Z3)

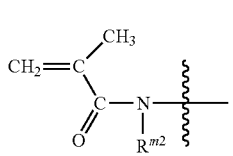
(Z4)

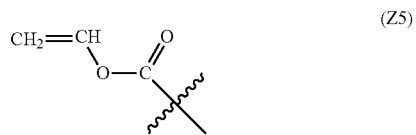
(Z5)

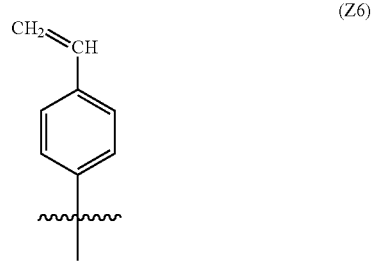
(Z6)

$R^{m1}$ in General Formula (Z3) and $R^{m2}$ in General Formula (Z4) each independently represent a hydrogen atom or an alkyl group having 1 to 20 carbon atoms.

Each of $R^{m1}$ in General Formula (Z3) and $R^{m2}$ in General Formula (Z4) is preferably a hydrogen atom or an alkyl group having 1 to 7 carbon atoms, more preferably a hydrogen atom or an alkyl group having 1 to 4 carbon atoms, and even more preferably a hydrogen atom, a methyl group, or an ethyl group.

The group having a radically polymerizable double bond is preferably a group represented by General Formula (Z1), (Z2), (Z3), or (Z4), and more preferably a group represented by General Formula (Z1) or (Z2).

The group represented by General Formula (Z3) or (Z4) is a group containing a radically polymerizable double bond and a nitrogen atom.

—Nitrogen Atom—

It is preferable that the monomer (K1) contains at least one nitrogen atom. In a case where the monomer (K) contains a nitrogen atom, the polymer (X) also has the nitrogen atom. As a result, the compatibility between the polymer (X) and a curable component and the like contained in the composition containing the polymer (X) is improved. Particularly, in a case where the polymer (X) has a nitrogen atom, the compatibility with the polyorganosilsesquioxane (A) having a polymerizable group is improved.

The nitrogen atom is preferably contained in the polymer (X) as at least one structure selected from an isocyanuric ring, a urethane bond, an amide bond, or a urea bond, more preferably contained in the polymer (X) as an isocyanuric ring, a urethane bond, or an amide bond, and even more preferably contained in the polymer (X) as an isocyanuric ring.

That is, the polymer (X) preferably has at least one structure selected from an isocyanuric ring, a urethane bond, an amide bond, or a urea bond, more preferably has an isocyanuric ring, a urethane bond, or an amide bond, and even more preferably has an isocyanuric ring.

From the viewpoint of improving the compatibility with a curable component and the like, the number of nitrogen atoms contained in the monomer (K1) is preferably equal to or greater than 2, and more preferably equal to or greater than 3.

The monomer (K 1) is preferably a compound represented by any of General Formulas (NI) to (NV)

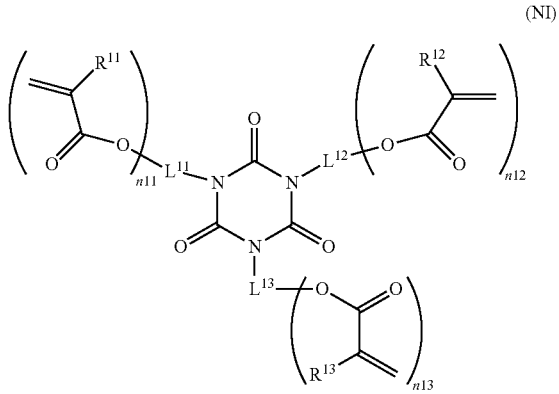
(NI)

In General Formula (NI), $L^{11}$, $L^{12}$, and $L^{13}$ each independently represent a divalent or trivalent linking group, $R^{11}$, $R^{12}$, and $R^{13}$ each independently represent a hydrogen atom or a methyl group, and n11 to n13 each independently represent 1 or 2. In a case where n11 represents 2, two $R^{11}$'s may be the same as or different from each other. In a case where n12 represents 2, two $R^{11}$'s may be the same as or different from each other. In a case where n13 represents 2, two $R^{13}$'s may be the same as or different from each other.

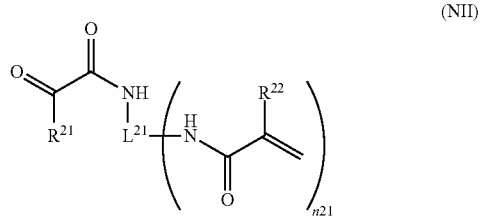
(NII)

In General Formula (NII), $R^{21}$ and $R^{22}$ each independently represent a hydrogen atom or a methyl group. $L^{21}$ represents a divalent to hexavalent linking group. n21 represents an integer of 1 to 5. In a case where n21 represents an integer equal to or greater than 2, a plurality of $R^{22}$'s may be the same as or different from each other.

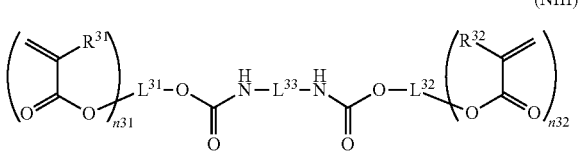
(NIII)

In General Formula (NIII), $L^{31}$ and $L^{32}$ each independently represent a divalent to tetravalent linking group, $L^{33}$ represents a divalent linking group, $R^{31}$ and $R^{32}$ each independently represent a hydrogen atom or methyl group, and n31 and n32 each independently represent an integer of 1 to 3. In a case where n31 represents an integer equal to or greater than 2, a plurality of $R^{31}$'s may be the same as or different from each other. In a case where n32 represents an integer equal to or greater than 2, a plurality of $R^{32}$'s may be the same as or different from each other.

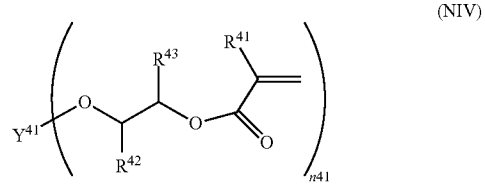
(NIV)

In General Formula (NIV), $Y^{41}$ represents a divalent to hexavalent linking group, $R^{41}$ represents a hydrogen atom or a methyl group, and $R^{42}$ and $R^{43}$ each independently represent a hydrogen atom, a hydroxyl group, or an alkyl group having 1 to 10 carbon atoms.

n41 represents an integer of 2 to 6. In a case where n41 represents an integer equal to or greater than 2, a plurality of $R^{41}$'s may be the same as or different from each other, a plurality of $R^{42}$'s may be the same as or different from each other, and a plurality of $R^{43}$'s may be the same as or different from each other.

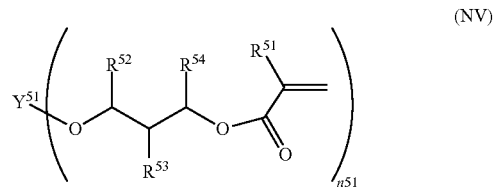
(NV)

In General Formula (NV), $Y^{51}$ represents a divalent to hexavalent linking group. $R^{51}$ represents a hydrogen atom or a methyl group, and $R^{52}$, $R^{53}$, and $R^{54}$ each independently represent a hydrogen atom, a hydroxyl group, or an alkyl group having 1 to 10 carbon atoms.

n51 represents an integer of 2 to 6. In a case where n51 represents an integer equal to or greater than 2, a plurality of $R^{51}$'s may be the same as or different from each other, a plurality of $R^{52}$'s may be the same as or different from each other, a plurality of $R^{53}$'s may be the same as or different from each other, and a plurality of $R^{54}$'s may be the same as or different from each other.

In General Formula (NI), $L^{11}$, $L^{12}$, and $L^{13}$ each independently represent a divalent or trivalent linking group.

Examples of the divalent linking group represented by $L^{11}$, $L^{12}$, and $L^{13}$ include an alkylene group, a cycloalkylene group, an arylene group, —O—, —S—, —CO—, —COO—, —NH—, —NHCO—, —NHCOO—, and a divalent linking group obtained by combining these groups.

As the alkylene group, an alkylene group having 1 to 20 carbon atoms is preferable, and an alkylene group having 1 to 10 carbon atoms is more preferable Examples thereof include an ethylene group, a n-propylene group, an i-propylene group, a n-butylene group, a n-hexylene group, and the like. The alkylene group may be linear or branched.

As the cycloalkylene group, a cycloalkylene group having 6 to 20 carbon atoms is preferable, and a cycloalkylene group having 6 to 10 carbon atoms is more preferable. Examples thereof include a cyclohexylene group, a cycloheptylene group, and the like.

As the arylene group, an arylene group having 6 to 20 carbon atoms is preferable, and an arylene group having 6 to 10 carbon atoms is more preferable Examples thereof include a phenylene group, a naphthylene group, and the like.

The alkylene group, the cycloalkylene group, or the arylene group may have a substituent Examples of the substituent include a hydroxyl group, a carboxyl group, an amino group, a cyano group, a nitro group, a halogen atom, an alkyl group, a cycloalkyl group, an aryl group, an alkoxy group, an acyl group, and the like.

The divalent linking group represented by $L^{11}$, $L^{12}$, and $L^{13}$ is preferably an alkylene group or a divalent linking group obtained by combining an alkylene group with at least one group selected from —O—, —S—, —CO—, —COO—, —NH—, —NHCO—, or —NHCOO—, and more preferably an alkylene group.

Examples of the trivalent linking group represented by $L^{11}$, $L^{12}$, and $L^{13}$ include linking groups obtained by randomly removing one hydrogen atom from the divalent linking group represented by $L^{11}$, $L^{12}$, and $L^{13}$.

In General Formula (NI), $R^{11}$, $R^{12}$, and $R^{13}$ each independently represent a hydrogen atom or a methyl group, and preferably represent a hydrogen atom.

In General Formula (NI), n11 to n13 each independently represent 1 or 2. It is preferable that n11 to n13 each represent 1.

The compound represented by General Formula (NI) can be synthesized according to the method described in JP2004-141732A.

Next, the compound represented by General Formula (NII) will be described.

In General Formula (NII), $R^{21}$ and $R^{22}$ each independently represent a hydrogen atom or a methyl group, and preferably represent a hydrogen atom.

$L^{21}$ represents a divalent to hexavalent linking group, and the divalent linking group is the same as the divalent linking group represented by $L^{11}$, $L^{12}$, and $L^{13}$ described above. Furthermore, in a case where $L^{21}$ represents a trivalent to hexavalent linking group, examples of the trivalent to hexavalent linking group include linking groups obtained by randomly removing one to four hydrogen atoms from the divalent linking group represented by $L^{11}$, $L^{12}$, and $L^{13}$.

n21 represents an integer of 1 to 5, and preferably represents an integer of 1 to 3.

The compound represented by General Formula (II) can be synthesized according to the method described in JP2012-206992A.

Next, the compound represented by General Formula (NIII) will be described.

In General Formula (NIII), $R^{31}$ and $R^{32}$ each independently represent a hydrogen atom or a methyl group, and preferably represent a hydrogen atom.

$L^{31}$ and $L^{32}$ each independently represent a divalent to tetravalent linking group, and the divalent linking group is the same as the divalent linking group represented by $L^{11}$, $L^{12}$, and $L^{13}$ described above. Furthermore, in a case where $L^{31}$ and $L^{32}$ each represent a trivalent or tetravalent linking group, examples of the trivalent or tetravalent linking group include linking groups obtained by randomly removing one or two hydrogen atoms from the divalent linking group represented by $L^{11}$, $L^{12}$, and $L^{13}$ described above.

$L^{33}$ represents a divalent linking group which is the same as the divalent linking group represented by $L^{11}$, $L^{12}$, and $L^{13}$ described above.

n31 and n32 each independently represent an integer of 1 to 3, and preferably represent 1 or 2.

The compound represented by General Formula (NIII) can be synthesized according to the method described in JP2016-065199A.

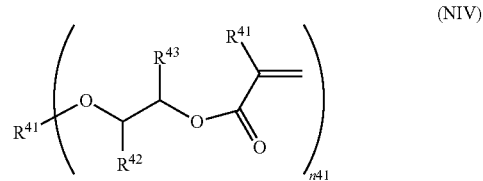

In General Formula (NIV), $Y^{41}$ represents a divalent to hexavalent linking group, $R^{41}$ represents a hydrogen atom or a methyl group, and $R^{42}$ and $R^{43}$ each independently represent a hydrogen atom, a hydroxyl group, or an alkyl group having 1 to 10 carbon atoms.

n41 represents an integer of 1 to 6. In a case where n41 represents an integer equal to or greater than 2, a plurality of $R^{41}$'s may be the same as or different from each other, a plurality of $R^{42}$'s may be the same as or different from each other, and a plurality of $R^{43}$'s may be the same as or different from each other.

Examples of the divalent linking group represented by $Y^{41}$ include an alkylene group, a cycloalkylene group, an arylene group, —CO—, or a divalent linking group obtained by combining these groups.

As the alkylene group, an alkylene group having 1 to 20 carbon atoms is preferable, and an alkylene group having 1 to 10 carbon atoms is more preferable Examples thereof include an ethylene group, a n-propylene group, an i-propylene group, a n-butylene group, a n-hexylene group, and the like. The alkylene group may be linear or branched.

As the cycloalkylene group, a cycloalkylene group having 6 to 20 carbon atoms is preferable, and a cycloalkylene group having 6 to 10 carbon atoms is more preferable. Examples thereof include a cyclohexylene group, a cycloheptylene group, and the like.

As the arylene group, an arylene group having 6 to 20 carbon atoms is preferable, and an arylene group having 6 to 10 carbon atoms is more preferable Examples thereof include a phenylene group, a naphthylene group, and the like.

The alkylene group, the cycloalkylene group, or the arylene group may have a substituent. Examples of the substituent include a hydroxyl group, a carboxyl group, an amino group, a cyano group, a nitro group, a halogen atom, an alkyl group, a cycloalkyl group, an aryl group, an alkoxy group, an acyl group, and the like.

The divalent linking group represented by $Y^{41}$ is preferably an alkylene group.

In a case where $Y^{41}$ represents a trivalent to hexavalent linking group, examples of the trivalent to hexavalent linking group include linking groups obtained by randomly removing one to four hydrogen atoms from the divalent linking group represented by $Y^{41}$ described above.

$R^{41}$ represents a hydrogen atom or a methyl group. $R^{41}$ is preferably a hydrogen atom.

$R^{42}$ and $R^{43}$ each independently represent a hydrogen atom, a hydroxyl group, or an alkyl group having 1 to 10 carbon atoms.

As the alkyl group having 1 to 10 carbon atoms, an alkyl group having 1 to 6 carbon atoms is preferable, and an alkyl group having 1 to 4 carbon atoms is more preferable.

$R^{42}$ and $R^{43}$ preferably each represent a hydrogen atom.

n41 represents an integer of 1 to 6. n41 is preferably an integer of 1 to 4.

The monomer represented by General Formula (NIV) can be synthesized according to the method described in WO2016/092844A.

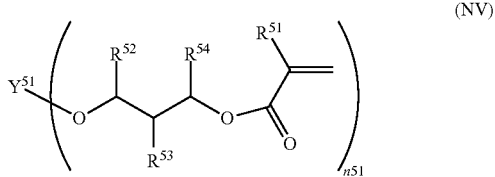

In General Formula (NV), $Y^{51}$ represents a divalent to hexavalent linking group, $R^{51}$ represents a hydrogen atom or a methyl group, and $R^{52}$, $R^{53}$, and $R^{54}$ each independently represent a hydrogen atom, a hydroxyl group, or an alkyl group having 1 to 10 carbon atoms.

n51 represents an integer of 1 to 6. In a case where n51 represents an integer equal to or greater than 2, a plurality of $R^{51}$'s may be the same as or different from each other, a plurality of $R^{52}$'s may be the same as or different from each other, a plurality of $R^{53}$'s may be the same as or different from each other, and a plurality of $R^{54}$'s may be the same as or different from each other.

Examples of the divalent linking group represented by $Y^{51}$ include an alkylene group, a cycloalkylene group, an arylene group, —CO—, or a divalent linking group obtained by combining these groups.

As the alkylene group, an alkylene group having 1 to 20 carbon atoms is preferable, and an alkylene group having 1 to 10 carbon atoms is more preferable Examples thereof include an ethylene group, a n-propylene group, an i-propylene group, a n-butylene group, a n-hexylene group, and the like. The alkylene group may be linear or branched.

As the cycloalkylene group, a cycloalkylene group having 6 to 20 carbon atoms is preferable, and a cycloalkylene group having 6 to 10 carbon atoms is more preferable. Examples thereof include a cyclohexylene group, a cycloheptylene group, and the like.

As the arylene group, an arylene group having 6 to 20 carbon atoms is preferable, and an arylene group having 6 to 10 carbon atoms is more preferable Examples thereof include a phenylene group, a naphthylene group, and the Ike.

The alkylene group, the cycloalkylene group, or the arylene group may have a substituent Examples of the substituent include a hydroxyl group, a carboxyl group, an amino group, a cyano group, a nitro group, a halogen atom, an alkyl group, a cycloalkyl group, an aryl group, an alkoxy group, an acyl group, and the like.

The divalent linking group represented by $Y^{51}$ is preferably an alkylene group.

In a case where $Y^{51}$ represents a trivalent to hexavalent linking group, examples of the trivalent to hexavalent linking group include linking groups obtained by randomly removing one to four hydrogen atoms from the divalent linking group represented by $Y^{51}$ described above.

$R^{51}$ represents a hydrogen atom or a methyl group. $R^{51}$ is preferably a hydrogen atom.

$R^{52}$, $R^{53}$, and $R^{54}$ each independently represent a hydrogen atom, a hydroxyl group, or an alkyl group having 1 to 10 carbon atoms.

As the alkyl group having 1 to 10 carbon atoms, an alkyl group having 1 to 6 carbon atoms is preferable, and an alkyl group having 1 to 4 carbon atoms is more preferable.

Each of $R^{52}$, $R^{53}$, and $R^{54}$ is preferably a hydrogen atom.

n51 represents an integer of 1 to 6. n51 is preferably an integer of 1 to 4.

The monomer represented by General Formula (NV) can be synthesized according to the method described in WO2016/092844A.

The monomer (K1) is more preferably the monomer represented by General Formula (NI).

Commercial products may be used as the monomer (K) Examples of the monomer (K1) containing a nitrogen atom as a urethane bond include UA-306H, UA-3061, UA-306T, UA-510H, UF-8001G, UA-1011, UA-101T, AT-600, AH-600, and AI-600 manufactured by KYOEISHA CHEMICAL Co., LTD, U-4HA, U-6HA, U-6LPA, UA-32P, U-15HA, UA-1100H, A-9300, A-9200, A-9300-1CL, and A-9300-3CL manufactured by SHIN-NAKAMURA CHEMICAL CO., LTD., and SHIKOH UV-1400B, UV-1700B, UV-6300B, JV-7550B, UV-7600B, UV-7605B, UV-7610B, UV-7620EA, UV-7630B, UV-7640B, UV-6630B, UV-7000B, UV-7510B. UV-7461TE, UV-3000B, UV-3200B, UV-3210EA, UV-3310EA, UV-3310B, UV-3500BA, UV-3520TL, UV-3700B, UV-610013, UV-6640B, UV-2000B, UV-2010B, and UV-2250EA manufactured by The Nippon Synthetic Chemical Industry Co., Ltd. In addition, examples of the monomer (K1) also include SHIKOH UV-2750B manufactured by The Nippon Synthetic Chemical Industry Co, Ltd., UL-503LN manufactured by KYOEISHA CHEMICAL Co., LTD, UNIDIC 17-806, 17-813. V-4030, and V-4000BA manufactured by DIC Corporation, EB-129K manufactured by Daicel-UCB Company, Ltd., HI-COAP AU-2010 and AU-2020 manufactured by TOKUSHIKI Co., Ltd., and the like.

Specific examples of the monomer (K1) will be shown below, but the present invention is not limited thereto.

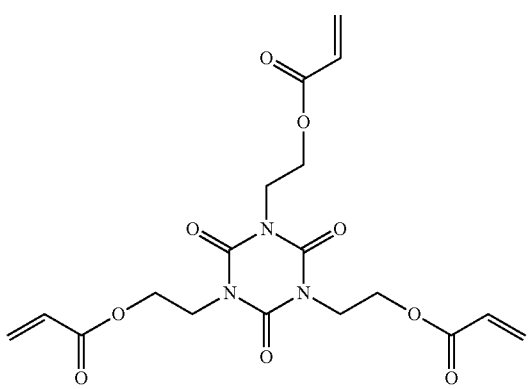

-continued
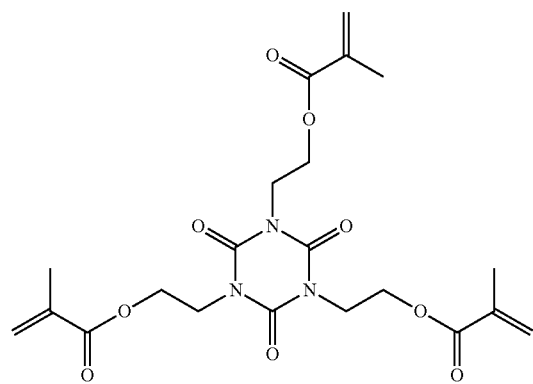
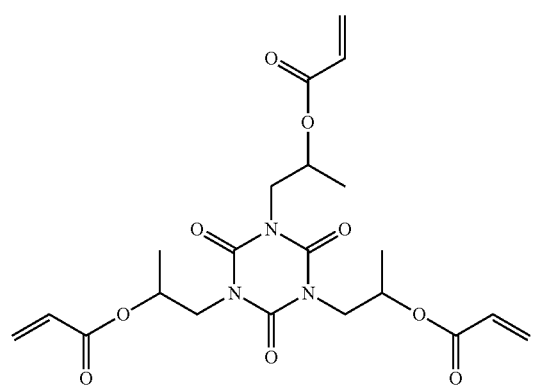
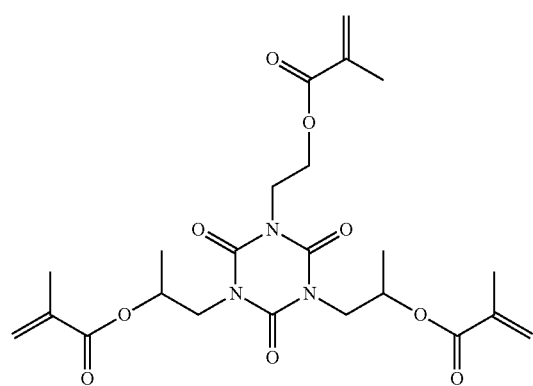
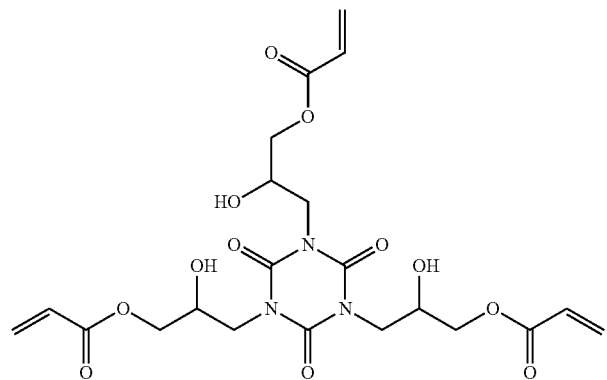

-continued
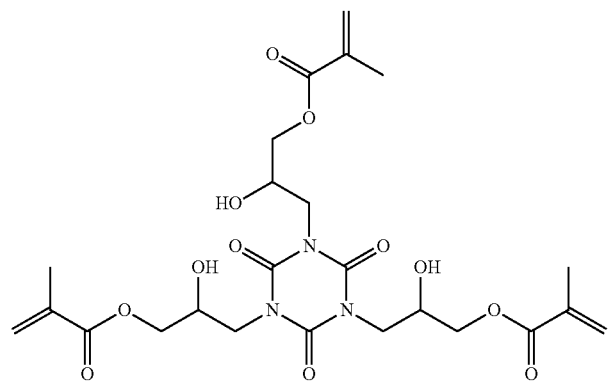
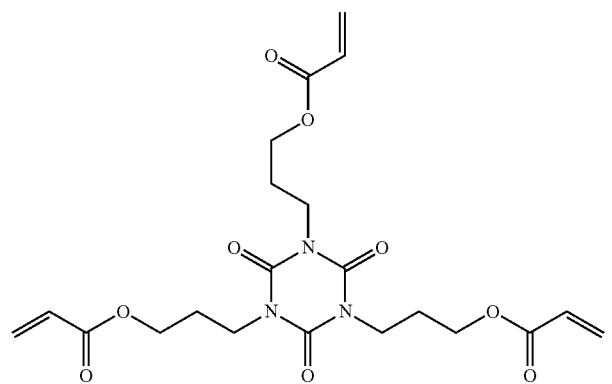
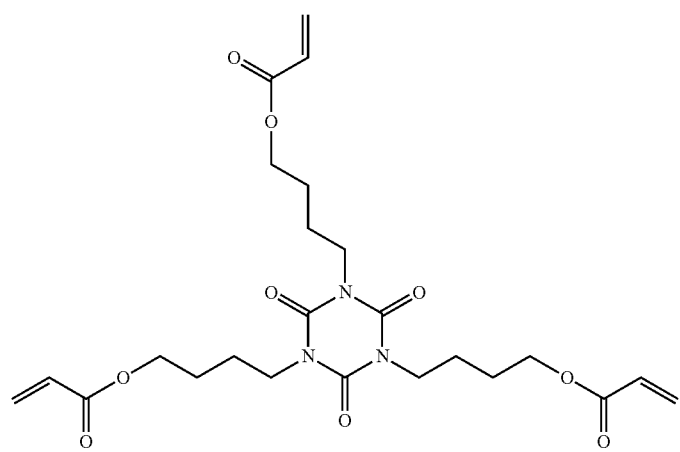
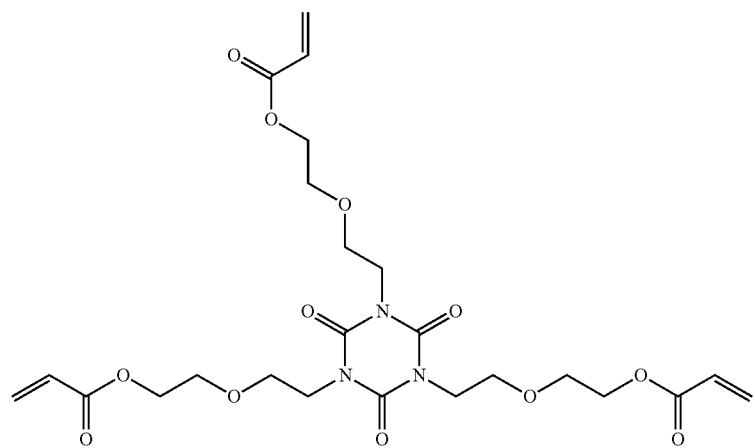

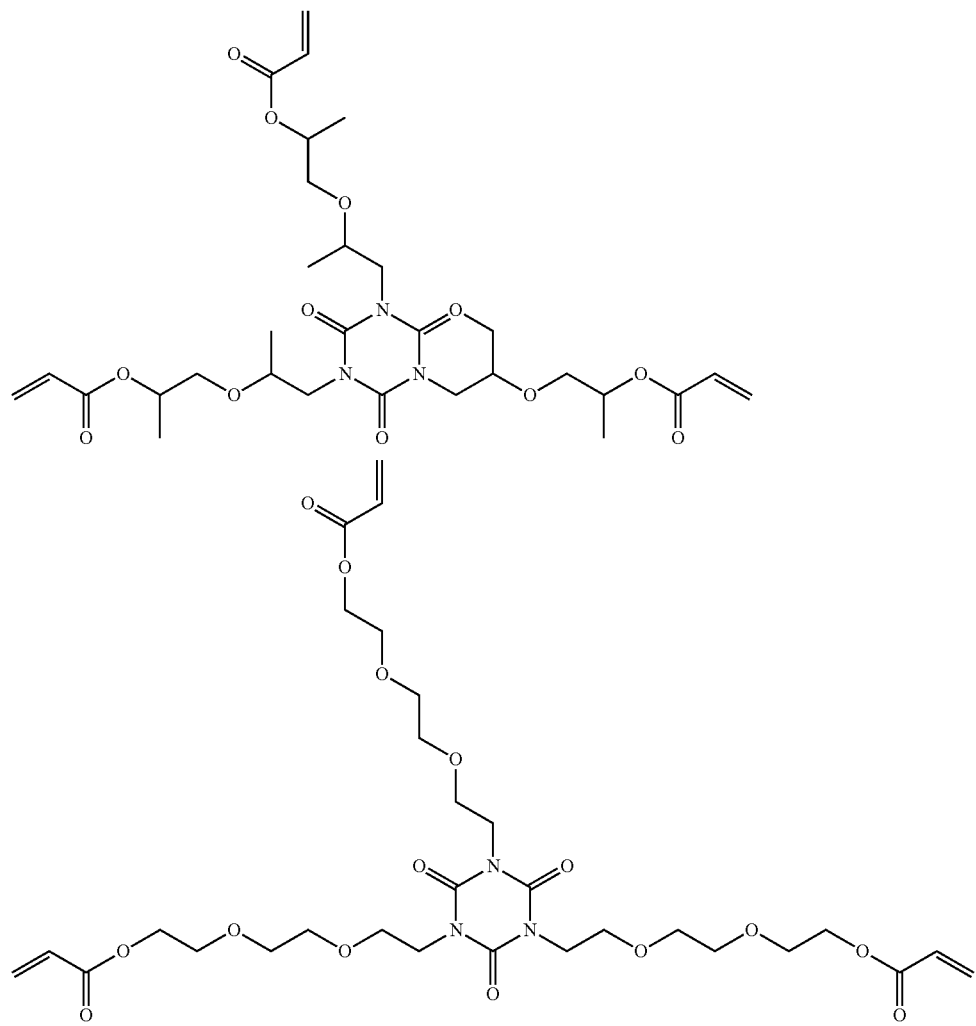
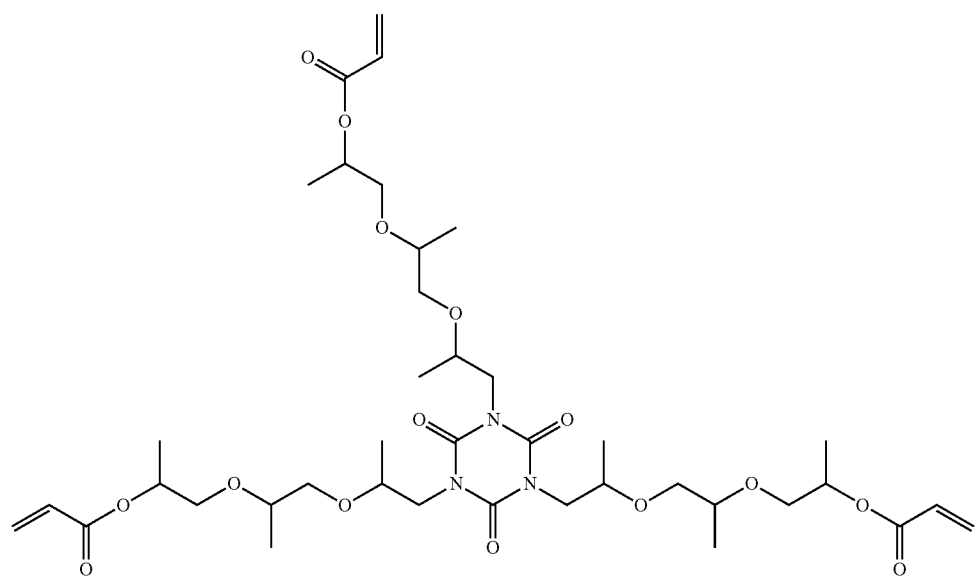

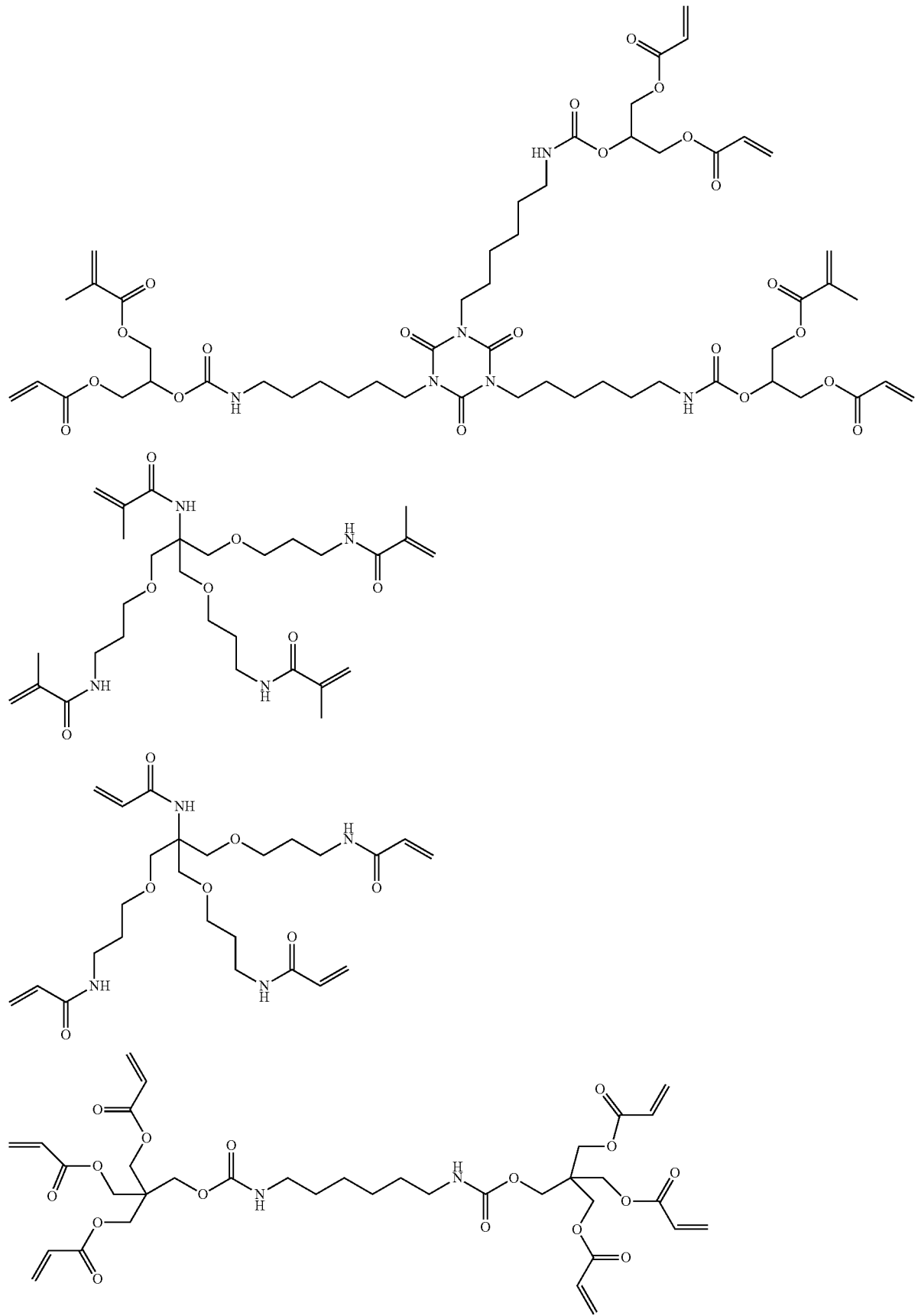

-continued
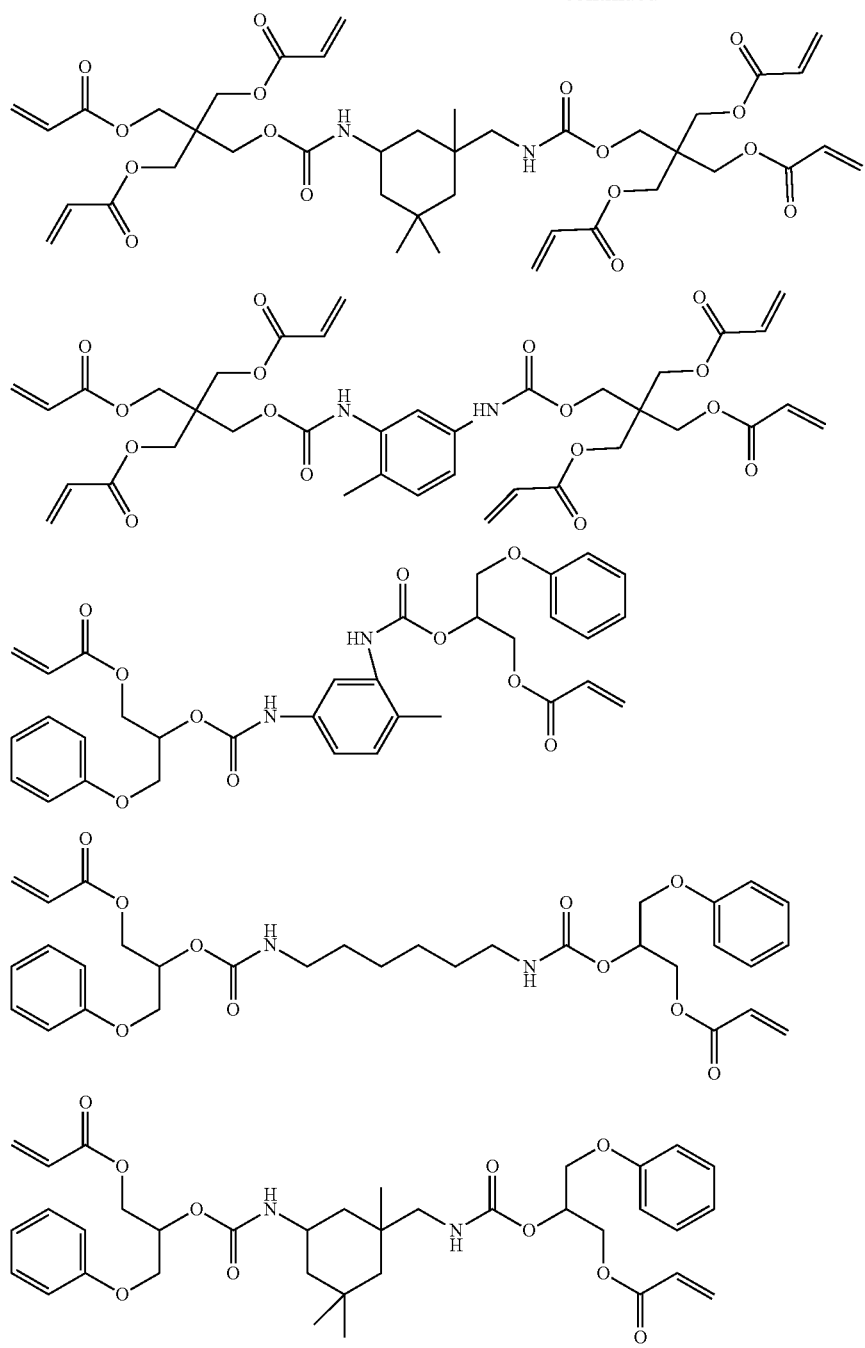
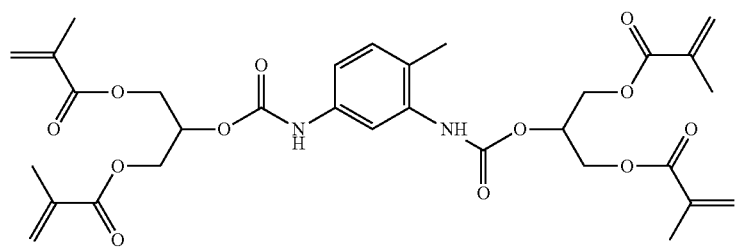

-continued
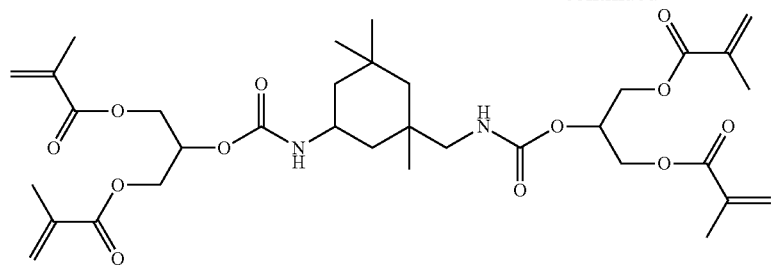
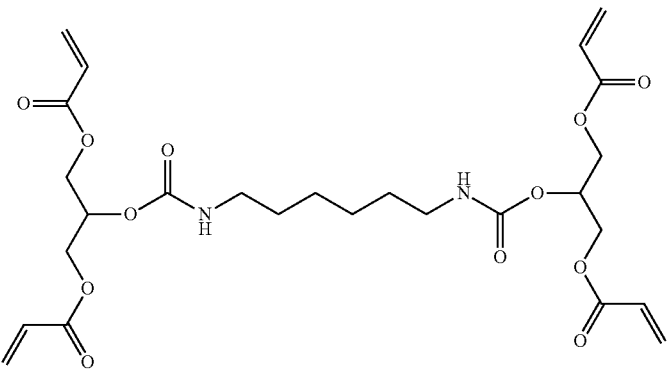
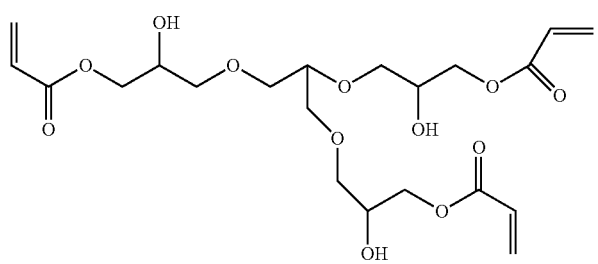
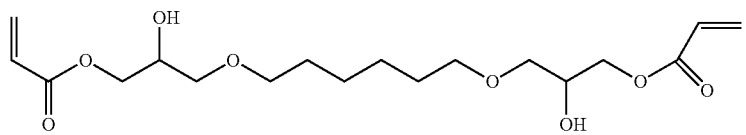
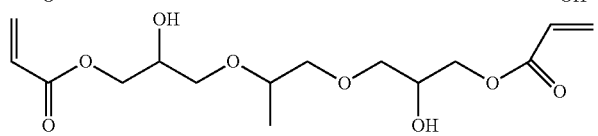
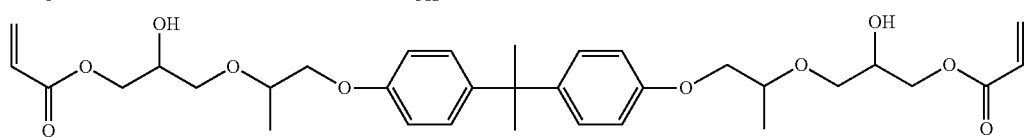
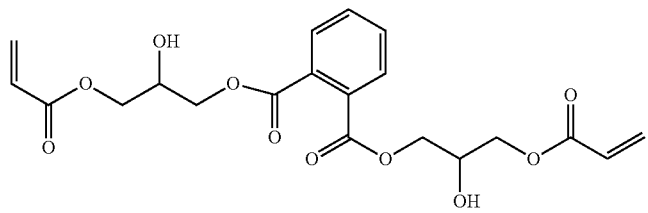
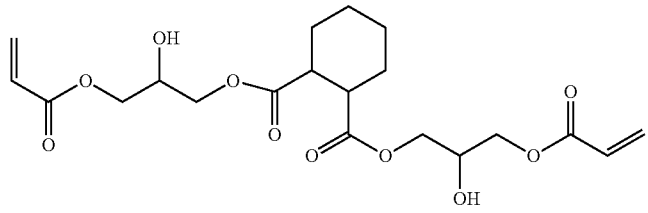

-continued
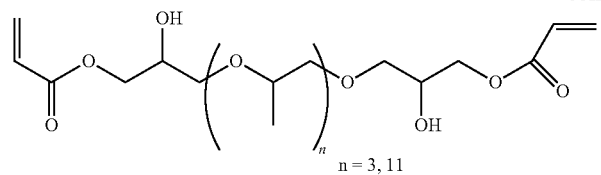
n = 3, 11
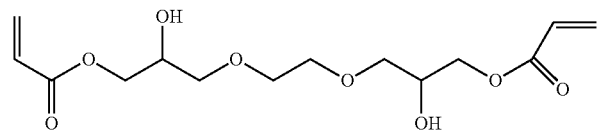
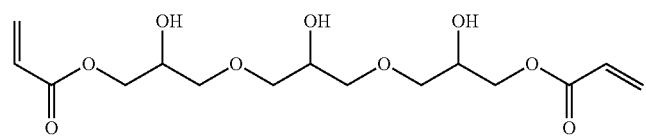
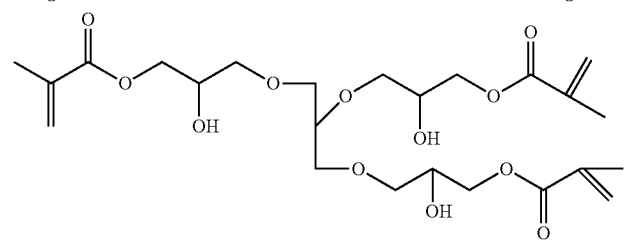
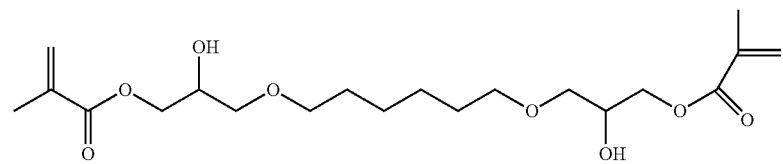
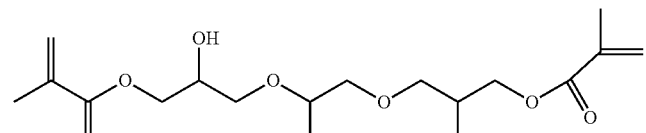
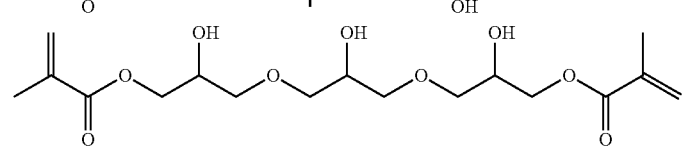
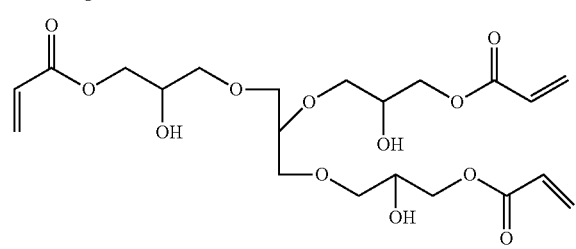
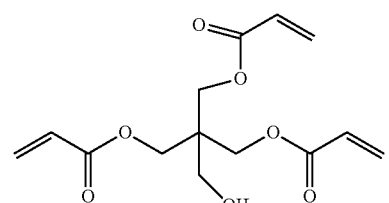
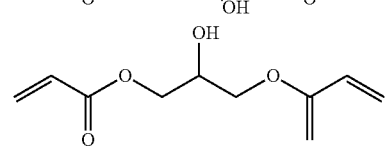

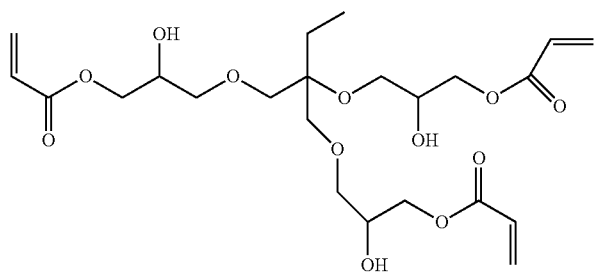

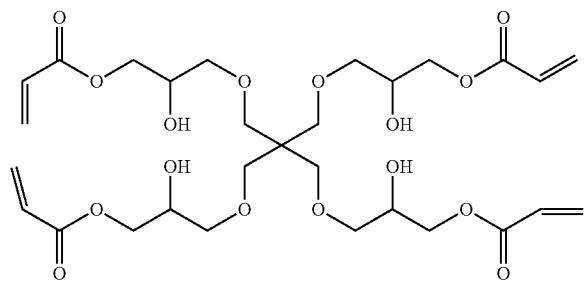

The polymer (X) has at least one structure selected from a fluorine atom, a silicon atom, or a linear or branched alkyl group having three or more carbon atoms.

In a case where the polymer (X) contains a fluorine atom, a silicon atom, or a linear or branched alkyl group having three or more carbon atoms, the surface tension of a coating film obtained by performing coating using a composition containing the polymer (X) is further reduced, and the homogeneous coating properties are further improved. In addition, the polymer (X) migrates better to the surface of the coating film, and the surface condition of the coating film is improved as well.

As the linear or branched alkyl group having three or more carbon atoms, a linear or branched alkyl group having 3 to 30 carbon atoms is preferable, and a linear or branched alkyl group having 4 to 20 carbon atoms is more preferable.

It is more preferable that the polymer (X) contains a fluorine atom.

In order to introduce at least any one structure selected from a fluorine atom, a silicon atom, or a linear or branched alkyl group having three or more carbon atoms into the polymer (X), a method may be used in which at least any one structure selected from a fluorine atom, a silicon atom, or a linear or branched alkyl group having three or more carbon atoms is introduced into the aforementioned monomer (K1) and then the monomer (K1) is polymerized. Furthermore, at least any one structure selected from a fluorine atom, a silicon atom, or a linear or branched alkyl group having three or more carbon atoms may be introduced into a raw material monomer (also referred to as monomer (K2)) other than the monomer (K1), and then the monomer (K1) and the monomer (K2) may be copolymerized, such that at least any one structure selected from a fluorine atom, a silicon atom, or a linear or branched alkyl group having three or more carbon atoms is introduced into the polymer (X).

From the viewpoint of improving the surface condition of the coating film, it is preferable that at least any one structure selected from a fluorine atom, a silicon atom, or a linear or branched alkyl group having three or more carbon atoms is introduced into the polymer (X) by the copolymerization of the monomer (K1) and the monomer (K2).

<Monomer (K2)>

It is preferable that the monomer (K2) has at least one structure selected from a fluorine atom, a silicon atom, or a linear or branched alkyl group having three or more carbon atoms.

The fluorine atom is preferably contained in the monomer (K2) as an alkyl group having 1 to 20 carbon atoms and at least one fluorine atom or an alkenyl group having 2 to 20 carbon atoms and at least one fluorine atom.

The silicon atom is preferably contained in the monomer (K2) as a siloxane bond, and more preferably contained in the monomer (K2) as a polysiloxane structure.

The monomer (K2) is preferably a compound having a (meth)acryloyl group, and more preferably a compound represented by any of General Formulas (s1) to (s3).

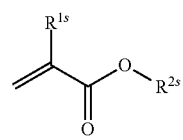

(s1)

In General Formula (s1), $R^{1s}$ represents a hydrogen atom or an alkyl group having 1 to 20 carbon atoms, and $R^{2s}$ represents an alkyl group having 1 to 20 carbon atoms and at least one fluorine atom or an alkenyl group having 2 to 20 carbon atoms and at least one fluorine atom.

$R^{1s}$ preferably represents a hydrogen atom or an alkyl group having 1 to 10 carbon atoms, more preferably represents a hydrogen atom or an alkyl group having 1 to 6 carbon atoms, even more preferably represents a hydrogen atom, a methyl group, an ethyl group, or a n-propyl group, and particularly preferably represents a hydrogen atom or a methyl group.

The number of carbon atoms in the alkyl group or alkenyl group represented by $R^{2s}$ is preferably 1 to 15, and more preferably 1 to 10.

The number of fluorine atoms contained in the alkyl group or alkenyl group represented by $R^{2s}$ is preferably 1 to 20, and more preferably 3 to 17.

From the viewpoint of reducing the surface energy of the composition containing the polymer (X), improving the homogeneous coating properties, and improving the surface condition, $R^{2s}$ in General Formula (s1) is preferably an alkyl group having 1 to 10 carbon atoms and at least one fluorine atom or an alkenyl group having 2 to 10 carbon atoms and at least one fluorine atom, and more preferably an alkyl group having 1 to 10 carbon atoms and at least one fluorine atom. It is particularly preferable that half or more of the carbon atoms contained in $R^{2s}$ have a fluorine atom as a substituent.

The compound represented by General Formula (s1) is more preferably a compound represented by General Formula (s11).

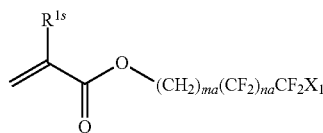

(s11)

In General Formula (s11), $R^{1s}$ represents a hydrogen atom or an alkyl group having 1 to 20 carbon atoms, ma and na each independently represent an integer equal to or greater than 0, and $X_1$ represents a hydrogen atom or a fluorine atom.

$R^{1s}$ in General Formula (s11) has the same definition as $R^{1s}$ in General Formula (s1), and preferred examples thereof are also the same.

ma and na each independently represent an integer equal to or greater than 0.

ma is preferably an integer of 1 to 10, and more preferably an integer of 1 to 5.

na is preferably an integer of 4 to 12, and more preferably an integer of 4 to 10.

X represents a hydrogen atom or a fluorine atom. X is preferably a fluorine atom.

Examples of the monomer represented by General Formula (s1) include 2,2,2-trifluoroethyl (meth)acrylate, 2,2,3,3,3-pentafluoropropyl (meth)acrylate, and 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, 2-(perfluoro-3-methylbutyl)ethyl (meth)acrylate, 2-(perfluoro-5-methylhexyl) ethyl (meth)acrylate, 2-(perfluoro-7-methyloctyl)ethyl (meth)acrylate, 1H,1H,3H-tetrafluoropropyl (meth)acylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl(meth)acrylate, 3-perfluorooctyl-2-hydroxypropyl (meth)acrylate, 3-(perfluoro-3-methylbutyl)-2-hydroxypropyl (meth)acylate, 3-(perfluoro-5-methylhexyl)-2-hydroxypropyl (meth)acrylate, 3-(perfluoro-7-methyloctyl)-2-hydroxypropyl (meth)acrylate, and the like.

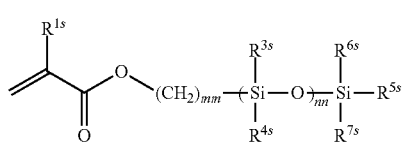

(s2)

In General Formula (s2), $R^{1s}$ represents a hydrogen atom or an alkyl group having 1 to 20 carbon atoms, and $R^{3s}$, $R^{4s}$, $R^{6s}$, and $R^{7s}$ each independently represent an alkyl group having 1 to 20 carbon atoms, a haloalkyl group having 1 to 20 carbon atoms, or an aryl group having 6 to 20 carbon atoms, $R^{5s}$ represents an alkyl group having 1 to 20 carbon atoms, mm represents an integer of 1 to 10, and nn represents an integer equal to or greater than 1. A plurality of $R^{3s}$'s and $R^{4s}$'s may be the same as or different from each other respectively.

$R^{1s}$ in General Formula (s2) has the same definition as $R^{1s}$ in General Formula (s1), and preferred examples thereof are also the same.

Examples of the alkyl group having 1 to 20 carbon atoms represented by $R^{3s}$, $R^{4s}$, $R^{6s}$, and $R^{7s}$ include a methyl group, an ethyl group, a hexyl group, and the like. The alkyl group represented by $R^{3s}$, $R^{4s}$, $R^{6s}$, and $R^{7s}$ is preferably an alkyl group having 1 to 10 carbon atoms.

Examples of the haloalkyl group having 1 to 20 carbon atoms represented by $R^{3s}$, $R^{4s}$, $R^{6s}$, and $R^{7s}$ include a trifluoromethyl group and a pentafluoroethyl group. The haloalkyl group represented by $R^{3s}$, $R^{4s}$, $R^{6s}$, and $R^{7s}$ is preferably a fluorinated alkyl group having 1 to 10 carbon atoms.

Examples of the aryl group having 6 to 20 carbon atoms represented by $R^{3s}$, $R^{4s}$, $R^{6s}$, and $R^{7s}$ include a phenyl group and a naphthyl group. The aryl group represented by $R^{3s}$, $R^{4s}$, $R^{6s}$, and $R^{7s}$ is preferably an aryl group having 6 to 20 carbon atoms.

Each of $R^{3s}$, $R^{4s}$, $R^{6s}$, and $R^{7s}$ is preferably a methyl group, a trifluoromethyl group, or a phenyl group, and more preferably a methyl group.

Examples of the alkyl group having 1 to 20 carbon atoms represented by $R^{5s}$ include a methyl group, an ethyl group, a hexyl group, and the like. As the alkyl group represented by $R^{5s}$, an alkyl group having 1 to 12 carbon atoms is preferable, and an alkyl group having 1 to 8 carbon atoms is more preferable.

mm represents an integer of 1 to 10. mm is preferably an integer of 1 to 6.

nn is preferably an integer of 1 to 1,000, more preferably an integer of 20 to 500, and even more preferably an integer of 30 to 200.

As the monomer represented by General Formula (s2), commercial products may be used, and examples thereof include polysiloxane macromers containing a (meth)acryloyl group at one terminal (for example, SILAPLANE FM-0721, FM-0725, and FM-0711 (trade names, manufactured by JNC Corporation), AK-5, AK-30, and AK-32 (trade names, manufactured by TOAGOSEI CO., LTD.), KF-100T, X-22-169AS, KF-102, X-22-37011E, X-22-164B, X-22-164C, X-22-5002, X-22-173B, X-22-174D, X-22-167B, and X-22-161AS (trade names, manufactured by shin-Etsu Chemical Co., Ltd.)), and the like.

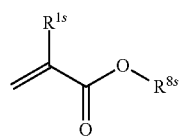

(s3)

In General Formula (s3), $R^{1s}$ represents a hydrogen atom or an alkyl group having 1 to 20 carbon atoms, and $R^{8s}$ represents a linear or branched alkyl group having three or more carbon atoms.

$R^{1s}$ in General Formula (s3) has the same definition as $R^{1s}$ in General Formula (s1), and preferred examples thereof are also the same.

As the linear or branched alkyl group having three or more carbon atoms represented by $R^{8s}$, a linear or branched alkyl group having 3 to 30 carbon atoms is preferable, and a linear or branched alkyl group having 6 to 20 carbon atoms is more preferable.

The monomer (K2) is preferably the monomer represented by General Formula (s1). That is, it is preferable that the polymer (X) has a structure represented by General Formula

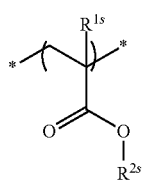

(s)

In General Formula (s), $R^{1s}$ represents a hydrogen atom or an alkyl group having 1 to 20 carbon atoms, and $R^{2s}$ represents an alkyl group having 1 to 20 carbon atoms and at least one fluorine atom or an alkenyl group having 1 to 20 carbon atoms and at least one fluorine atom. * represents a bond.

$R^{1s}$ and $R^{2s}$ in General Formula (s) have the same definitions as $R^{1s}$ and $R^{2s}$ in General Formula (s1), and preferred examples thereof are also the same. * represents a bond.

The content of the structure selected from a fluorine atom, a silicon atom, and a linear or branched alkyl group having three or more carbon atoms in the polymer (X) can be appropriately adjusted according to the used structure. The content of the structure is preferably 1 to 99 mol %, and more preferably 10 to 90 mol %.

As described above, the polymer (X) may be a homopolymer of the monomer (K1) or a copolymer of the monomer (K1) and the monomer (K2).

In a case where the polymer (X) is a copolymer of the monomer (K1) and the monomer (K2), the ratio between the monomers can be appropriately adjusted according to the type of the monomers used. From the viewpoint of the improvement of surface condition and solvent extractability, the content of the monomer (K2) with respect to the total amount of monomers is preferably 20 to 90 mol %, and more preferably 40 to 80 mol % In a case where the content of the monomer (K2) is equal to or greater than 20 mol %, excellent surface condition can be maintained. In a case where the content of the monomer (K2) is equal to or smaller than 90 mol %, excellent solvent extractability can be maintained. In a case where the content of the monomer (K2) is 40 to 80 mol %, the balance between the improvement of surface condition and the solvent extractability of the polymer (X) can be excellently maintained.

The polymer (X) may be a polymer obtained by polymerizing other raw material monomers in addition to the monomer (K1) and the monomer (K2).

<Weight-Average Molecular Weight (Mw)>

The weight-average molecular weight of the polymer (X) is 1,000 to 50,000. In a case where the weight-average molecular weight is equal to or lower than 50,000, the polymer (X) can be dissolved in generally used organic solvents. Therefore, by dissolving the polymer (X) in an organic solvent, a composition for forming a hardcoat layer can be prepared as a solution. As a result, various substrates for general use such as triacetyl cellulose (TAC), polyethylene terephthalate (PET), polycarbonate (PC), and polymethylmethacrylate resin (PMMA) can be uniformly coated with the composition. Furthermore, in a case where Mw is equal to or higher than 1,000, the surface condition is more effectively improved.

In the present invention, in a case where the polymer (X) and an organic solvent are mixed together at a ratio of polymer (X)/organic solvent (25° C.)=1/4 (mass ratio), the obtained solution is left to stand for 5 minutes, and then the turbidity of the solution is found to be equal to or lower than 1.0 parts per million (ppm), it can be said that the polymer (X) is soluble in the organic solvent.

The weight-average molecular weight of the polymer (X) is more preferably 1,000 to 30,000, even more preferably 1,000 to 8,000, and particularly preferably 1,000 to 5,000.

The molecular weight distribution (Mw/Mn) of the polymer (X) is preferably 1.00 to 5.00, and more preferably 1.00 to 3.00.

The weight-average molecular weight (Mw), the number-average molecular weight (Mn), and the molecular weight distribution of the polymer (X) are values measured by gel permeation chromatography (GPC) under the following conditions.

[Eluent]; tetrahydrofuran (THF)
[Device name]: Ecosec HLC-8220GPC (manufactured by Tosoh Corporation)
[Column]: TSKgel SuperHZM-H, TSKgel SuperHZ4000, TSKgel SuperHZM200 (manufactured by Tosoh Corporation)
[Column temperature]: 40° C. [Flow rate]: 50 ml/min
[Molecular weight]: expressed in terms of standard polystyrene The content of hydroxyl groups in the polymer (X) calculated from the following equation, expressed as the content of hydroxyl groups (also referred to as OH content) in the polymer (X) with respect to the amount of the polyorganosilsesquioxane (A) having a polymerizable group added to the composition, is preferably 0% by mass to 10% by mass.

(Amount of polymer (X) added/amount of polyorganosilsesquioxane having polymerizable group added)×(OH content in polymer (X))×100(%)

For example, in a case where the polymer (X) is obtained by polymerizing the monomer (K1) and the monomer (K2), and the monomer (K1) contains hydroxyl groups, the OH content in the polymer (X) is calculated from the following equation.

[Content (g) of polymer (X)/content (g) of polyorganosilsesquioxane having polymerizable group]×(content ratio of monomer (K1) in polymer (X) (mass ratio))×[(molecular weight of OH)×(number of OH in monomer (K1))/(molecular weight of monomer (K1))]

The OH content calculated from the above equation is preferably 0% to 0.006% by mass, more preferably 0% to 0.002% by mass, and even more preferably 0% to 0.0001% by mass. In a case where the OH content is small, the interaction between the polymer (X) and the OH groups in the polyorganosilsesquioxane (A) having a polymerizable group weakens, and the solvent extractability of the polymer (X) is improved.

<Synthesis Method>

As a method for synthesizing the polymer (X), from the viewpoint of controlling the molecular weight, radical polymerization such as solution polymerization, suspension, or emulsification is preferable, and solution polymerization is particularly preferable.

In the reaction, various organic solvents can be suitably used as polymerization solvents. Examples of such organic solvents include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-ptyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxy ethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, t-amyl alcohol, cyclohexyl alcohol, isobutyl acetate, methyl Isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene, and the like. One kind of each of these organic solvents can be used singly, or two or more kinds of these organic solvents can be used in combination.

As the radical polymerization initiator, known radical polymerization initiators can be used without any restriction.

In the radical solution polymerization, the number-average molecular weight (Mn) of the obtained polymer (X) is represented by Equation (1).

$$\frac{1}{M_n} = \frac{1}{M_1}\left(\frac{\sqrt{[I]}}{[M]} \times \sqrt{f} \times \frac{\sqrt{k_t}}{k_p} \times \sqrt{k_d} + C_M + C_s \frac{[S]}{[M]}\right) \quad (1)$$

The parameters in Equation (1) are as follows.

[I], [M], [S]: concentration of each of initiator, monomer, and solvent (mol/L), $k_d$: constant of initiator decomposition rate $k_t$: constant of termination reaction rate, $k_p$: constant of growth reaction rate, $C_s$ (=$k_{trS}/k_p$): constant of chain transfer of solvent ($k_{trS}$: constant of reaction rate of chain transfer to solvent), $C_M$ (=$k_{trM}/k_p$): constant of chain transfer of monomer ($k_{trM}$: constant of reaction rate of chain transfer to monomer).

f: initiator efficiency.

$M_1$: molecular weight of monomer

The factors affecting the molecular weight of the polymer (X) synthesized by the solution radical polymerization include [M]/[I] which is a ratio of monomer concentration/initiator concentration and [M]/[S] which is a ratio of monomer concentration/solvent concentration. That is, the molecular weight of the polymer (X) can be controlled by reducing the monomer concentration and/or adjusting the initiator concentration.

The polymer (X) can be solubilized in a general organic solvent (for example, MEK or the like) by adjusting the concentration of the compound (M) in the polymerization reaction and/or the concentration of the initiator.

The radical polymerization concentration (monomer concentration with respect to the solvent during radical solution polymerization) is preferably 3% to 40% by mass, and more preferably 5% to 35% by mass.

Furthermore, from the viewpoint of solubility in an organic solvent, the amount of the radical polymerization initiator expressed as a ratio to difunctional (polyfunctional) monomers is preferably equal to or higher than 250 mol %.

Specific examples of the polymer (X) will be shown below, but the present invention is not limited thereto.

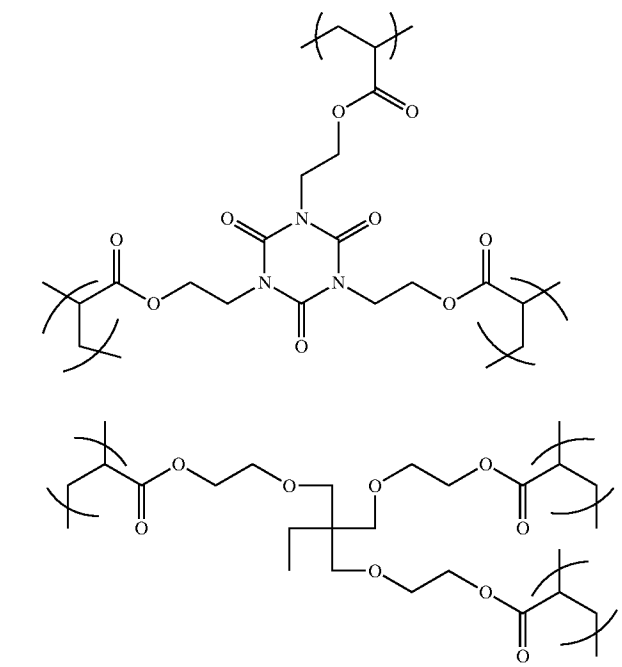

-continued
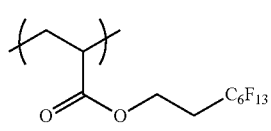
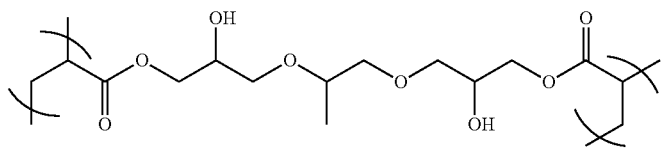
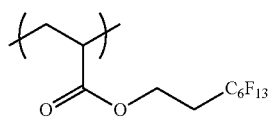
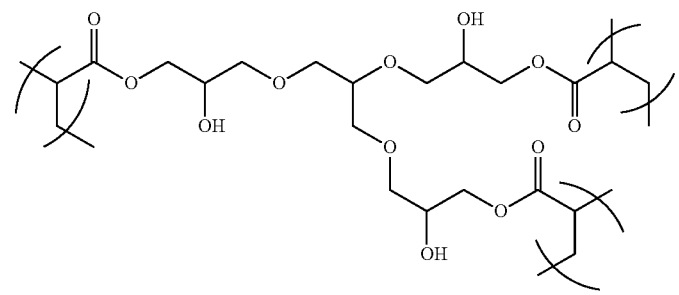
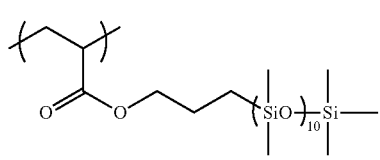
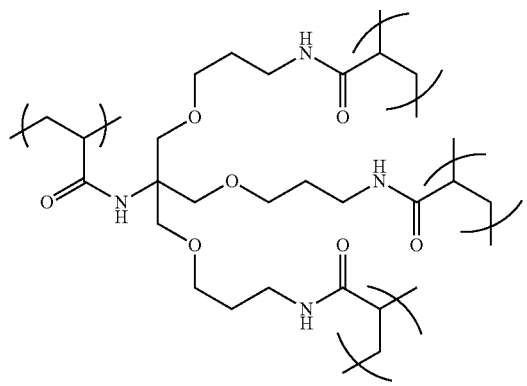
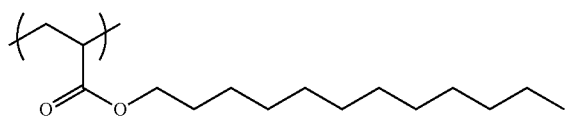
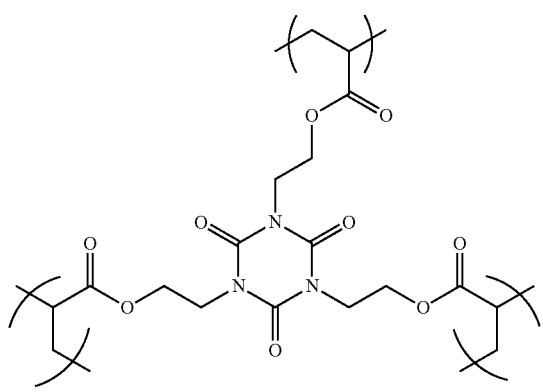

-continued

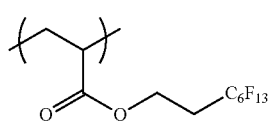
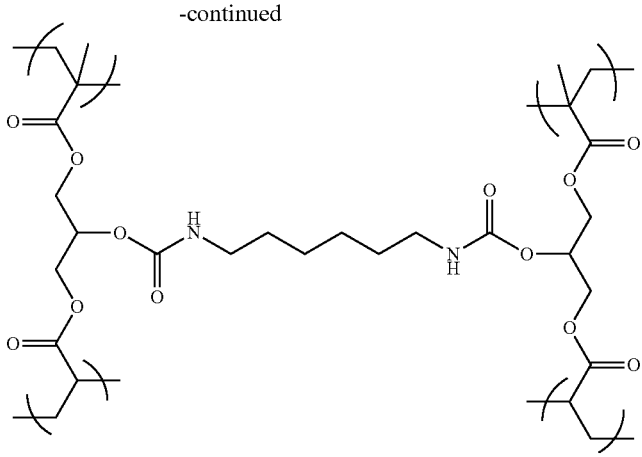

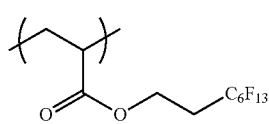
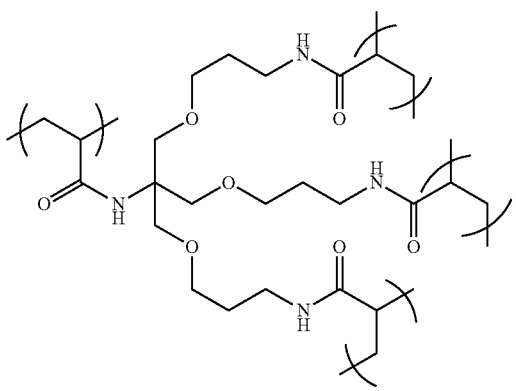

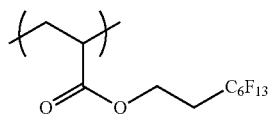
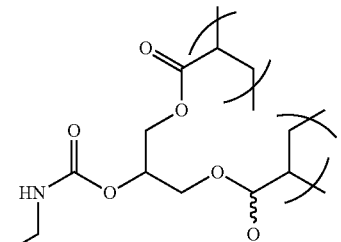

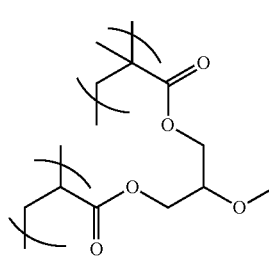
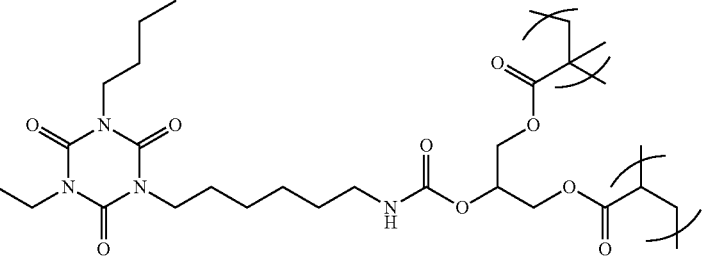

The content rate of the polymer (X) in the composition for forming a hardcoat layer can be appropriately adjusted according to the amount of the composition used for coating or the surface condition-improving effect of the polymer (X). The content rate of the polymer (X) with respect to the total solid content of the composition is preferably equal to or higher than 0.001% by mass and equal to or lower than 20% by mass, more preferably equal to or higher than 0.005% by mass and equal to or lower than 10% by mass, and even more preferably equal to or higher than 0.01% by mass and equal to or lower than 1% by mass. "Solid content" refers to components other than solvents.

In a case where the hardcoat layer has the cured product of the polyorganosilsesquioxane (a1) having an epoxy group, the hardcoat layer may or may not contain a cured product of a compound having a (meth)acryloyl group. The content rate of the cured product of the compound having a (meth)acryloyl group is preferably less than 10% by mass with respect to the total amount the polyorganosilsesquioxane (a1) and a cured product of a (meth)acrylate compound. In a case where the content rate of the cured product of the (meth)acrylate compound in the hardcoat layer is less than 10% by mass, the deformation recovery of the hardcoat film is improved, and hence the hardness is increased.

(Film Thickness)

The film thickness of the hardcoat layer is not particularly limited, but is preferably 1 to 100 µm, more preferably 5 to 50 µm, and even more preferably 10 to 20 µm.

The thickness of the hardcoat layer is calculated by observing the cross section of the hardcoat film by using an optical microscope. The cross-sectional sample can be prepared by a microtome method using a cross section cutting device ultramicrotome, a cross section processing method using a focused ion beam (FIB) device, or the like.

<Mixed Layer>

The hardcoat film according to the embodiment of the present invention may have a mixed layer between the hardcoat layer and an anti-scratch layer. In a case where the hardcoat layer contains the cured product of the polyorganosilsesquioxane (a1) having an epoxy group, it is preferable that the hardcoat film has a mixed layer containing a cured product of a compound (b1) having an epoxy group and a cured product of a compound (b2) having two or more (meth)acryloyl groups in one molecule.

The cured product of the compound (b1) having an epoxy group and the cured product of the compound (b2) having two or more (meth)acryloyl groups in one molecule are preferably obtained by curing a curable composition containing the compound (b1) having an epoxy group and the compound (b2) having two or more (meth)acryloyl groups in one molecule by means of heating and/or irradiation with ionizing radiation.

(Compound (b1) Having Epoxy Group)

As the compound (b1) having an epoxy group (also referred to as "epoxy compound (b1)"), a compound having one or more epoxy groups (oxirane rings) in a molecule can be used. The compound (b1) is not particularly limited, and examples thereof include an epoxy compound having an alicycle, an aromatic epoxy compound, an aliphatic epoxy compound, the polyorganosilsesquioxane (a1) having an epoxy group used for forming the aforementioned hardcoat layer, and the like.

The epoxy compound having an alicycle is not particularly limited, and examples thereof include known compounds having one or more alicycles and one or more epoxy groups in a molecule.

Examples of such compounds include (1) compound having an alicyclic epoxy group:
  (2) compound in which an epoxy group is directly bonded to an alicycle by a single bond;
  (3) compound having an alicycle and a glycidyl ether group in a molecule (glycidyl ether-type epoxy compound), and the like.

Examples of (1) compound having an alicyclic epoxy group include a compound represented by Formula (i).

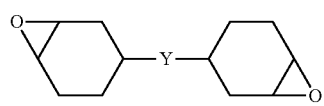

(i)

In Formula (i), Y represents a single bond or a linking group (a divalent group having one or more atoms). Examples of the linking group include a divalent hydrocarbon group, an alkenylene group in which some or all of carbon-carbon double bonds are epoxidized, a carbonyl group, an ether bond, an ester bond, a carbonate group, an amide group, a group consisting of a plurality of these groups linked to one another, and the like.

Examples of the divalent hydrocarbon group include a substituted or unsubstituted linear or branched alkylene group having 1 to 18 carbon atoms, a divalent substituted or unsubstituted alicyclic hydrocarbon group, and the like. Examples of the alkylene group having 1 to 18 carbon atoms include a methylene group, a methyl methylene group, a dimethyl methylene group, an ethylene group, an i-propylene group, a n-propylene group, and the like. Examples of the divalent alicyclic hydrocarbon group include divalent cycloalkylene groups (including cycloalkylidene groups) such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in which some or all of carbon-carbon double bonds are epoxidized (sometimes referred to as "epoxidized alkenylene group") include linear or branched alkenylene groups having 2 to 8 carbon atoms such as a vinylene group, a propenylene group, a 1-butenylene group, a 2-butenylene group, a butadienylene group, a pentenylene group, a hexenylene group, a heptenylene group, and an octenylene group, and the like. Particularly, as the epoxidized alkenylene group, an alkenylene group in which all of carbon-carbon double bonds are epoxidized is preferable, and an alkenylene group having 2 to 4 carbon atoms in which all of carbon-carbon double bonds are epoxidized is more preferable.

Typical examples of the alicyclic epoxy compound represented by Formula (i) include 3,4,3',4'-diepoxybicyclohexane, compounds represented by Formulas (i-1) to (i-10), and the like. In Formulas (i-5) and (i-7), l and m each represent an integer of 1 to 30. R' in Formula (i-5) represents an alkylene group having 1 to 8 carbon atoms. R' is particularly preferably a linear or branched alkylene group having 1 to 3 carbon atoms such as a methylene group, an ethylene group, a n-propylene group, or an i-propylene group. In Formulas (i-9) and (i-10), n1 to n6 each represent an integer of 1 to 30. Examples of the alicyclic epoxy compound represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, bis(3,4-epoxycyclohexylmethyl)ether, and the like.

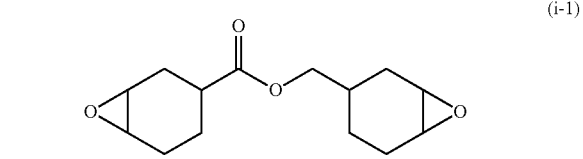

(i-1)

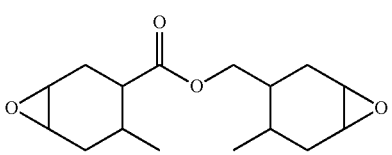

(i-2)

(i-3)
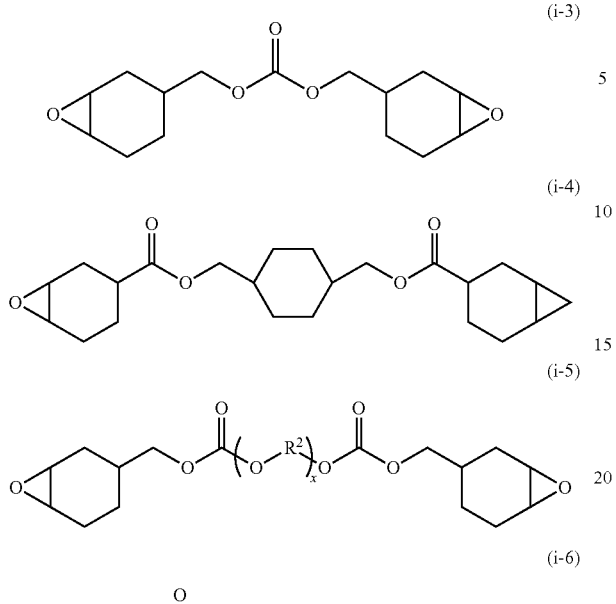
(i-4)

(i-5)

(i-6)

(i-7)

(i-8)

(i-9)

(i-10)
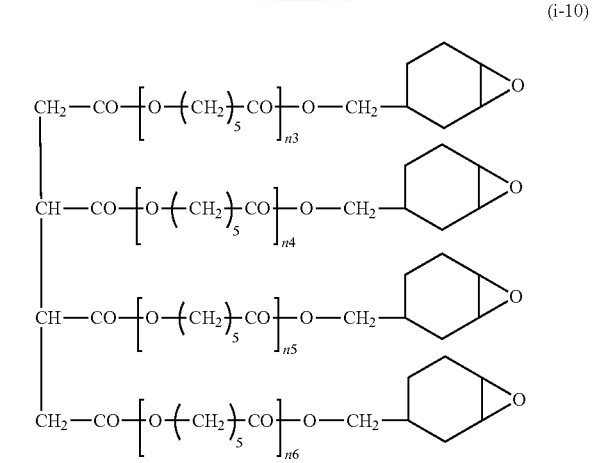

Examples of (2) compound in which an epoxy group is directly bonded to an alicycle by a single bond include a compound represented by Formula (ii) and the like.

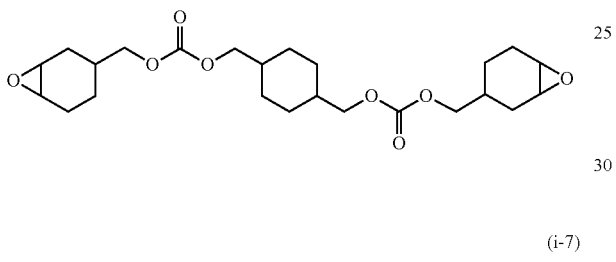 (ii)

In Formula (ii), R″ represents a group (p-valent organic group) obtained by removing p pieces of hydroxyl groups (—OH) from the structural formula of a p-valent alcohol, and p and n each represent a natural number. Examples of the p-valent alcohol [R″(OH)p] include a polyhydric alcohol such as 2,2-bis(hydroxymethyl)-1-butanol (an alcohol having 1 to 15 carbon atoms) and the like. p is preferably 1 to 6, and n is preferably 1 to 30. In a case where p is equal to or greater than 2, n's for each group in the parentheses (in the outer parentheses) may be the same as or different from each other. Specific examples of the compound represented by Formula (ii) include a 1,2-epoxy-4-(2-oxiranyl)cyclohexane adduct of 2,2-bis(hydroxymethyl)-1-butanol [such as "EHPE3150" (trade name, manufactured by Daicel Corporation)], and the like.

Examples of (3) compound having an alicycle and a glycidyl ether group in a molecule include a glycidyl ether of an alicyclic alcohol (particularly, an alicyclic polyhydric alcohol). More specifically, examples thereof include a compound obtained by hydrogenating a bisphenol A-type epoxy compound such as 2,2-bis[4-(2,3-epoxypropoxy)cyclohexyl]propane or 2,2-bis[3,5-dimethyl-4-(2,3-epoxypropoxy)cyclohexyl]propane (a hydrogenated bisphenol A-type epoxy compound): a compound obtained by hydrogenating a bisphenol F-type epoxy compound such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, or bis[3,5-dimethyl-4-(2,3-epoxy)propoxy)cyclohexyl]methane (a hydrogenated bisphenol F-type epoxy compound), a hydrogenated biphenol-type epoxy compound: a hydrogenated phenol novolac-type epoxy compound: a hydrogenated cresol novolak-type epoxy compound: a hydrogenated cresol novolak-type epoxy compound of bisphenol A; a hydrogenated naphthalene-type epoxy compound; a hydrogenated epoxy compound of an epoxy compound obtained from trisphenolmethane; a hydrogenated epoxy compound of the following aromatic epoxy compound, and the like.

Examples of the aromatic epoxy compound include a epi-bis glycidyl ether-type epoxy resin obtained by a condensation reaction between bisphenols [for example, bisphenol A, bisphenol F, bisphenol S, fluorene bisphenol, and the like] and epihalohydrin; a high-molecular-weight epi-bis glycidyl ether-type epoxy resin obtained by further subjecting the epi-bis glycidyl ether-type epoxy resin to an addition reaction with the above bisphenols; a novolac/alkyl glycidyl ether-type epoxy resin obtained by causing a condensation reaction between phenols [for example, phenol, cresol, xylenol, resorcin, catechol, bisphenol A, bisphenol F, bisphenol S, and the like] and an aldehyde [for example, formaldehyde, acetaldehyde, benzaldehyde, hydroxy benzaldehyde, salicylaldehyde, and the like] and further causing a condensation reaction between the polyhydric alcohols obtained by the above condensation reaction with epihalohydrin; an epoxy compound obtained by bonding two phenol skeletons to the 9-position of a fluorene ring, removing hydrogen atoms from hydroxy groups of the phenol skeletons, and bonding a glycidyl group to the remaining oxygen atoms directly or through an alkyleneoxy group, and the like.

Examples of the aliphatic epoxy compound include a glycidyl ether of an s-valent alcohol (s is a natural number) having no cyclic structure; a glycidyl ester of a monovalent or polyvalent carboxylic acid [for example, acetic acid, propionic acid, butyric acid, stearic acid, adipic acid, sebacic acid, maleic acid, itaconic acid, or the like]; epoxidized oils and fats having a double bond such as epoxidized linseed oil, epoxidized soybean oil, and epoxidized castor oil: epoxidized polyolefin (including polyalkadiene) such as epoxidized polybutadiene, and the like. Examples of the s-valent alcohol having no cyclic structure include a monohydric alcohols such as methanol, ethanol, 1-propyl alcohol, isopropyl alcohol, or 1-butanol; a dihydric alcohol such as ethylene glycol, 1,2-propanediol, 1,3-propanediol. 1,4-butanediol, neopentyl glycol, 1,6-hexanediol, diethylene glycol, triethylene glycol, tetraethylene glycol, dipropylene glycol, polyethylene glycol, or polypropylene glycol; a polyhydric alcohol having a valency equal to or higher than 3 such as glycerin, diglycerin, erythritol, trimethylolethane, trimethylolpropane, pentaerythritol, dipentaerythritol, or sorbitol, and the like. The s-valent alcohol may be polyether polyol, polyester polyol, polycarbonate polyol, polyolefin polyol, or the like.

The epoxy compound (b1) is preferably polyorganosilsesquioxane having an epoxy group, and the preferred range of this compound is the same as that of the polyorganosilsesquioxane (a1) having an epoxy group contained in the aforementioned hardcoat layer.

One kind of epoxy compound (b1) may be used singly, or two or more kinds of epoxy compounds (b1) having different structures may be used in combination.

The content rate of the cured product of the epoxy compound (b1) with respect to the total mass of the mixed layer is preferably equal to or higher than 10% by mass and equal to or lower than 90% by mass, more preferably equal to or higher than 20% by mass and equal to or lower than 80% by mass, and even more preferably equal to or higher than 25% by mass and equal to or lower than 75% by mass.

(Compound (b2) Having Two or More (Meth)Acryloyl Groups in One Molecule)

The compound (b2) having two or more (meth)acryloyl groups in one molecule (also referred to as "polyfunctional (meth)acrylate compound (b2)") is preferably a compound having three or more (meth)acryloyl groups in one molecule.

The poly functional (meth)acrylate compound (b2) may be a crosslinkable monomer, a crosslinkable oligomer, or a crosslinkable polymer. Examples of the crosslinkable oligomer or crosslinkable polymer include polyorganosilsesquioxane (c1) having a group containing a radically polymerizable double bond that will be described later.

Examples of polyfunctional (meth)acrylate compound (b2) include an ester of a polyhydric alcohol and a (meth)acrylic acid. Specifically, examples thereof include pentaerythritol tri(meth)acrylate, pentaerythritol tetra(meth)acrylate, trimethylolpropane tri(meth)acrylate, trimethylolethane tri(meth)acrylate, ditrimethylolpropane tetra(meth)acrylate, dipentaerythritol tetra(meth)acrylate, dipentaerythritol pentaacrylate, dipentaerythritol hexaacrylate, pentaerythritol hexa(meth)acrylate, and the like. In view of a high degree of crosslinking, pentaerythritol triacrylate, pentaerythritol tetraacrylate, or dipentaerythritol pentaacrylate, dipentaerythritol hexaacrylate, or a mixture of these is preferable.

Furthermore, as the polyfunctional (meth)acrylate compound (b2), a compound (urethane (meth)acrylate) having two or more (meth)acryloyl groups and a urethane bond in one molecule is also preferable.

One kind of polyfunctional (meth)acrylate compound (b2) may be used singly, or two or more kinds of polyfunctional (meth)acrylate compounds (b2) having different structures may be used in combination.

In the mixed layer, the content rate of the cured product of the polyfunctional (meth)acrylate compound (b2) is preferably equal to or higher than 10% by mass with respect to the total amount of the cured product of the epoxy compound (b1) and the cured product of the polyfunctional (meth)acrylate compound (b2). In a case where the content rate of the cured product of the polyfunctional (meth)acrylate compound (b2) in the mixed layer is within the above range, the scratch resistance of the hardcoat film can be improved.

In the mixed layer, the content rate of the cured product of the polyfunctional (meth)acrylate compound (b2) with respect to the total amount of the cured product of the epoxy compound (b1) and the cured product of the polyfunctional (meth)acrylate compound (b2) is preferably 10% by mass to 90% by mass, and more preferably 20% by mass to 80% by mass.

(Other Additives)

The mixed layer may contain components other than the above, for example, a dispersant, a leveling agent, an antifouling agent, an antistatic agent, an ultraviolet absorber, an antioxidant, a cured product of another polymerizable compound, and the like.

The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd.) using a polythiophene conductive polymer or the like can be preferably used.

Examples of the cured product of another polymerizable compound include a cured product of a compound having an epoxy group and a (meth)acryloyl group in one molecule and the like. Specifically, examples of the compound include cured products such as Cyclomer M100 manufactured by Daicel Corporation, Light ESTER G (trade name) manufactured by KYOEISHA CHEMICAL Co., LTD. 4HBAGE manufactured by Nippon Kasei Chemical Co., Ltd, an SP series (trade name) such as SP-1506, 500, SP-1507, and 480 and a VR senes such as VR-77 manufactured by Showa High Polymer Co., Ltd., and EA-100/ECA, EA-11020, EA-1025, and EA-6310/ECA (trade names) manufactured by SHIN-NAKAMURA CHEMICAL CO., LTD.

(Film Thickness

In a case where the hardcoat film according to the embodiment of the present invention has a mixed layer, the film thickness of the mixed layer is preferably 0.05 μm to 10 μm. In a case where the film thickness of the mixed layer is equal to or greater than 0.05 μm, the scratch resistance of the film is improved. In a case where the film thickness of the mixed layer is equal to or smaller than 10 μm, the hardness and resistance to repeated folding are improved.

The film thickness of the mixed layer is more preferably 0.1 μm to 5 μm, and even more preferably 0.1 μm to 3 μm.

In the hardcoat film according to the embodiment of the present invention, it is preferable that the hardcoat layer and the mixed layer are bonded to each other by a covalent bond. It is particularly preferable that the epoxy group of the polyorganosilsesquioxane (a1) in the hardcoat layer and the epoxy group of the epoxy compound (b1) in the mixed layer form a bond at the interface between the two layers, because then a laminated structure with high adhesiveness is obtained, and higher scratch resistance can be exhibited.

<Anti-Scratch Layer>

The hardcoat film according to the embodiment of the present invention has an anti-scratch layer.

The anti-scratch layer contains a cured product of polyorganosilsesquioxane (c1) having a group containing a radically polymerizable double bond (also referred to as "polyorganosilsesquioxane (c1)").

The cured product of the polyorganosilsesquioxane (c1) is preferably obtained by curing a curable composition containing the polyorganosilsesquioxane (c1) by means of heating and/or irradiation with ionizing radiation.

Examples of the group containing a radically polymerizable double bond that the polyorganosilsesquioxane (c1) has include groups containing a (meth)acryloyl group, a vinyl group, a styryl group, an allyl group, and the like. Among these, a group containing a (meth)acryloyl group is preferable, and a group containing an acryloyl group is more preferable.

The polyorganosilsesquioxane (c1) having a group containing a radically polymerizable double bond is preferably polyorganosilsesquioxane which has at least a siloxane constitutional unit containing a group having a (meth)acryloyl group and is represented by General Formula (2).

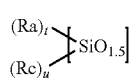 (2)

In General Formula (2). Ra represents a group containing a (meth)acryloyl group, and Rc represents a monovalent substituent. t and u each represent a proportion of each of Ra and Rc in General Formula (2). t+u=100, t is greater than 0, and u is equal to or greater than 0. In a case where there is a plurality of Ra's and Rc's in General Formula (2), the plurality of Ra's and Rc's may be the same as or different from each other respectively. In a case where there is a plurality of Rc's in General Formula (2), the plurality of Rc's may form a bond with each other.

[SiO$_{1.5}$] in General Formula (2) represents a structural portion composed of a siloxane bond (Si—O—Si) in the polyorganosilsesquioxane.

The structural portion represented by [SiO$_{1.5}$] in General Formula (2) may be any structure such as a random structure, a ladder structure, or a cage structure, and is not particularly limited. From the viewpoint of pencil hardness, it is preferable that the polyorganosilsesquioxane contains many ladder structures. In a case where the ladder structure is formed, the deformation recovery of the hardcoat film can be excellently maintained. Whether the ladder structure is formed can be qualitatively determined by checking whether or not absorption occurs which results from Si—O—Si expansion/contraction unique to the ladder structure found at around 1,020 to 1,050 cm$^{-1}$ by Fourier Transform Infrared Spectroscopy (FT-IR).

In General Formula (2), Ra represents a group containing a (meth)acryloyl group.

Examples of the group containing a (meth)acryloyl group include known groups having a (meth)acryloyl group.

Ra is preferably a group represented by General Formula (1a).

 (1a)

In General Formula (1a), * represents a portion linked to Si in General Formula (2). $R^{11a}$ represents a substituted or unsubstituted alkylene group or a substituted or unsubstituted phenylene group, and $R^{12a}$ represents hydrogen atom or a substituted or unsubstituted alkyl group.

$R^{11a}$ represents a substituted or unsubstituted alkylene group or a substituted or unsubstituted phenylene group.

Examples of the substituted or unsubstituted alkylene group represented by Ria include a substituted or unsubstituted alkylene group having 1 to 10 carbon atoms.

Examples of the alkylene group having 1 to 10 carbon atoms include a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, and the like.

In a case where the alkylene group has a substituent, examples of the substituent include a hydroxyl group, a carboxyl group, an alkoxy group, an aryl group, a heteroaryl group, a halogen atom, a nitro group, a cyano group, a silyl group, and the like.

In a case where the phenylene group represented by $R^{11a}$ has a substituent, examples of the substituent include a hydroxyl group, a carboxyl group, an alkoxy group, an alkyl group, a halogen atom, and the like.

$R^{11a}$ is preferably an unsubstituted linear alkylene group having 1 to 3 carbon atoms, and more preferably a propylene group.

$R^{12a}$ represents a hydrogen atom or a substituted or unsubstituted alkyl group.

Examples of the substituted or unsubstituted alkyl group represented by $R^{12a}$ include a substituted or unsubstituted alkyl group having 1 to 3 carbon atoms.

In a case where the alkyl group has a substituent, examples of the substituent include a hydroxyl group, a carboxyl group, an alkoxy group, an amyl group, a heteroaryl group, a halogen atom, a nitro group, a cyano group, a silyl group, and the like.

$R^{12a}$ is preferably a hydrogen atom or a methyl group, and more preferably a hydrogen atom.

It is also preferable that Ra is a group containing a plurality of (meth)acryloyl groups. For example, Ra is preferably a group represented by General Formula (2a)

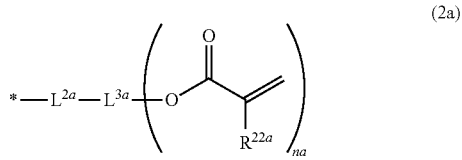

(2a)

In General Formula (2a), * represents a portion linked to Si in General Formula (2), $L^{2a}$ represents a single bond or a divalent linking group, $R^{22a}$ represents a hydrogen atom or a substituted or unsubstituted alkyl group, $L^{3a}$ represents an (na+1)-valent linking group, and na represents an integer equal to or greater than 2.

Examples of the divalent linking group represented by $L^{2a}$ include a substituted or unsubstituted alkylene group (preferably having 1 to 1(carbon atoms), —O—, —CO—, —COO—, —S—, —NH—, and a divalent linking group obtained by combining these.

Examples of the substituted or unsubstituted alkylene group include the substituted or unsubstituted alkylene group represented by $R^{11a}$ in General Formula (1a).

$L^{2a}$ is preferably a group in which two adjacent carbon atoms in a substituted or unsubstituted alkylene group having 1 to 10 carbon atoms are bonded to each other through at least one bond selected from —O—, —CO—, —COO—, —S—, or —NH—.

$R^{22a}$ has the same definition as $R^{12a}$ in General Formula (1a), and preferred examples thereof are also the same.

na is preferably an integer of 2 to 4, and more preferably 2 or 3.

$L^{3a}$ represents an (na+1)-valent linking group, and preferably represents an (na+1)-valent hydrocarbon group.

In a case where $L^{3a}$ represents an (na+1)-valent hydrocarbon group, the hydrocarbon group may further have a substituent (for example, a hydroxyl group, a carboxyl group, an alkoxy group, an aryl group, or a halogen atom), or may have a hetero atom (for example, an oxygen atom, a sulfur atom, or a nitrogen atom) in a hydrocarbon chain.

Ra in General Formula (2) is derived from a group (a group other than an alkoxy group and a halogen atom; for example, Ra in a hydrolyzable silane compound represented by Formula (A) which will be described later, or the like) bonded to a silicon atom in the hydrolyzable trifunctional silane compound used as a raw material of the polyorganosilsesquioxane.

Specific examples of Ra are as below but the present invention is not limited thereto. In the following specific examples, * represents a portion linked to Si in General Formula (2).

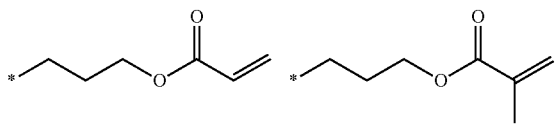

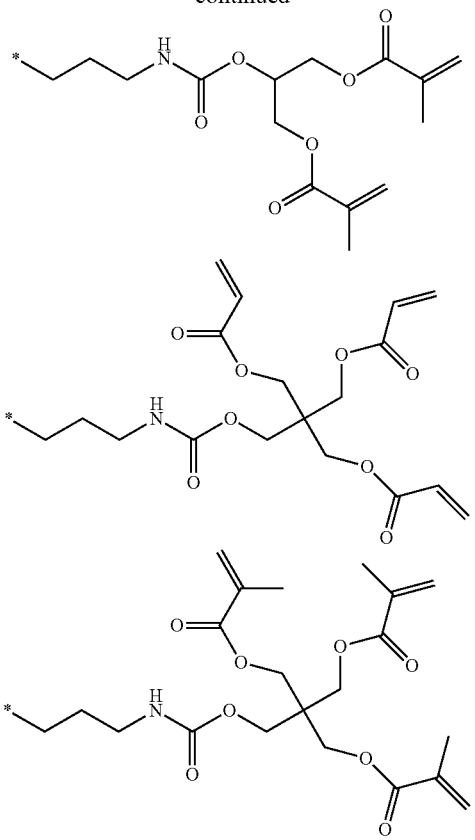

In General Formula (2), Rc represents a monovalent group.

The monovalent group represented by Rc in General Formula (2) has the same definition as Rc in General Formula (1), and preferred examples thereof are also the same. However, in order that the excellent deformation recovery rate is maintained, it is preferable that the monovalent group represented by Rc in General Formula (2) does not have a perfluoropolyether group.

In a case where there is a plurality of Rc's in General Formula (2), the plurality of Rc's may form a bond with each other. The number of Rc's forming a bond with each other is preferably 2 or 3, and more preferably 2.

The group ($Rc_2$) formed by the bonding of two Rc's in General Formula (2) and the group ($Rc_3$) formed by the bonding of three Rc's in General Formula (2) have the same definitions as the group ($Rc_2$) formed by the bonding of two Rc's in General Formula (1) and the group ($Rc_3$) formed by the bonding of three Rc's in General Formula (1), and the groups preferable as these are also the same.

Rc in General Formula (2) is derived from a group (a group other than an alkoxy group and a halogen atom: for example, $Rc_1$ to $Rc_3$ in a hydrolyzable silane compound represented by Formulas (C1) to (C3) described above, or the like) bonded to a silicon atom in the hydrolyzable silane compound used as a raw material of the polyorganosilsesquioxane.

In General Formula (2), t is greater than 0, and u is equal to or greater than 0.

t/(t+u) is preferably 0.5 to 1.0. In a case where the amount of groups represented by Ra is half or more of the total amount of groups represented by Ra or Rc contained in the polyorganosilsesquioxane (c1), crosslinks are sufficiently formed between the polyorganosilsesquioxane molecules. Therefore, excellent scratch resistance can be maintained.

t/(t+u) is more preferably 0.7 to 1.0, even more preferably 0.9 to 1.0, and particularly preferably 0.95 to 1.0.

It is also preferable that there is a plurality of Rc's in General Formula (2), and the plurality of Rc's form a bond with each other. In this case, u/(t+u) is preferably 0.00 to 0.20.

u/(t+u) is more preferably 0.00 to 0.10, even more preferably 0.00 to 0.05, and particularly preferably 0.00 to 0.025.

The number-average molecular weight (Mn) of the polyorganosilsesquioxane (c1) that is measured by gel permeation chromatography (GPC) and expressed in terms of standard polystyrene is preferably 500 to 6,000, more preferably 1,000 to 4,500, and even more preferably 1,500 to 3,000.

The molecular weight dispersity (Mw/Mn) of the polyorganosilsesquioxane (c1) that is measured by GPC and expressed in terms of standard polystyrene is, for example, 1.0 to 4.0, preferably 1.1 to 3.7, more preferably 1.1 to 3.0, and even more preferably 1.1 to 2.5. Mn represents a number-average molecular weight.

The weight-average molecular weight and the molecular weight dispersity of the polyorganosilsesquioxane (c1) are measured by the same method as that used for the polyorganosilsesquioxane (a1).

<Method for Manufacturing Polyorganosilsesquioxane (c1)>

The polyorganosilsesquioxane (c1) can be manufactured by a known manufacturing method and is not particularly limited. The polyorganosilsesquioxane (c1) can be manufactured preferably by a method of hydrolyzing and condensing one kind of hydrolyzable silane compound or two or more kinds of hydrolyzable silane compounds. As the hydrolyzable silane compound, it is preferable to use a hydrolyzable trifunctional silane compound (a compound represented by Formula (A)) for forming a siloxane constitutional unit containing a (meth)acryloyl group).

In a case where u in General Formula (2) is greater than 0, as the hydrolyzable silane compounds, it is preferable to use the compounds represented by Formula (C1), (C2), or (C3) in combination.

Ra in Formula (A) has the same definition as Ra in General Formula (2), and preferred examples thereof are also the same.

$X^1$ in Formula (A) represents an alkoxy group or a halogen atom.

Examples of the alkoxy group represented by $X^1$ include an alkoxy group having 1 to 4 carbon atoms such as a methoxy group, an ethoxy group, a propoxy group, an isopropyloxy group, a butoxy group, and an isobutyloxy group.

Examples of the halogen atom represented by $X^1$ include a fluorine atom, a chlorine atom, a bromine atom, an iodine atom, and the like.

As $X^1$, an alkoxy group is preferable, and a methoxy group and an ethoxy group are more preferable. Three $X^1$'s may be the same as or different from each other.

The compound represented by Formula (A) is a compound forming a siloxane constitutional unit having Ra.

As the hydrolyzable silane compound, hydrolyzable silane compounds other than the compounds represented by Formulas (A) and (C1) to (C3) may be used in combination. Examples thereof include a hydrolyzable trifunctional silane compound, a hydrolyzable monofunctional silane compound, a hydrolyzable difunctional silane compound, a hydrolyzable tetrafunctional silane compound, and the like other than the compounds represented by Formulas (A) and (C1) to (C3). Specific examples thereof include tetraalkoxysilane, dialkoxysilane, and monoalkoxysilane.

In a case where Rc is derived from $Rc_1$ to $Rc_3$ in the hydrolyzable silane compounds represented by Formulas (C1) to (C3), in order to adjust t(t+u) in General Formula (2), a mixing ratio (molar ratio) among the compounds represented by Formulas (A) and (C1) to (C3) may be adjusted.

Specifically, for example, in order to adjust t(t+u) to 0.5 to 1.0, a value represented by the following (Z3) may be set to 0.5 to 1.0, and a method of hydrolyzing and condensing these compounds may be used to manufacture the polyorganosilsesquioxane (c1).

(Z3)={compound represented by Formula (A) (molar amount)}/{compound represented by Formula (A) (molar amount)+compound represented by Formula (C1) (molar amount)+compound represented by Formula (C2) (molar amount)×2+ compound represented by Formula (C3) (molar amount)×3}

The amount of the above hydrolyzable silane compounds used and the composition thereof can be appropriately adjusted according to the desired structure of the polyorganosilsesquioxane (c1).

In the polyorganosilsesquioxane (c1), the content of components derived from the compound represented by Formula (A) is preferably equal to or greater than 70 mol % and equal to or smaller than 100 mol %, and more preferably equal to or greater than 75 mol % and equal to or smaller than 100 mol %. In a case where the content of components derived from the compound represented by Formula (A) is equal to or greater than 70 mol %, excellent pencil hardness can be maintained due to a sufficient deformation recovery rate, and sufficient scratch resistance can be secured.

The hydrolysis and condensation reactions of the hydrolyzable silane compounds can be performed in the same manner as the hydrolysis and condensation reactions of the hydrolyzable silane compounds in the method for manufacturing the polyorganosilsesquioxane (a1) described above.

By the hydrolysis and condensation reactions of the hydrolyzable silane compounds described above, the polyorganosilsesquioxane (c1) is obtained. After the hydrolysis and condensation reactions are finished, it is preferable to neutralize the catalyst so as to inhibit the polymerization of the (meth)acryloyl group. In addition, the polyorganosilsesquioxane (c1) may be separated and purified by a separation method such as rinsing, acid cleaning, alkali cleaning, filtration, concentration, distillation, extraction, crystallization, recrystallization, or column chromatography, or by a separation method using these in combination.

One kind of polyorganosilsesquioxane (c) may be used singly, or two or more kinds of polyorganosilsesquioxane (c1) having different structures may be used in combination.

The content rate of the cured product of the polyorganosilsesquioxane (c6) can be appropriately adjusted from the viewpoint of film thickness or performance. The content rate of the cured product of the polyorganosilsesquioxane (c1) with respect to the total mass of the anti-scratch layer is preferably equal to or higher than 50% by mass, more preferably equal to or higher than 70% by mass, and even more preferably equal to or higher than 75% by mass. It is preferable to set the content of the cured product of the polyorganosilsesquioxane (c1) to be equal to or greater than 50%, because then the deformation recovery of the hardcoat film can be excellently maintained.

In the anti-scratch layer of the hardcoat film according to the embodiment of the present invention, from the viewpoint of hardness of the film, the condensation rate of the polyorganosilsesquioxane (c1) is preferably equal to or higher than 50%. The condensation rate is more preferably equal to or higher than 80%, and even more preferably equal to or higher than 90%.

The condensation rate can be calculated using the results obtained by measuring a $^{29}$Si nuclear magnetic resonance (NMR) spectrum of the polyorganosilsesquioxane (c1) not yet being cured. In the $^{29}$Si NMR spectrum, silicon atoms show signals (peaks) at different positions (chemical shifts) according to the bonding state of the silicon atoms. Therefore, by performing assignment of the signals and calculating the integration ratio, the condensation rate can be calculated.

(Other Additives)

The anti-scratch layer may contain components other than the above, for example, inorganic particles, hollow particles, a leveling agent, an antifouling agent, an antistatic agent, a slip agent, and the like.

Hollow particles are a component used for reducing the refractive index of the anti-scratch layer such that the anti-scratch layer obtains an anti-reflection function. In a case where the hollow particles are used, the amount of the hollow particles to be added may be appropriately changed according to the type of the hollow particles used. The amount of the hollow particles to be added is preferably equal to or greater than 10% by mass and equal to or smaller than 90% by mass, and more preferably equal to or greater than 20% by mass and equal to or smaller than 80% by mass.

Particularly, it is preferable that the anti-scratch layer contains, as a slip agent, the following fluorine-containing compound or the following cured product of a fluorine-containing compound. The following fluorine-containing compound and the following cured product of a fluorine-containing compound are components different from the polyorganosilsesquioxane (c1) and a cured product of the polyorganosilsesquioxane (c1).

[Fluorine-Containing Compound and Cured Product of Fluorine-Containing Compound]

The fluorine-containing compound may be any of a monomer, an oligomer, or a polymer. It is preferable that the fluorine-containing compound has substituents that contribute to the bond formation or compatibility with the polyorganosilsesquioxane (c1) in the anti-scratch layer. These substituents may be the same as or different from each other. It is preferable that the compound has a plurality of such substituents.

The substituents are preferably polymerizable groups, and may be polymerizable reactive groups showing any of radical polymerization properties, polycondensation properties, cationic polymerization properties, anionic polymerization properties, and addition polymerization properties. As the substituents, for example, an acryloyl group, a methacryloyl group, a vinyl group, an allyl group, a cinnamoyl group, an epoxy group, an oxetanyl group, a hydroxyl group, a poly oxyalkylene group, a carboxyl group, an amino group, and the like are preferable. Among these, radically polymerizable groups are preferable, and particularly, an acryloyl group and a methacryloyl group are preferable.

The fluorine-containing compound may be a polymer or an oligomer with a compound having no fluorine atom.

The fluorine-containing compound is preferably a fluorine-based compound represented by General Formula (F).

General Formula (F): 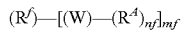

(In the formula, $R^f$ represents a (per)fluoroalkyl group or a (per)fluoropolyether group. W represents a single bond or a linking group, and $R^A$ represents a polymerizable unsaturated group. nf represents an integer of 1 to 3. mf represents an integer of 1 to 3.)

In General Formula (F), $R^A$ represents a polymerizable unsaturated group. The polymerizable unsaturated group is preferably a group having an unsaturated bond capable of causing a radical polymerization reaction by being irradiated with active energy rays such as ultraviolet or electron beams (that is, the polymerizable unsaturated group is preferably a radically polymerizable group). Examples thereof include a (meth)acryloyl group, a (meth)acryloyloxy group, a vinyl group, an allyl group, and the like. Among these, a (meth)acryloyl group, a (meth)acryloyloxy group, and groups obtained by substituting any hydrogen atom in these groups with a fluorine atom are preferably used.

In General Formula (F), $R^f$ represents a (per)fluoroalkyl group or a (per)fluoropolyether group.

The (per)fluoroalkyl group represents at least either a fluoroalkyl group or a perfluoroalkyl group, and the (per)fluoropolyether group represents at least either a fluoropolyether group or a perfluoropolyether group From the viewpoint of scratch resistance, it is preferable that the fluorine content rate in $R^f$ is high.

The (per)fluoroalkyl group is preferably a group having 1 to 20 carbon atoms, and more preferably a group having 1 to 10 carbon atoms.

The (per)fluoroalkyl group may be a linear structure (for example, —$CF_2CF_3$—, —$CH_2(CF_2)_4H$, —$CH_2(CF_2)_8CF_3$, —$CH_2CH_2(CF_2)_4H$), a branched structure (for examples, —$CH(CF_3)_2$, —$CH_2CF(CF)_2$, —$CH(CH_3)CF_2CF$, —$CH(CH_3)(CF_2)_5CF_2H$), or an alicyclic structure (preferably a 5- or 6-membered ring, for example, a perfluorocyclohexyl group, a perfluorocyclopentyl group, and an alkyl group substituted with these groups).

The (per)fluoropolyether group refers to a (per)fluoroalkyl group having an ether bond, and may be a monovalent group or a group having a valence of equal to or higher than 2. Examples of the fluoropolyether group include —$CH_2OCH_2CF_2CF_3$, —$CH_2CH_2OCH_2C_4F_8H$, —$CH_2CH_2OCH_2CH_2C_8F_{17}$, —$CH_2CH_2OCF_2CF_2OCF_2CF_2H$, a fluorocycloalkyl group having 4 to 20 carbon atoms with four or more fluorine atoms, and the like. Examples of the perfluoropolyether group include —$(CF_2O)_{pf}$—$(CF_2CF_2O)_{qf}$—, —$[CF(CF_3)CF_2O_{pf}]$—$[CF(CF_3)]_{qf}$—, —$(CF_2CF_2CF_2O)_{pf}$—, —$(CF_2CF_2O)_{pf}$—, and the like.

pf and qf each independently represent an integer of 0 to 20. Here, pf+qf is an integer equal to or greater than 1.

The sum of pf and qf is preferably 1 to 83, more preferably 1 to 43, and even more preferably 5 to 23.

From the viewpoint of excellent scratch resistance, the fluorine-containing compound particularly preferably has a perfluoropolyether group represented by —$(CF_2)_{pf}$—$(CF_2CF_2O)_{qf}$—.

In the present invention, the fluorine-containing compound preferably has a perfluoropolyether group and has a plurality of polymerizable unsaturated groups in one molecule.

In General Formula (F), W represents a linking group Examples of W include an alkylene group, an arylene group, a heteroalkylene group, and a linking group obtained by combining these groups. These linking groups may further have an ow group, a carbonyl group, a carbonyloxy group, a carbonylimino group, a sulfonamide group, and a functional group obtained by combining these groups.

W is preferably an ethylene group, and more preferably an ethylene group bonded to a carbonylimino group.

The content of fluorine atoms in the fluorine-containing compound is not particularly limited, but is preferably equal to or greater than 20% by mass, more preferably 30% to 70% by mass, and even more preferably 40% to 70% by mass.

As the fluorine-containing compound, for example, R-2020, M-2020, R-3833, M-3833, and OPTOOL DAC (trade names) manufactured by DAIKIN INDUSTRIES, LTD. and MEGAFACE F-171 F-172, F-179A, RS-78, RS-90, and DEFENSA MCF-300 and MCF-323 (trade names) manufactured by DIC Corporation are preferable, but the fluorine-containing compound is not limited to these.

From the viewpoint of scratch resistance, in General Formula (F), the product of nf and mf (nf×mf) is preferably equal to or greater than 2, and more preferably equal to or greater than 4.

(Molecular Weight of Fluorine-Containing Compound)

The weight-average molecular weight (Mw) of the fluorine-containing compound having a polymerizable unsaturated group can be measured using molecular exclusion chromatography, for example, gel permeation chromatography (GPC).

Mw of the fluorine-containing compound used in the present invention is preferably equal to or greater than 400 and less than 50,000, more preferably equal to or greater than 400 and less than 30,000, and even more preferably equal to or greater than 40 and less than 25,000

(Amount of Fluorine-Containing Compound Added)

The amount of the fluorine-containing compound added with respect to the total mass of the anti-scratch layer is preferably 0.01% to 5% by mass, more preferably 0.1% to 5% by mass, even more preferably 0.5% to 5% by mass, and particularly preferably 0.5% to 2% by mass.

The film thickness of the anti-scratch layer is preferably 0.1 µm to 10 µm, more preferably (0.1 µm to 6 µm, and particularly preferably 0.1 µm to 4 µm.

<Other Layers>

The hardcoat film according to the embodiment of the present invention may further have other layers in addition to the hardcoat layer, the anti-scratch layer, and the mixed layer. For example, it is preferable to adopt an aspect in which the hardcoat layer is on both surfaces of the substrate, an aspect in which an easily-adhesive layer for improving adhesiveness is between the substrate and the hardcoat layer, or an aspect in which the hardcoat film has an antistatic layer for imparting antistatic properties. Furthermore, a plurality of these aspects may be adopted.

[Method for Manufacturing Hardcoat Film]

The method for manufacturing the hardcoat film according to the embodiment of the present invention is not particularly limited. As a preferred aspect, for example, a method may be used in which a substrate is coated with a composition for forming a hardcoat layer, the composition is semi-cured, a hardcoat layer formed by the semi-curing is coated with a composition for forming an anti-scratch layer, and then the layers are fully cured (aspect A). In the aspect A, in a case where the hardcoat film according to the embodiment of the present invention additionally has a mixed layer, it is preferable to coat the semi-cured hardcoat layer with a composition for forming a mixed layer, semi-cure the composition, coat a mixed layer formed by the semi-curing with a composition for forming an anti-scratch layer, and then fully cure the respective layers.

In another preferred aspect, as means for forming a mixed layer in the hardcoat film, for example, a method may be adopted in which a hardcoat layer and an anti-scratch layer that are uncured are laminated on a substrate, interfacial mixing is caused at the interface between the hardcoat layer and the anti-scratch layer such that a mixed layer is formed, and then the respective layers are fully cured. For example, a method may be adopted in which an uncured hardcoat layer is firmed on a substrate, an uncured anti-scratch layer is formed on a temporary support such that another laminate is prepared, the anti-scratch layer of the laminate is bonded to the hardcoat layer such that a mixed layer is formed by interfacial mixing occurring at the bonding surface, the respective layers are fully cured, and then the temporary support is removed (aspect B). In addition, for example, a method may be adopted in which a substrate is coated with a composition for forming a hardcoat layer and a composition for forming an anti-scratch layer such that multiple layers are formed, a mixed layer is formed at the interface between the layers, and then the respective layers are fully cured (aspect C).

Hereinafter, the aspect A will be specifically described by using, for example, a case where the hardcoat layer contains a cured product of polyorganosilsesquioxane (a1) having an epoxy group, and the mixed layer contains a cured product of a compound (b1) having an epoxy group and a cured product of a compound (b2) having two or more (meth) acryloyl groups in one molecule. Specifically, the aspect A is a manufacturing method including the following steps (I) to (VI).

(I) Step of coating a substrate with a composition for forming a hardcoat layer containing the aforementioned polyorganosilsesquioxane (a1) having an epoxy group so as to form a coating film (i)

(II) Step of performing a semi-curing treatment on the coating film (i)

(III) Step of coating the semi-cured coating film (i) with a composition for forming a mixed layer containing the epoxy compound (b1) and the polyfunctional (meth) acrylate compound (b2) so as to form a coating film (ii)

(IV) Step of performing a semi-curing treatment on the coating film (ii) formed in the step (III)

(V) Step of coating the semi-cured coating film (ii) with a composition for forming an anti-scratch layer containing polyorganosilsesquioxane (c1) having a group containing a radically polymerizable double bond so as to form a coating film (iii)

(VI) Step of performing a full curing treatment on the coating film (i), the coating film (ii), and the coating film (iii)

<Step (I)>

The step (I) is a step of coating a substrate with a composition for forming a hardcoat layer containing the polyorganosilsesquioxane (a1) having an epoxy group so as to form a coating film.

The substrate is as described above.

The composition for forming a hardcoat layer is a composition for forming the hardcoat layer described above.

The composition for forming a hardcoat layer is generally in the form of a liquid. Furthermore, the composition for forming a hardcoat layer is preferably prepared by dissolving or dispersing the polyorganosilsesquioxane (a1) and various optional additives and an optional polymerization initiator in an appropriate solvent. At this time, the concentration of solid contents is generally about 10% to 90% by mass, preferably 20% to 80% by mass, and particularly preferably about 40% to 70% by mass.

<Polymerization Initiator>

The polyorganosilsesquioxane (a1) contains a cationically polymerizable group (epoxy group) In order that the polymerization reaction of the polyorganosilsesquioxane (a1) is initiated and proceeds by light irradiation, it is preferable that the composition for forming a hardcoat laser contains a cationic photopolymerization initiator. One kind of cationic photopolymerization initiator may be used singly, or two or more kinds of cationic photopolymerization initiators having different structures may be used in combination.

Hereinafter, the cationic photopolymerization initiator will be described.

(Cationic Photopolymerization Initiator)

As the cationic photopolymerization initiator, known cationic photopolymerization initiators can be used without particular limitation, as long as the initiators can generate cations as active species by light irradiation. Specific examples thereof include known sulfonium salts, ammonium salts, iodonium salts (for example, diaryliodonium salts), triarylsulfonium salts, diazonium salts, iminium salts, and the like. More specifically, examples thereof include the cationic photopolymerization initiators represented by Formulas (25) to (28) described in paragraphs "0050" to "0053" of JP1996-143806A (JP-H08-143806A), the compounds exemplified as cationic polymerization catalysts in paragraph "0020" of JP1996-283320A (JP-H08-283320A), and the like. The cationic photopolymerization initiator can be synthesized by a known method or is available as a commercial product. Examples of the commercial product include CI-1370, CI-2064, CI-2397, CI-2624, CI-2639, CI-2734, CI-2758, CI-2823, CI-2855, CI-5102, and the like manufactured by NIPPON SODA CO., LTD., PHOTOINITIATOR 2047 and the like manufactured by Rhodia, UVI-6974 and UVI-6990 manufactured by Union Carbide Corporation, CPI-10P manufactured by San-Apro Ltd., and the like.

As the cationic photopolymerization initiator, in view of the sensitivity of the photopolymerization initiator with respect to light, the compound stability, and the like, a diazonium salt, an iodonium salt, a sulfonium salt, and an iminium salt are preferable. In view of weather fastness, an iodonium salt is most preferable.

Specific examples of commercial products of the iodonium salt-based cationic photopolymerization initiator include B2380 manufactured by TOKYO CHEMICAL INDUSTRY CO, LTD, BBI-102 manufactured by Midori Kagaku Co., Ltd, WPI-113, WPI-124, WPI-169, and WPI-170 manufactured by FUJIFILM Wako Pure Chemical Corporation, and DTBPI-PFBS manufactured by Toyo Gosei Co., Ltd.

In addition, specific examples of the iodonium salt compound that can be used as the cationic photopolymerization initiator include the following compounds FK-1 and FK-2.

Cationic photopolymerization initiator (iodonium salt compound) FK-1

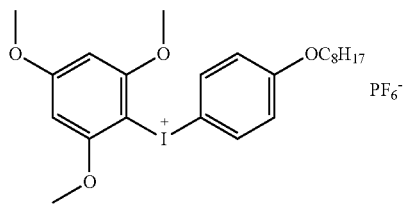

Cationic photopolymerization initiator (iodonium salt compound) FK-2

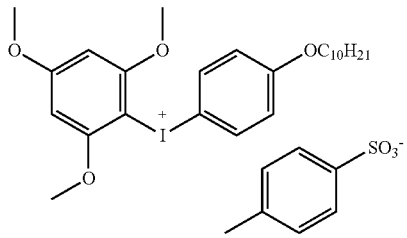

The content of the polymerization initiator in the composition for forming a hardcoat layer is not particularly limited and may be appropriately adjusted within a range in which the polymerization reaction (cationic polymerization) of the polyorganosilsesquioxane (a1) excellently proceeds. The content of the polymerization initiator with respect to 100 parts by mass of the polyorganosilsesquioxane (a1) is, for example, in a range of 0.1 to 200 parts by mass, preferably 1 to 20 parts by mass, and more preferably in a range of 1 to 5 parts by mass.

<Optional Components>

The composition for forming a hardcoat layer may further contain one or more kinds of optional components in addition to the polyorganosilsesquioxane (a1) and the polymerization initiator described above. Specific examples of the optional components include a solvent and various additives.

(Solvent)

As the solvent that can be contained as an optional component, an organic solvent is preferable. One kind of organic solvent can be used singly, or two or more kinds of organic solvents can be used by being mixed together at any ratio Specific examples of the organic solvent include alcohols such as methanol, ethanol, propanol, n-butanol, and i-butanol; ketones such as acetone, methyl isobutyl ketone, methyl ethyl ketone, and cyclohexanone, cellosolves such as ethyl cellosolve, aromatic solvents such as toluene and xylene: glycol ethers such as propylene glycol monomethyl ether; acetic acid esters such as methyl acetate, ethyl acetate, and butyl acetate, diacetone alcohol; and the like. The amount of the solvent in the aforementioned composition can be appropriately adjusted within a range in which the coating suitability of the composition can be ensured. For example, the amount of the solvent with respect to the total amount (100 parts by mass) of the polyorganosilsesquioxane (a1) and the polymerization initiators can be 50 to 500 parts by mass, and preferably can be 80 to 200 parts by mass.

(Additives)

If necessary, the aforementioned composition can optionally contain one or more kinds of known additives. Examples of such additives include a dispersant, a leveling agent, an antifouling agent, an antistatic agent, an ultraviolet absorber, an antioxidant, and the like. For details of these, for example, paragraphs "0032" to "0034" of JP2012-229412A can be referred to. However, the additives are not limited to these, and it is possible to use various additives that can be generally used in a polymerizable composition. The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd.) using a polythiophene conductive polymer or the like can be preferably used. Furthermore, the amount of the additives added to the composition is not particularly limited and may be appropriately adjusted.

<Method of Preparing Composition>

The composition for forming a hardcoat layer used in the present invention can be prepared by simultaneously mixing together the various components described above or sequentially mixing together the various components described above in any order. The preparation method is not particularly limited, and the composition can be prepared using a known stirrer or the like.

As the method of coating a substrate with the composition for forming a hardcoat layer, known methods can be used without particular limitation. Examples thereof include a dip coating method, an air knife coating method, a curtain coating method, a roller coating method, a wire bar coating method, a gravure coating method, a die coating method, and the like.

<Step (II)>

The step (II) is a step of performing a semi-curing treatment on the coating film (i).

The type of ionizing radiation is not particularly limited, and examples thereof include X-rays, electron beams, ultraviolet, visible light, infrared, and the like. Among these, ultraviolet is preferably used. For example, in a case where the coating film can be cured by ultraviolet, it is preferable to irradiate the coating film with ultraviolet from an ultraviolet lamp at an irradiation dose of 2 mJ/cm$^2$ to 1,000 mJ/cm$^2$ such that the curable compound is cured. The irradiation dose is more preferably 2 mJ/cm$^2$ to 100 mJ/cm$^2$, and even more preferably 5 mJ/cm$^2$ to 50 mJ/cm$^2$. As the ultraviolet lamp, a metal halide lamp, a high-pressure mercury lamp, or the like is suitably used.

The oxygen concentration during curing is not particularly limited. In a case where the coating film contains a component (a compound having a (meth)acryloyl group) that is easily susceptible to curing inhibition, it is preferable to adjust the oxygen concentration to 0.1% to 2.0% by volume, because then the coating film can be in a semi-cured state where the functional groups remain on the surface. In addition, in a case where the coating film does not contain a component (a compound having a (meth)acryloyl group) that is easily susceptible to curing inhibition, it is preferable to replace the curing atmosphere with dry nitrogen, because then the influence exerted by the reaction between the epoxy group and the water vapor in the air can be removed.

If necessary, at either or both of a stage that follows the step (I) and precedes the step (II) and a stage that follows the step (II) and precedes the step (III), a drying treatment may be performed. The drying treatment can be performed by blowing hot air, disposing the film in a heating furnace, transporting the film in a heating furnace, and the like. The heating temperature is not particularly limited and may be set to a temperature at which the solvent can be dried and removed. The heating temperature means the temperature of hot air or the internal atmospheric temperature of the heating furnace.

By the semi-curing of the coating film (i) in the step (II), an unreacted epoxy group in the polyorganosilsesquioxane (a1) contained in the composition for forming a hardcoat layer and the epoxy compound contained in the composition for forming a mixed layer form a bond in the steps (IV) and (VI) which will be described later. Due to the formation of a bond described above, the hardcoat film according to the embodiment of the present invention has a laminated structure having high adhesiveness and thus can exhibit higher scratch resistance.

<Step (III)>

The step (III) is a step of coating the semi-cured coating film (i) with a composition for forming a mixed layer containing the epoxy compound (b1) and the polyfunctional (meth)acylate compound (b2) so as to form a coating film (ii).

The composition for forming a mixed layer is a composition for forming the mixed layer described above.

The composition for forming a mixed layer is generally in the form of a liquid. Furthermore, the composition for forming a mixed layer is preferably prepared by dissolving or dispersing the aforementioned epoxy compound (b1), the polyfunctional (meth)acrylate compound (b2), various optional additives, and an optional polymerization initiator in an appropriate solvent. At this time, the concentration of solid contents is generally about 2% to 90% by mass, preferably 2% to 80% by mass, and particularly preferably about 2% to 70% by mass.

(Polymerization Initiator)

The composition for forming a mixed layer contains the epoxy compound (b1) (cationically polymerizable compound) and the polyfunctional (meth)acrylate compound (b2) (radically polymerizable compound). In order that the polymerization reactions of these polymerizable compounds polymerized in different ways are initiated and proceed by light irradiation, it is preferable that the composition for forming a mixed layer contains a radical photopolymerization initiator and a cationic photopolymerization initiator One kind of radical photopolymerization initiator may be used singly, or two or more kinds of radical photopolymerization initiators having different structures may be used in combination. This point is also applied to the cationic photopolymerization initiator.

Hereinafter, each of the photopolymerization initiators w ill be described in order.

(Radical Photopolymerization Initiator)

As the radical photopolymerization initiator, known radical photopolymerization initiators can be used without particular limitation, as long as the initiators can generate radicals as active species by light irradiation. Specific examples thereof include acetophenones such as diethoxy acetophenone, 2-hydroxy-2-methyl-1-phenylpropan-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)-1-butanone, a 2-hydroxy-2-methyl-1-[4-(1-methylvinyl)phenyl]propane oligomer, and 2-hydroxy-1-{4-[4-(2-hydroxy-2-methyl-propionyl)-benzyl]phenyl}-2-methyl-propan-1-one; oxime esters such as 1,2-octanedione, 1-[4-(phenylthio)-, 2-(O-benzyloxime)], ethanone, 1-[9-ethyl-6-(2-methylbenzoyl)-9H-carbazol-3-yl]-, 1-to-acetyloxime), benzoins such as benzoin, benzoin methyl ether, benzoin ethyl ether, benzoin isopropyl ether, and benzoin isobutyl ether; benzophenones such as benzophenone, methyl o-benzoyl benzoate, 4-phenylbenzophenone, 4-benzoyl-4-methyl-diphenyl sulfide, 3,3,4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, and (4-benzoylbenzyl)trimethyl ammonium chloride; thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4- dimethyl-9H-thioxanthone-9-one methochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Furthermore, as an aid for the radical photopolymerization initiator, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like may be used in combination.

The above radical photopolymerization initiators and aids can be synthesized by a known method or are available as commercial products.

The content of the radical photopolymerization initiator in the composition for forming a mixed layer is not particularly limited and may be appropriately adjusted within a range in which the polymerization reaction (radical polymerization) of the radically polymerizable compound excellently proceeds. In the composition, the content of the radical photopolymerization initiator with respect to 100 parts by mass of the radically polymerizable compound is, for example, in a range of 0.1 to 20 parts by mass, preferably (0.5 to 1( ) parts by mass, and more preferably in a range of 1 to 10 parts by mass.

Examples of the cationic photopolymerization initiator include the cationic photopolymerization initiator that can be contained in the composition for forming a hardcoat layer described above.

The content of the cationic photopolymerization initiator in the composition for forming a mixed layer is not particularly limited and may be appropriately adjusted within a range in which the polymerization reaction (cationic polymerization) of the cationically polymerizable compound excellently proceeds. The content of the cationic photopolymerization initiator with respect to 100 parts by mass of the cationically polymerizable compound is, for example, in a range of 0.1 to 200 parts by mass, preferably 1 to 150 parts by mass, and more preferably in a range of 1 to 100 parts by mass.

<Optional Components>

The composition for forming a mixed layer may further contain one or more kinds of optional components in addition to the epoxy compound, the polyfunctional (meth)acrylate compound (b2), and the polymerization initiator described above. Specific examples of the optional components include solvents and various additives that can be used in the composition for forming a hardcoat layer.

<Method of Preparing Composition>

The composition for forming a mixed layer used in the present invention can be prepared by simultaneously mixing together the various components described above or sequentially mixing together the various components described above in any order. The preparation method is not particularly limited, and the composition can be prepared using a known stirrer or the like.

As the method of coating the coating film (i) with the composition for forming a mixed layer, known methods can be used without particular limitation.

<Step (IV)>

The step (IV) is a step of performing a semi-curing treatment on the coating film (ii) formed in the step (III).

It is preferable that the coating film is cured by radiating the ionizing radiation to the coating film side.

Regarding the type and irradiation dose of the ionizing radiation, the ionizing radiation for semi-curing the coating film (i) in the step (II) can be suitably used, and the irradiation dose of the ionizing radiation in the step (II) can be suitably used.

If necessary, at either or both of a stage that follows the step (III) and precedes the step (IV) and a stage that follows the step (IV) and precedes the step (V), a drying treatment may be performed.

By the semi-curing of the coating film (ii) in the step (IV), the unreacted (meth)acryloyl group in the polyfunctional (meth)acrylate compound (b2) contained in the composition for forming a mixed layer and the group containing a radically polymerizable double bond in the polyorganosilsesquioxane (c1) having the group containing a radically polymerizable double bond contained in the composition for forming an anti-scratch layer form a bond in the step (VI) which will be described later. Furthermore, the epoxy compound (b1) contained in the composition for forming a mixed layer and the unreacted epoxy group in the polyorganosilsesquioxane (c1) contained in the composition for forming an anti-scratch layer form a bond in the step (VI) which will be described later. Due to the formation of a bond described above, the hardcoat film according to the embodiment of the present invention has a laminated structure having high adhesiveness and thus can exhibit higher scratch resistance.

The oxygen concentration during curing is not particularly limited. It is preferable to adjust the oxygen concentration to 0.1% to 2.0% by volume. In a case where the oxygen concentration is set to be within the above range, the extent of the semi-curing can be adjusted.

<Step (V)>

The step (V) is a step of coating the semi-cured coating film (ii) with a composition for forming an anti-scratch layer containing the polyorganosilsesquioxane (c1) having a group containing a radically polymerizable double bond so as to form a coating film (iii).

The composition for forming an anti-scratch layer is a composition for forming the anti-scratch layer described above.

The composition for forming an anti-scratch layer is generally in the form of a liquid. Furthermore, the composition for forming an anti-scratch layer is preferably prepared by dissolving or dispersing the polyorganosilsesquioxane (c1), various optional additives, and an optional polymerization initiator in an appropriate solvent. At this time, the concentration of solid contents is generally about 2% to 90% by mass, preferably 2% to 80% by mass, and particularly preferably about 2% to 70% by mass.

(Polymerization Initiator)

The composition for forming an anti-scratch layer contains the polyorganosilsesquioxane (c1) having a group containing a radically polymerizable double bond. In order that the polymerization reaction of the polyorganosilsesquioxane (c1) is initiated and proceeds by light irradiation, it is preferable that the composition for forming an anti-scratch layer contains a radical photopolymerization initiator. One kind of radical photopolymerization initiator may be used singly, or two or more kinds of radical photopolymerization initiators having different structures may be used in combination Examples of the radical photopolymerization initiator include the radical photopolymerization initiator that can be contained in the composition for forming a mixed layer described above.

The content of the radical photopolymerization initiator in the composition for forming an anti-scratch layer is not particularly limited and may be appropriately adjusted within a range in which the polymerization reaction (radical polymerization) of the radically polymerizable compound excellently proceeds. In the composition, the content of the radical photopolymerization initiator with respect to 100 parts by mass of the radically polymerizable compound is, for example, in a range of 0.1 to 20 parts by mass, preferably 0.5 to 10 parts by mass, and more preferably in a range of 1 to 10 parts by mass.

<Optional Components>

The composition for forming a mixed layer may further contain one or more kinds of optional components in addition to the polyorganosilsesquioxane (c1) and the polymerization initiator described above. Specific examples of the optional components include the fluorine-containing compound described above and solvents and various additives that can be used in the composition for forming a hardcoat layer.

<Method of Preparing Composition>

The composition for forming an anti-scratch layer used in the present invention can be prepared by simultaneously mixing together the various components described above or sequentially mixing together the various components described above in any order. The preparation method is not particularly limited, and the composition can be prepared using a known stirrer or the like.

As the method of coating the coating film (ii) with the composition for forming an anti-scratch layer, known methods can be used without particular limitation.

<Step (VI)>

The step (VI) is a step of performing a full curing treatment on the coating film (i), the coating film (ii), and the coating film (iii).

It is preferable that the coating film is cured by radiating the ionizing radiation to the coating film side.

Regarding the type and irradiation dose of the ionizing radiation, the ionizing radiation for curing the coating film (i) and the coating film (ii) in the step (IV) can be suitably used, and the irradiation dose of the ionizing radiation in the step (IV) can be suitably used.

If necessary, at either or both of a stage that follows the step (V) and precedes the step (VI) and a stage that follows the step (VI), a drying treatment may be performed.

The present invention also relates to an article comprising the hardcoat film according to the embodiment of the present invention, and an image display device comprising the hardcoat film according to the embodiment of the present invention as a surface protection film. The hardcoat film according to the embodiment of the present invention is particularly preferably applied to flexible displays in smartphones and the like.

EXAMPLES

Hereinafter, the present invention will be more specifically described using examples, but the scope of the present invention is not limited thereto.

<Preparation of Substrate>

(Manufacturing of Polyimide Powder)

Under a nitrogen stream, 832 g of N,N-dimethylacetamide (DMAc) was added to a 1 L reactor equipped with a stirrer, a nitrogen injection device, a dropping funnel, a temperature controller, and a cooler, and then the temperature of the reactor was set to 25° C. Bistrifluoromethylbenzidine (TFDB) (64.046 g (0.2 mol)) was added thereto and dissolved. The obtained solution was kept at 25° C., and in this state, 31.09 g (0.07 mol) of 2,2-bis(3,4-dicarboxyphenyl)hexafluoropropane dianhydride (6FDA) and 8.83 g (0.03 mol) of biphenyltetracarboxylic dianhydride (BPDA) were added thereto, and the mixture was allowed to react by being stirred for a certain period of time. Then, 20.302 g (0.1 mol) of terephthaloyl chloride (TPC) was added thereto, thereby obtaining a polyamic acid solution with a concentration of solid contents of 13% by mass. Thereafter, 25.6 g of pyridine and 33.1 g of acetic anhydride were added to the polyamic acid solution, and the mixture was stirred for 30 minutes, further stirred at 70° C. for 1 hour, and then cooled to room temperature. Methanol (20 L) was added thereto, and the precipitated solid contents were filtered and ground. Subsequently, the ground resultant was dried in a vacuum at 100° C. for 6 hours, thereby obtaining 111 g of polyimide powder.

(Preparation of Substrate S-1)

The polyimide powder (100 g) was dissolved in 670 g of N,N-dimethylacetamide (DMAc), thereby obtaining a 13% by mass solution. The obtained solution was cast on a stainless steel plate and dried with hot air at 130° C. for 30 minutes. Then, the film was peeled from the stainless steel plate and fixed to a frame by using pins, and the frame to which the film was fixed was put in a vacuum oven, heated for 2 hours by slowly increasing the heating temperature up to 300° C. from 100° C. and then slowly cooled. The cooled film was separated from the frame. Then, as a final heat treatment step, the film was further treated with heat for 30 minutes at 300° C. thereby obtaining a substrate S-1 having a film thickness of 30 μm consisting of a polyimide film.

<Synthesis of Polyorganosilsesquioxane>

(Synthesis of Compound (A))

In a 1,000 ml flask (reaction vessel) equipped with a thermometer, a stirrer, a reflux condenser, and a nitrogen introduction pipe, 297 mmol (73.2 g) of 2-(3,4-epoxcyclohexyl)ethyltrimethoxysilane, 3 mmol (409 mg) of methyltrimethoxysilane, 7.39 g of triethylamine, and 370 g of methyl isobutyl ketone (MIBK) were mixed together under a nitrogen stream, and 73.9 g of pure water was added dropwise thereto for 30 minutes by using a dropping funnel. The reaction solution was heated to 80° C. such that a polycondensation reaction was carried out under a nitrogen stream for 10 hours.

Thereafter, the reaction solution was cooled, 300 g of a 5% by mass saline was added thereto, and the organic layer was extracted. The organic layer was washed with 300 g of 5% by mass saline and washed twice with 300 g of pure water in this order, and then concentrated under the conditions of t mmHg and 50° C. thereby obtaining a methyl isobutyl ketone (MIBK) solution with a concentration of solid contents of 59.0% by mass that contained a colorless and transparent liquid product {the compound (A) as polyorganosilsesquioxane having an alicyclic epoxy group (the compound represented by General Formula (1) in which Rb represents a 2-(3,4-epoxycyclohexyl)ethyl group, Rc represents a methyl group, q=99, and r=1)} at a concentration of solid contents of 59.8% by mass.

The obtained compound (A) had a number-average molecular weight (Mn) of 2.310 and a dispersity (Mw/Mn) of 2.1.

Note that 1 mmHg equals about 133.322 Pa.

(Synthesis of Compound (B))

A methyl isobutyl ketone (MIBK) solution containing the compound (B) (the compound represented by General Formula (2) in which Ra represents a 3-(methacryloyloxy)propyl group, t=100, and u=0) at a concentration of solid contents of 62.0% by mass was obtained in the same manner as in the synthesis of the compound (A), except that 297 mmol (73.2 g) of 2-(3,4-epoxycyclohexyl)ethyltrimethoxysilane and 3 mmol (409 mg) of methyltrimethoxysilane in the synthesis of the compound (A) were changed to 300 mmol (70.3 g) of 3-(acryloyloxy)propyl trimethoxysilane.

The obtained compound (B) had a number-average molecular weight (Mn) of 2.130 and a dispersity (Mw/Mn) of 1.2. The condensation rate was 97%.

(Synthesis of Compound (C))

A methyl isobutyl ketone (MIBK) solution containing the compound (C) (the compound represented by General Formula (2) in which Ra represents a 3-(methacryloyloxy) propyl group, t=100, and u=0) at a concentration of solid contents of 60.5% by mass was obtained in the same manner as in the synthesis of the compound (A), except that 297 mmol (73.2 g) of 2-(3,4-epoxycyclohexyl)ethyltrimethoxysilane and 3 mmol (409 mg) of methyltrimethoxysilane in the synthesis of the compound (A) were changed to 300 mmol (74.5 g) of 3-(methacryloyloxy)propyl trimethoxysilane.

The obtained compound (C) had a number-average molecular weight (Mn) of 2,050 and a dispersity (Mw/Mn) of 1.1. The condensation rate was 97%.

(Synthesis of Compound (D))

A methyl isobutyl ketone (MIBK) solution containing a compound (D) (the compound represented by General Formula (2) in which Ra represents a 3-(acryloyloxy)propyl group, t=100, and u=0) at a concentration of solid contents of 61.3% by mass was obtained in the same manner as in the synthesis of the compound (B), except that in the synthesis of the compound (B), the reaction temperature was changed to 50° C. from 80° C., the reaction was performed not under a nitrogen stream but in the atmosphere, and the reaction tie was changed to 5 hours from 10 hours.

The obtained compound (D) had a number-average molecular w % eight (Mn) of 1,380 and a dispersity (Mw/Mn) of 1.2. The condensation rate was 70%.

Example 1

<Preparation of Composition for Forming Hardcoat Layer>
(Composition HC-1 for Forming Hardcoat Layer)

CPI-100P, a leveling agent-1, and methyl isobutyl ketone (MIBK) were added to the MIBK solution containing the compound (A), the concentration of each of the components was adjusted to the following concentration, and the mixture was put in a mixing tank and stirred. The obtained composition was filtered through a polypropylene filter having a pore size of 0.4 µm, thereby obtaining a composition HC-1 for forming a hardcoat layer.

Compound (A) 98.7 parts by mass
CPI-100P 1.3 parts by mass
Leveling agent-1 0.07 parts by mass
Methyl isobutyl ketone 100.0 parts by mass The compounds used in the composition for forming a hardcoat layer are as follows.

CPI-100P: cationic photopolymerization initiator manufactured by San-Apro Ltd.

Leveling agent-1: polymer having the following structure (Mw=1,600, the compositional ratio (molar ratio) of the following repeating units, expressed as left repeating unit: right repeating unit, is 59:41.)

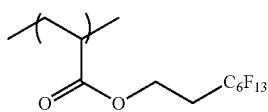

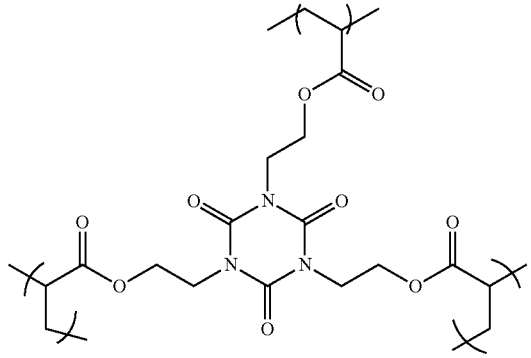

<Preparation of Composition for Forming Mixed Layer>
(Composition M-1 for Forming Mixed Layer)

The solvent of the MIBK solution containing the compound (A) was replaced with a methyl ethyl ketone (MEK) solution, DPHA, CPI-100P, IRGACURE 127, the leveling agent-1, and MEK were added thereto, the concentration of each of the components was adjusted to the following concentration, and the mixture was put in a mixing tank and stirred. The obtained composition was filtered through a polypropylene filter having a pore size of 0.4 µm, thereby obtaining a composition M-1 for forming a mixed layer. In the composition M-1 for forming a mixed layer, the mixing ratio between the compound (A) and DPHA is compound (A)/DPHA=50% by mass/50% by mass.

Compound (A) 42.85 parts by mass
DPHA 42.85 parts by mass
CPI-100P 1.3 parts by mass
IRGACURE 127 5.0 parts by mass
Leveling agent-2 8.0 parts by mass
Methyl ethyl ketone 500.0 parts by mass The compounds used in the composition for forming a mixed layer are as follows.

DPHA: mixture of dipentaerythritol pentaacrylate and dipentaerythritol hexaacrylate, manufactured by Nippon Kayaku Co., Ltd.

IRGACURE 127: radical photopolymerization initiator, manufactured by BASF SE

Leveling agent-2: polymer having the following structure (Mw, 20,000, the compositional ratio of the following repeating units is a mass ratio)

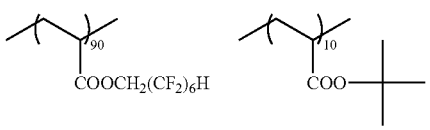

<Preparation of Composition for Forming Anti-Scratch Layer>
(Composition SR-1 for Forming Anti-Scratch Layer)

Components composed as below were put in a mixing tank, stirred, and filtered through a polypropylene filter having a pore size of 0.4 µm, thereby obtaining a composition SR-1 for forming an anti-scratch layer.

Compound (B) 96.2 parts by mass
IRGACURE 127 2.8 parts by mass

RS-90 1.0 part by mass
Methyl ethyl ketone 300.0 parts by mass

The compounds used in the composition for forming an anti-scratch layer are as follows.

RS-90: slip agent, manufactured by DIC Corporation

<Preparation of Hardcoat Film>

By using a die coater, the substrate S-1 was coated with the composition HC-1 for forming a hardcoat layer. After the composition HC-1 was dried at 120° C. for 1 minute, the hardcoat layer was semi-cured by being irradiated with ultraviolet at an illuminance of 18 mW/cm$^2$ and an irradiation dose of 10 mJ/cm$^2$ by using an air-cooled mercury lamp under the condition of 25° C.

By adding MEK to the composition M-1 for forming a mixed layer, a diluted composition for forming a mixed layer was prepared which had a concentration of solid contents that was 1/10 of the concentration of solid contents of the composition M-1. By using a die coater, the semi-cured hardcoat layer was coated with this composition. After the composition was dried at 120° C. for 1 minute, the mixed layer was semi-cured by being irradiated with ultraviolet at an illuminance of 18 mW/cm$^2$ and an irradiation dose of 10 mJ/cm$^2$ by using an air-cooled mercury lamp under the condition of 25° C. and an oxygen concentration of 1%. In this way, a mixed layer was provided on the hardcoat layer.

By using a die coater, the semi-cured mixed layer was coated with the composition SR-1 for forming an anti-scratch layer. After being dried at 120° C. for 1 minute, the composition M-1 was irradiated with ultraviolet at an illuminance of 60 mW/cm$^2$ and an irradiation dose of 600 mJ/cm$^2$ by using an air-cooled mercury lamp under the condition of 25° C. and an oxygen concentration of 100 parts per million (ppm) and then further irradiated with ultraviolet at an illuminance of 60 mW/cm$^2$ and an irradiation dose of 600 mJ/cm$^2$ by using an air-cooled mercury lamp under the condition of 80° C. and an oxygen concentration of 100 ppm. In this way, the hardcoat layer, the mixed layer, and the anti-scratch layer were fully cured. Then, the obtained film was treated with heat at 120° C. for 1 hour, thereby obtaining a hardcoat film 1 in which a mixed layer having a thickness of 0.1 μm and an anti-scratch layer having a thickness of 1.0 μm are laminated in this order on a hardcoat layer having a thickness of 17.0 μm.

Example 2

A hardcoat film 2 was obtained in the same manner as in Example 1, except that the compound (B) in the composition SR-1 for forming an anti-scratch layer was changed to the compound (C).

Example 3

A hardcoat film 3 was obtained in the same manner as in Example 1, except that the compound (B) in the composition SR-1 for forming an anti-scratch layer was changed to the compound (D).

Example 4

<Preparation of Silica Particles>

A reactor with a volume of 200 L comprising a stirrer, a dripping device, and a thermometer was filled with 89.46 kg of pure water and 0.10 kg of 28% by mass aqueous ammonia, and while the liquid was being stirred, the liquid temperature was adjusted to 90° C. The liquid temperature in the reactor was kept at 90° C., and in this state, 10.44 kg of tetramethoxysilane was added dropwise thereto for 114 minutes from the dripping device. After the dripping was finished, the liquid was further stirred for 120 minutes at a liquid temperature kept at 90° C. such that the tetramethoxysilane was hydrolyzed and condensed By using a rotary evaporator, the obtained colloidal solution was concentrated under a reduced pressure of 13.3 kPa until the weight decreased to 38.8 kg, thereby obtaining silica particles P-1 with a SiO$_2$ concentration of 10.0% by mass. The average primary particle diameter of the silica particles P-1 was 15 nm.

The silica particles P-1 (300 g) were put in a glass reactor having an internal volume of 1 L comprising a stirrer. A solution prepared by dissolving 2.3 g of 3-methacryloxypropyltrimethoxysilane (KBM-503 manufactured by Shin-Etsu Chemical Co, Ltd.) in 20 g of methyl alcohol was added dropwise to and mixed with the particles. Then, while being mixed and stirred, the mixture was heated for about 2 hours at 95° C. The mixture was cooled, 100 g of 1-methoxy-2-propanol was then added thereto, and methanol generated as a by-product was distilled away under reduced pressure. Furthermore, 300 g of 1-methoxy-2-propanol was added thereto in divided portions, and water was distilled away under reduced pressure by azeotropic distillation such that the solid content reached 60% by mass, thereby obtaining silica particles P-2 The solid content was calculated from the weight change before and after heating at 150° C. for 30 minutes <Preparation of Composition for Forming Hardcoat Layer>
(Composition HC-2 for Forming Hardcoat Layer)

A composition HC-2 for forming a hardcoat layer was prepared by mixing together the following components at the following compositional ratio (% by mass). The compositional ratio of the silica particles is a value of a silica particle dispersion having a solid content of 60%.

A-400 10.8 parts by mass
IRGACURE 184 0.6 parts by mass
Silica particles P-2 47.7 parts by mass
1-Methoxy-2-propanol 40.9 parts by mass
Leveling agent-2 0.10 parts by mass The compounds used in the composition HC-2 for forming a hardcoat layer are as follows.

A-400: polyethylene glycol #400 diacrylate (manufactured by SHIN-NAKAMURA CHEMICAL CO., LTD.)
IRGACURE 184: radical photopolymerization initiator, manufactured by BASF SE <Preparation of Hardcoat Film>

By using a die coater, the substrate S-1 was coated with the composition HC-2 for forming a hardcoat layer. After the composition HC-2 was dried at 100° C. for 30 seconds, the hardcoat layer was semi-cured by being irradiated with ultraviolet at an illuminance of 18 mW/cm$^2$ and an irradiation dose of 10 m/cm by using an air-cooled mercury lamp under the condition of 25° C.

By using a die coater, the semi-cured hardcoat layer was coated with the composition SR-1 for forming an anti-scratch layer. After being dried at 120° C. for 1 minute, the composition SR-1 was irradiated with ultraviolet at an illuminance of 60 mW/cm$^2$ and an irradiation dose of 600 mJ/cm$^2$ by using an air-cooled mercury lamp under the condition of 25° C. and an oxygen concentration of 100 parts per million (ppm) and then further irradiated with ultraviolet at an illuminance of 6) mW/cm$^2$ and an irradiation dose of 600 mJ/cm$^2$ by using an air-cooled mercury lamp under the condition of 80° C. and an oxygen concentration of 100 ppm. In this way, the hardcoat layer and the anti-scratch layer were fully cured. Then, the obtained film was treated with heat at 120° C. for 1 hour, thereby obtaining a hardcoat film 3 in which an anti-scratch layer having a thickness of 1.0 µm is on a hardcoat layer having a thickness of 17.0 µm.

Example 51

<Preparation of Composition for Forming Hardcoat Layer>
(Composition HC-3 for Forming Hardcoat Layer)

A composition HC-3 for forming a hardcoat layer was prepared by mixing together the following components at the following compositional ratio (% by mass).
DPCA20 96.9 parts by mass
IRGACURE 184 3.0 parts by mass
1-Methoxy-2-propanol 100.0 parts by mass
Leveling agent-2 0.10 parts by mass The compounds used in the composition HC-3 for forming a hardcoat layer are as follows.
DPCA20: KAYARAD DPCA20, the following compound manufactured by Nippon Kayaku Co., Ltd.

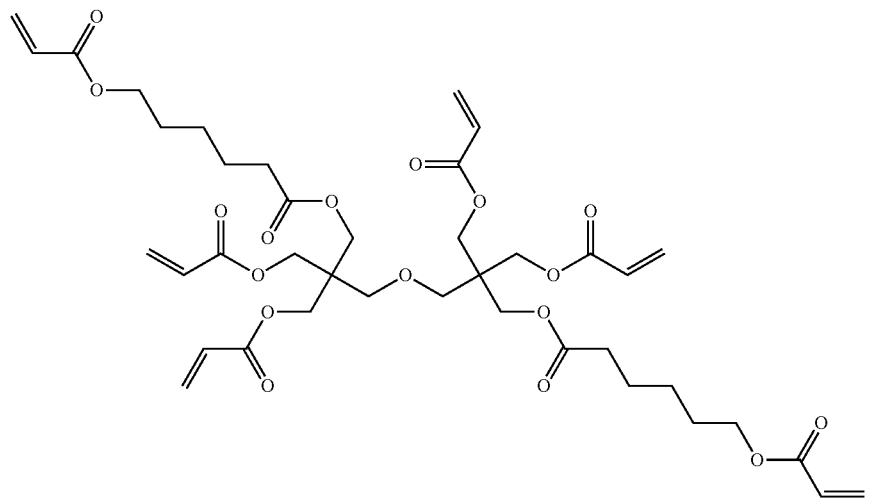 [SMILES: C=CC(=O)OCCCCCC(=O)OCC(COCC(COC(=O)C=C)(COC(=O)C=C)COC(=O)CCCCCOC(=O)C=C)(COC(=O)C=C)COC(=O)C=C]

<Preparation of Hardcoat Film>

A hardcoat film 4 was obtained in the same manner as in Example 3, except that the composition HC-2 for forming a hardcoat layer was changed to HC-3, and the thickness of the anti-scratch layer was changed to 3.0 µm.

Comparative Examples 1 and 2

Hardcoat films of Comparative Examples 1 and 2 were obtained in the same manner as in Example 1, except that the compound (B) in the composition SR-1 for forming an anti-scratch layer was changed to DPHA and DPCA60 respectively.
DPCA60: caprolactone-modified dipentaerythritol hexaacrylate, trade name KAYARAD DPCA60 (manufactured by Nippon Kayaku Co., Ltd.)

Comparative Example 3

A hardcoat film of Comparative Example 3 was obtained in the same manner as in Example 4, except that the compound (B) in the composition SR-1 for forming an anti-scratch layer was changed to DPHA.

Comparative Example 4

A hardcoat film of Comparative Example 4 was obtained in the same manner as in Example 5, except that the compound (B) in the composition SR-1 for forming an anti-scratch layer was changed to DPHA.

[Evaluation of Anti-Scratch Layer]

By using a die coater, the substrate S-1 was coated with each of the compositions for forming an anti-scratch layer After being dried at 120° C. for 1 minute, the composition was irradiated with ultraviolet at an illuminance of 60 mW/cm$^2$ and an irradiation dose of 600 mJ/cm$^2$ by using an air-cooled mercury lamp under the condition of 25° C. and an oxygen concentration of 100 ppm and then further irradiated with ultraviolet at an illuminance of 60 mW/cm$^2$ and an irradiation dose of 600 mJ/cm$^2$ by using an air-cooled mercury lamp under the condition of 80° C. and an oxygen concentration of 100 ppm. In this way, an anti-scratch layer film was obtained which had an anti-scratch layer having a thickness of 10.0 µm.

(Reaction Rate)

In the anti-scratch layer film, the peak (1,660-1,800 cm$^{-1}$) area of carbonyl groups and the peak height (at around 808 cm$^{-1}$) of double bonds were determined by the attenuated total reflection (ATR) method of surface infrared spectroscopy (IR), and a value (P101) was calculated by dividing the peak height of the double bonds by the peak area of the carbonyl groups. The same surface IR was performed on the same sample prepared under the condition that ultraviolet irradiation was not performed, and a value (represented by Q101) was calculated by dividing the peak height of the double bonds by the peak area of the carbonyl groups. From P101 and Q101, a surface curing rate was calculated using Equation 1.

$$\text{Surface curing rate} = (1-(P101/Q101))/100(\%) \quad \text{Equation 1}$$

(Modulus of Elasticity and Recovery Rate)

By using Aron Alpha (registered trademark) (manufactured by TOAGOSEI CO, LTD.), glass was bonded to the substrate side of each anti-scratch layer film, and then the film was measured under the following conditions by using an HM2000 hardness meter (manufactured by Fisher Instruments K.K., with Knoop indenter made of diamond)
Maximum load: 50 mN
Loading time: 10 seconds Creep: 5 seconds Unloading time: 10 seconds Number of time of measurement: 10

The modulus of elasticity is calculated from an unloading curve obtained by the measurement. The recovery rate was expressed as a ratio of an indentation depth at the end of the measurement (that is, under a load of 0) to the maximum indentation depth during the measurement. As each of the modulus of elasticity and the recovery rate, the average of results obtained after 10 measurement processes was used.

[Evaluation of Hardcoat Film]

The prepared hardcoat films were evaluated by the following methods.

(Pencil Hardness)

Pencil hardness was measured according to JIS K 5600-5-4 (1999) and evaluated based on the following four standards.

A: The pencil hardness is equal to or higher than 6H.

B: The pencil hardness is equal to or higher than 5H and lower than 6H.

C: The pencil hardness is equal to or higher than 4H and lower than 5H.

D: The pencil hardness is lower than 4H.

(Resistance to Repeated Folding)

A sample film having a width of 15 mm and a length of 150 mm was cut out from the hardcoat film manufactured in each of the examples and comparative examples, and left stand for 1 hour or longer at a temperature of 25° C. and a relative humidity of 65%. Then, by using a folding endurance tester (manufactured by IMOTO MACHINERY CO., LTD., IMC-0755, a radius of curvature for folding: 1.0 mm), the sample with the substrate facing outward was tested for resistance to repeated folding. Based on the number of times the sample was folded until the sample cracked or was broken, the resistance to repeated folding was evaluated.

A: Equal to or greater than 800,000

B: Equal to or greater than 500,000 and less than 800,000

C: Equal to or greater than 100,000 and less than 500,000

D: Less than 100,000

(Scratch Resistance)

By using a rubbing tester, under the following conditions, a rubbing test was performed on a surface of the hardcoat film manufactured by each of the examples and comparative examples that was opposite to the other surface thereof coming into contact with the substrate, thereby obtaining indices of scratch resistance.

Environmental conditions for evaluation: 25° C., relative humidity 60%

Rubbing Material: steel wool (NIHON STEEL WOOL Co., Ltd., grade No. 0000)

The steel wool was wound around the rubbing tip portion (1 cm×1 cm) of the tester coming into contact with the sample and fixed with a band.

Moving distance (one way): 13 cm,

Rubbing speed: 13 cm/sec,

Load: 1,000 g/cm$^2$

Contact area of tip portion: 1 cm×1 cm,

Number of times of rubbing: rubbed back and forth 100 times, 1,000 times, 5,000 times, and 10,000 times After the test, an oil-based black ink was applied to the surface, which was opposite to the rubbed surface, of the hardcoat film of each of the examples and the comparative examples. The reflected light was visually observed, the number of times of rubbing that caused scratches in the portion contacting the steel wool was counted, and the scratch resistance was evaluated based on the following five standards.

A: No scratch was made even after the hardcoat film was rubbed 10,000 times.

B: No scratch was made even after the hardcoat film was rubbed 5,000 times, but before the hardcoat film was rubbed 10,000 times, scratches were made.

C: No scratch was made even after the hardcoat film was rubbed 1,000 times, but before the hardcoat film was rubbed 5.000 times, scratches were made.

D: No scratch was made even after the hardcoat film was rubbed 100 times, but before the hardcoat film was rubbed 1,000 times, scratches were made.

E: Scratches were made before the hardcoat film was rubbed 100 times.

The evaluation results are shown in the following Table 1.

TABLE 1

| | Hardcoat layer | | Mixed layer | | | | Anti-scratch layer | | Scratch resistance evaluation | | | Hardcoat film evaluation | | |
|---|---|---|---|---|---|---|---|---|---|---|---|---|---|---|
| | Polymerizable compound | Film thickness [μm] | Epoxy compound | Amount of epoxy compound mixed in (% by mass) | Polyfunctional (meth)acrylate compound | Amount of polyfunctional (meth)acrylate compound mixed in (% by mass) | Film thickness [μm] | Polymerizable compound | Film thickness [μm] | Reaction rate [%] | Modulus of elasticity [GPa] | Recovery rate [%] | Pencil hardness | Scratch resistance | Resistance to repeated folding |
| Example 1 | Compound (A) | 17.0 | Compound (A) | 50 | DPHA | 30 | 0.1 | Compound (B) RS-90 | 1.0 | 89 | 6.0 | 95 | A | A | A |
| Example 2 | Compound (A) | 17.0 | Compound (A) | 50 | DPHA | 50 | 0.1 | Compound (C) RS-90 | 1.0 | 88 | 6.7 | 90 | A | B | A |
| Example 3 | Compound (A) | 17.0 | Compound (A) | 50 | DPHA | 50 | 0.1 | Compound (D) RS-90 | 1.0 | 89 | 5.4 | 76 | C | B | A |
| Example 4 | A-400 Silica particles P-2 | 17.0 | — | | — | | | Compound (B) RS-90 | 1.0 | 89 | 6.0 | 95 | B | A | A |
| Example 5 | DPCA 20 | 17.0 | — | | — | | | Compound (B) RS-90 | 3.0 | 89 | 6.0 | 95 | C | A | A |
| Comparative example 1 | Compound (A) | 17.0 | Compound (A) | 50 | — | 50 | 0.1 | DPHA RS-90 | 1.0 | 76 | 9.0 | 86 | A | A | B |
| Comparative example 2 | Compound (A) | 17.0 | Compound (A) | 50 | — | 50 | 0.1 | DPCA60 RS-90 | 1.0 | 70 | 4.4 | 70 | C | E | A |
| Comparative example 3 | A-400 Silica particles P-2 | 17.0 | — | | — | | | DPHA RS-90 | 1.0 | 76 | 9.0 | 86 | B | A | B |
| Comparative example 4 | DPCA 20 | 17.0 | — | | — | | | DPHA RS-90 | 3.0 | 76 | 9.0 | 86 | Q | A | B |

As shown in Table 1, the hardcoat films of examples had extremely excellent resistance to repeated folding, high hardness, and excellent scratch resistance. On the other hand, the resistance of the hardcoat films of Comparative Examples 1, 3, and 4 to repeated folding did not reach the target level of the present invention. It is considered that this is because the modulus of elasticity of the anti-scratch layer is not low enough. Furthermore, although the hardcoat film of Comparative Example 2 had extremely excellent resistance to repeated folding, the scratch resistance thereof was lower than that of examples.

What is claimed is:

1. A hardcoat film comprising, in the following order:
a substrate;
a hardcoat layer; and
an anti-scratch layer,
wherein the hardcoat layer contains at least one selected from a cured product of polyorganosilsesquioxane (a1) having an epoxy group, a cured product of a compound (a2) having two or more (meth)acryloyl groups in one molecule, or a cured product of a compound (a3) having a polymerizable functional group and inorganic particles;
the anti-scratch layer contains a cured product of a polyorganosilsesquioxane compound (c1) having a group containing a radically polymerizable double bond, and
wherein the polyorganosilsesquioxane (a1) having the epoxy group has a constitutional unit represented by General Formula (1);

in General Formula (1),
Rb represents a group having an epoxycyclohexyl group,
Rc represents an unsubstituted alkyl group having 1 to 10 carbon atoms,
q and r each represent a proportion of each of Rb and Rc,
q+r=100, q is greater than 0, and r is equal to or greater than 0, provided that q/(q+r) is 0.95 to 1.0,
in a case where there is a plurality of Rb's and Rc's in General Formula (1), the plurality of Rb's and Rc's may be the same as or different from each other respectively, and
in a case where there is a plurality of Rc's in General Formula (1), two Rc's may form a bond to represent an unsubstituted alkylene group having 2 to 20 carbon atoms, or three Rc's may form a bond with each other to represent a trivalent group obtained by removing any one hydrogen atom from an unsubstituted alkylene group having 2 to 20 carbon atoms,
the polyorganosilsesquioxane compound (c1) has a constitutional unit represented by General Formula (2);

in the General Formula (2),
Ra is a group represented by General Formula (1a):
*—$R^{11a}$—OCO—$CR^{12a}$=$CH_2$, wherein in General Formula (1a), * represents a portion linked to Si in General Formula (2), $R^{11a}$ represents an unsubstituted linear alkylene group having 1 to 3 carbon atoms, and $R^{12a}$ represents a hydrogen atom or a methyl group,
Rc represents a monovalent substituent,
t and u each represent a proportion of each of Ra and Rc,
t+u=100, t is greater than 0, and u is equal to or greater than 0;
provided that t/(t+u) is 0.95 to 1.0,
in a case where there is a plurality of Ra's and Rc's in General Formula (2), the plurality of Ra's and Rc's may be the same as or different from each other respectively, and
in a case where there is a plurality of Rc's in General Formula (2), two Rc's may form a bond to represent an unsubstituted alkylene group having 2 to 20 carbon atoms, or three Rc's may form a bond with each other to represent a trivalent group obtained by removing any one hydrogen atom from an unsubstituted alkylene group having 2 to 20 carbon atoms;
wherein a condensation rate of the polyorganosilsesquioxane compound (c1) is equal to or higher than 50% and equal to or lower than 97%.

2. The hardcoat film according to claim 1,
wherein the group containing a radically polymerizable double bond is a group containing an acryloyl group.

3. The hardcoat film according to claim 1,
wherein a condensation rate of the polyorganosilsesquioxane compound (c1) having the group containing a radically polymerizable double bond is equal to or higher than 50%, and
the condensation rate is calculated using the results obtained by measuring a $^{29}Si$ nuclear magnetic resonance spectrum of the polyorganosilsesquioxane (c1).

4. The hardcoat film according to claim 3,
wherein the condensation rate is equal to or higher than 80%.

5. The hardcoat film according to claim 1,
wherein the anti-scratch layer contains a cured product of a fluorine-containing compound.

6. The hardcoat film according to claim 1,
wherein the hardcoat layer contains the cured product of polyorganosilsesquioxane (a1) having the epoxy group.

7. The hardcoat film according to claim 6,
wherein a condensation rate of the polyorganosilsesquioxane compound (a1) having the epoxy group is equal to or higher than 80%,
the condensation rate is calculated using the results obtained by measuring a $^{29}Si$ nuclear magnetic resonance spectrum of the hardcoat layer containing the cured product of the polyorganosilsesquioxane (a1), and
a ring opening rate of the epoxy group in the cured product of the polyorganosilsesquioxane (a1) is equal to or higher than 40%.

8. The hardcoat film according to claim 1, further comprising:
a mixed layer between the hardcoat layer and the anti-scratch layer,
wherein the mixed layer contains a cured product of a compound (b1) having an epoxy group and a cured product of a compound (b2) having two or more (meth)acryloyl groups in one molecule.

9. An article comprising:
the hardcoat film according to claim 1.

10. An image display device comprising:

the hardcoat film according to claim 1 as a surface protection film.

11. The hardcoat film according to claim 1, wherein t/(t+u) is 0.9 to 1.0.

12. The hardcoat film according to claim 1, wherein a content rate of the cured product of the polyorganosilsesquioxane (c1) with respect to the total mass of the anti-scratch layer is equal to or higher than 50% by mass.

13. The hardcoat film according to claim 1, wherein the thickness of the hardcoat layer is 5.0 μm to 50 μm.

14. The hardcoat film according to claim 1, wherein Rb represents a 2-(3,4-epoxycyclohexyl)ethyl group.

15. The hardcoat film according to claim 1, wherein q/(q+r) is 0.99 to 1.0.

16. The hardcoat film according to claim 1, wherein $R^{12a}$ represents a hydrogen atom.

17. The hardcoat film according to claim 1, wherein t/(t+u) is 1.0.

18. The hardcoat film according to claim 1, wherein the condensation rate of the polyorganosilsesquioxane compound (c1) is equal to or higher than 80% and equal to or lower than 97%.

* * * * *